(12) United States Patent
Naji et al.

(10) Patent No.: US 7,993,570 B2
(45) Date of Patent: Aug. 9, 2011

(54) DURABLE MEDIUM-DENSITY FIBRE CEMENT COMPOSITE

(75) Inventors: Basil Naji, Toongabbie (AU); Donald J. Merkley, Alta Loma, CA (US); Michael Zammit, Lidcombe (AU); Caidian Luo, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 535 days.

(21) Appl. No.: 10/530,770

(22) PCT Filed: Oct. 7, 2003

(86) PCT No.: PCT/AU03/01315
§ 371 (c)(1),
(2), (4) Date: Oct. 6, 2005

(87) PCT Pub. No.: WO2004/031093
PCT Pub. Date: Apr. 15, 2004

(65) Prior Publication Data
US 2006/0288909 A1    Dec. 28, 2006

Related U.S. Application Data

(60) Provisional application No. 60/417,076, filed on Oct. 10, 2002.

(30) Foreign Application Priority Data

Mar. 31, 2003    (AU) .................................. 2003901529

(51) Int. Cl.
C04B 14/10    (2006.01)

(52) U.S. Cl. ........................................ 264/642; 106/721

(58) Field of Classification Search .................. 162/154, 162/157.1; 106/718; 264/46.3, 45.4, 239, 264/642; 428/445
See application file for complete search history.

(56) References Cited

U.S. PATENT DOCUMENTS

| | | | |
|---|---|---|---|
| 369,216 A | 8/1887 | Temple |
| 494,763 A | 4/1893 | Smidth |
| 525,442 A | 9/1894 | Burrows |
| 575,074 A | 1/1897 | Smith |
| 774,114 A | 11/1904 | Spear |
| 815,801 A | 3/1906 | Depew et al. |

(Continued)

FOREIGN PATENT DOCUMENTS

AR    151553    10/1966

(Continued)

OTHER PUBLICATIONS

Opposition to EP-B-1330571 filed on Dec. 15, 2006.

(Continued)

Primary Examiner — Christina Johnson
Assistant Examiner — Galen Hauth
(74) Attorney, Agent, or Firm — Mark D. Fox

(57) ABSTRACT

A cementitious product and method of modifying the properties of a low or medium density FRC product by providing a predetermined pore size distribution. The pore size distribution is obtained such that in critical zones of the distribution, the pore volume is substantially equivalent to or less than the pore volume in a respective critical zone of a conventional high density FRC product. The resultant material provides improved properties over conventional medium density FRC products, in particular improved freeze/thaw durability and/or improved workability.

27 Claims, 7 Drawing Sheets

U.S. PATENT DOCUMENTS

| | | |
|---|---|---|
| 1,344,181 A | 6/1920 | Mason |
| 1,399,023 A | 12/1921 | Murray |
| 1,510,497 A | 10/1924 | Keller |
| 1,512,084 A | 10/1924 | Church |
| 1,571,048 A | 1/1926 | Garrow |
| 1,630,801 A | 5/1927 | Parsons |
| 1,634,809 A | 7/1927 | Weiss |
| 1,698,557 A | 1/1929 | O'Brien |
| 1,819,093 A | 8/1931 | Hardinge |
| 1,856,932 A | 5/1932 | Shaw |
| 1,856,936 A | 5/1932 | Turner |
| 1,871,843 A | 8/1932 | Ericson |
| 1,914,163 A | 6/1933 | Randall |
| 1,930,024 A | 10/1933 | Varden |
| 1,943,663 A | 1/1934 | Ericson |
| 1,959,519 A | 5/1934 | Black |
| 1,976,684 A | 10/1934 | Munroe et al. |
| 1,976,984 A | 10/1934 | Condon et al. |
| 1,978,519 A | 10/1934 | Willock et al. |
| 1,995,393 A | 3/1935 | Manske |
| 1,997,939 A | 4/1935 | Loucks |
| 2,009,619 A | 7/1935 | Huffine |
| 2,024,689 A | 12/1935 | Walter et al. |
| 2,030,383 A | 2/1936 | Luth et al. |
| 2,054,854 A | 9/1936 | Dreyfus |
| 2,062,149 A | 11/1936 | Stark et al. |
| 2,156,308 A | 5/1939 | Schuh |
| 2,156,311 A * | 5/1939 | Schuh ........................... 162/154 |
| 2,175,568 A | 10/1939 | Haustein |
| 2,175,569 A | 10/1939 | Kennedy |
| 2,176,668 A | 10/1939 | Egeberg et al. |
| 2,182,372 A | 12/1939 | Cox et al. |
| 2,224,351 A | 12/1940 | Kaye |
| 2,253,753 A | 8/1941 | Black |
| 2,276,170 A | 3/1942 | Elmendorf |
| 2,317,634 A | 4/1943 | Olsen |
| 2,320,702 A | 6/1943 | Marchese et al. |
| 2,323,230 A | 6/1943 | McAvoy |
| 2,324,325 A | 7/1943 | Schuh |
| 2,354,639 A | 7/1944 | Seymour |
| 2,377,484 A | 6/1945 | Elmendorf |
| 2,400,357 A | 5/1946 | Krajci |
| 2,413,794 A | 1/1947 | Small |
| 2,447,275 A | 8/1948 | Price |
| 2,511,083 A | 6/1950 | Small |
| 2,517,122 A | 8/1950 | Lockwood |
| 2,518,281 A | 8/1950 | Camp et al. |
| 2,619,776 A | 12/1952 | Potters |
| 2,624,298 A | 1/1953 | Farren |
| 2,645,576 A | 7/1953 | Bate et al. |
| 2,676,892 A | 4/1954 | McLaughlin |
| 2,694,025 A | 11/1954 | Slayter et al. |
| 2,724,872 A | 11/1955 | Herbes |
| 2,746,735 A | 5/1956 | Bradford |
| 2,762,619 A | 9/1956 | Booth |
| 2,782,018 A | 2/1957 | Bradford |
| 2,782,463 A | 2/1957 | Bergvall et al. |
| 2,797,201 A | 6/1957 | Veatch |
| 2,838,881 A | 6/1958 | Plum |
| 2,879,171 A | 3/1959 | Kullenberg |
| 2,880,101 A | 3/1959 | Torsten Ulfstedt |
| 2,928,143 A | 3/1960 | Newton |
| 2,945,326 A | 7/1960 | Wood et al. |
| 2,947,115 A | 8/1960 | Wood et al. |
| 2,978,339 A | 4/1961 | Veatch |
| 2,978,340 A | 4/1961 | Veatch |
| 2,987,408 A | 6/1961 | Minnick |
| 2,997,403 A | 8/1961 | Searight |
| 3,010,177 A | 11/1961 | Thompson |
| 3,046,700 A | 7/1962 | Davenport |
| 3,047,985 A | 8/1962 | Murphy |
| 3,081,179 A | 3/1963 | Charvat et al. |
| 3,106,503 A | 10/1963 | Frobisher et al. |
| 3,150,947 A | 9/1964 | Bland |
| 3,173,229 A | 3/1965 | Weber |
| 3,181,662 A | 5/1965 | Maertzig, Jr. |
| 3,214,876 A | 11/1965 | Mattes |
| 3,215,505 A | 11/1965 | Schmalfeld et al. |
| 3,235,039 A | 2/1966 | O'Donnell |
| 3,236,932 A | 2/1966 | Grigas et al. |
| 3,256,105 A | 6/1966 | Alford |
| 3,264,125 A | 8/1966 | Bourline |
| 3,274,743 A | 9/1966 | Blum, Jr. |
| 3,279,905 A | 10/1966 | Wood et al. |
| 3,284,980 A | 11/1966 | Dinkel |
| 3,293,014 A | 12/1966 | Callendar et al. |
| 3,297,411 A | 1/1967 | Dear |
| 3,321,414 A | 5/1967 | Vieli |
| 3,333,379 A | 8/1967 | Harris |
| 3,336,710 A | 8/1967 | Raynes |
| 3,341,314 A | 9/1967 | Vukasovich et al. |
| 3,348,956 A | 10/1967 | Ekdahl |
| 3,360,392 A | 12/1967 | Mod et al. |
| 3,365,315 A | 1/1968 | Beck et al. |
| 3,408,786 A | 11/1968 | Snyker |
| 3,415,019 A | 12/1968 | Andersen |
| 3,416,275 A | 12/1968 | Van Loghem et al. |
| 3,421,281 A | 1/1969 | Harris |
| 3,481,093 A | 12/1969 | Davidson |
| 3,495,961 A | 2/1970 | Brotheis |
| 3,501,324 A | 3/1970 | Kubo |
| 3,503,165 A | 3/1970 | Hardt |
| 3,527,004 A | 9/1970 | Sorenson |
| 3,560,185 A | 2/1971 | Nylander |
| 3,560,186 A | 2/1971 | Nylander |
| 3,574,113 A | 4/1971 | Shannon |
| 3,582,377 A | 6/1971 | Hays et al. |
| 3,606,720 A | 9/1971 | Cookson |
| 3,616,173 A | 10/1971 | Green et al. |
| 3,625,808 A | 12/1971 | Martin |
| 3,634,567 A | 1/1972 | Yang |
| 3,635,742 A | 1/1972 | Fujimasu et al. |
| 3,660,955 A | 5/1972 | Simon et al. |
| 3,663,341 A | 5/1972 | Veneziale, Jr. |
| 3,663,353 A | 5/1972 | Long et al. |
| 3,679,446 A | 7/1972 | Kubo |
| 3,703,795 A | 11/1972 | Mattes |
| 3,708,943 A | 1/1973 | Thomas et al. |
| 3,716,386 A | 2/1973 | Kempster |
| 3,729,368 A | 4/1973 | Ingham et al. |
| 3,736,162 A | 5/1973 | Chvalovsky et al. |
| 3,748,100 A | 7/1973 | Forseth |
| 3,748,160 A | 7/1973 | Carbajal |
| 3,752,685 A | 8/1973 | Honda et al. |
| 3,753,749 A | 8/1973 | Nutt |
| 3,754,365 A | 8/1973 | Carrick et al. |
| 3,780,483 A | 12/1973 | Mattes |
| 3,782,985 A | 1/1974 | Gebhardt |
| 3,797,179 A | 3/1974 | Jackson |
| 3,797,190 A | 3/1974 | Widdowson |
| 3,804,058 A | 4/1974 | Messenger |
| 3,818,668 A | 6/1974 | Charniga |
| 3,835,604 A | 9/1974 | Hoffmann, Jr. |
| 3,836,412 A | 9/1974 | Boustany et al. |
| 3,838,998 A | 10/1974 | Matthews et al. |
| 3,843,380 A | 10/1974 | Beyn |
| 3,847,633 A | 11/1974 | Race |
| 3,865,779 A | 2/1975 | Oya et al. |
| 3,866,378 A | 2/1975 | Kessler |
| 3,869,295 A | 3/1975 | Bowles et al. |
| 3,873,025 A | 3/1975 | Qvarnstrom |
| 3,873,475 A | 3/1975 | Pechacek et al. |
| 3,877,918 A | 4/1975 | Cerbo |
| 3,887,386 A | 6/1975 | Majumdar |
| 3,888,617 A | 6/1975 | Barnett |
| 3,888,957 A | 6/1975 | Netting et al. |
| 3,902,911 A | 9/1975 | Messenger |
| 3,904,377 A | 9/1975 | Honda et al. |
| 3,904,424 A | 9/1975 | Aoki et al. |
| 3,909,283 A | 9/1975 | Warnke |
| 3,918,981 A | 11/1975 | Long |
| 3,921,346 A | 11/1975 | Sauer et al. |
| 3,924,901 A | 12/1975 | Phillips |
| 3,928,701 A | 12/1975 | Roehner |
| 3,931,069 A | 1/1976 | Lundin |
| 3,932,275 A | 1/1976 | Mewes et al. |
| 3,935,364 A | 1/1976 | Proksch et al. |

| | | |
|---|---|---|
| 3,954,390 A | 5/1976 | Akhundov et al. |
| 3,965,633 A | 6/1976 | Carroll |
| 3,969,567 A | 7/1976 | Occleshaw et al. |
| 3,974,024 A | 8/1976 | Yano et al. |
| 3,986,312 A | 10/1976 | Calhoun et al. |
| 3,992,845 A | 11/1976 | Grzesiek et al. |
| 3,998,651 A | 12/1976 | Baudouin et al. |
| 3,998,944 A | 12/1976 | Long |
| 4,002,482 A | 1/1977 | Coenen |
| 4,003,752 A | 1/1977 | Isohata et al. |
| 4,009,135 A | 2/1977 | Harreus et al. |
| 4,010,587 A | 3/1977 | Larsen |
| 4,010,589 A | 3/1977 | Gross et al. |
| 4,013,480 A | 3/1977 | Chumbley et al. |
| 4,015,392 A | 4/1977 | Eaton |
| 4,028,859 A | 6/1977 | Bellagamba et al. |
| 4,034,528 A | 7/1977 | Sanders et al. |
| 4,040,851 A | 8/1977 | Ziegler |
| 4,046,548 A | 9/1977 | Wood et al. |
| 4,047,355 A | 9/1977 | Knorr |
| 4,052,220 A | 10/1977 | Turpin, Jr. |
| 4,052,829 A | 10/1977 | Chapman |
| 4,057,908 A | 11/1977 | Mirliss et al. |
| 4,058,944 A | 11/1977 | Rieger et al. |
| 4,059,423 A | 11/1977 | De Vos |
| 4,063,393 A | 12/1977 | Toti |
| 4,065,899 A | 1/1978 | Kirkhuff |
| 4,066,723 A | 1/1978 | King et al. |
| 4,070,199 A | 1/1978 | Downing et al. |
| 4,070,843 A | 1/1978 | Leggiere et al. |
| 4,076,884 A | 2/1978 | Riley et al. |
| 4,079,562 A | 3/1978 | Englert et al. |
| 4,088,804 A | 5/1978 | Cornwell et al. |
| 4,098,701 A | 7/1978 | Burrill et al. |
| 4,101,335 A | 7/1978 | Barrable |
| 4,102,106 A | 7/1978 | Golder et al. |
| 4,102,697 A | 7/1978 | Fukuba et al. |
| 4,102,773 A | 7/1978 | Green et al. |
| 4,104,103 A | 8/1978 | Tarullo |
| 4,104,840 A | 8/1978 | Heintz et al. |
| 4,110,507 A | 8/1978 | Colledge |
| 4,111,713 A | 9/1978 | Beck |
| 4,112,647 A | 9/1978 | Scheid |
| 4,118,236 A | 10/1978 | Erskine |
| 4,128,696 A | 12/1978 | Goebel et al. |
| 4,131,480 A | 12/1978 | McCurrich et al. |
| 4,131,638 A | 12/1978 | Whitaker et al. |
| 4,132,555 A | 1/1979 | Barrable |
| 4,133,854 A | 1/1979 | Hendricks |
| 4,133,928 A | 1/1979 | Riley et al. |
| 4,134,773 A | 1/1979 | Simeonov et al. |
| 4,138,313 A | 2/1979 | Hillstrom et al. |
| 4,144,121 A | 3/1979 | Otouma et al. |
| 4,150,517 A | 4/1979 | Warner, Sr. |
| 4,152,878 A | 5/1979 | Balinski |
| 4,153,439 A | 5/1979 | Tomic et al. |
| 4,161,389 A | 7/1979 | Staffin et al. |
| 4,162,924 A | 7/1979 | Kubo et al. |
| 4,166,749 A | 9/1979 | Sterrett et al. |
| 4,177,176 A | 12/1979 | Burrill et al. |
| 4,183,188 A | 1/1980 | Goldsby |
| 4,184,906 A | 1/1980 | Young |
| 4,187,658 A | 2/1980 | Reinwall, Jr. |
| 4,188,231 A | 2/1980 | Valore |
| 4,203,788 A | 5/1980 | Clear |
| 4,204,644 A | 5/1980 | Kozuka |
| 4,205,992 A | 6/1980 | Mogensen et al. |
| 4,211,525 A | 7/1980 | Vetter et al. |
| 4,217,335 A | 8/1980 | Sasaki et al. |
| 4,222,785 A | 9/1980 | Henderson |
| 4,225,383 A | 9/1980 | McReynolds |
| 4,226,841 A | 10/1980 | Komeya et al. |
| 4,231,573 A | 11/1980 | Kelly |
| 4,234,344 A | 11/1980 | Tinsley et al. |
| 4,235,753 A | 11/1980 | Brown et al. |
| 4,235,836 A | 11/1980 | Wassell et al. |
| 4,240,840 A | 12/1980 | Downing et al. |
| 4,243,421 A | 1/1981 | Kume |
| 4,250,134 A | 2/1981 | Minnick |
| 4,252,193 A | 2/1981 | Powers et al. |
| 4,256,504 A | 3/1981 | Dunstan, Jr. |
| 4,256,584 A | 3/1981 | Lord et al. |
| 4,258,090 A | 3/1981 | Moraru |
| 4,261,286 A | 4/1981 | Kupfer |
| 4,261,754 A | 4/1981 | Krenchel et al. |
| 4,265,674 A | 5/1981 | Debus et al. |
| 4,268,316 A | 5/1981 | Wills, Jr. |
| 4,268,317 A | 5/1981 | Rayl |
| 4,274,239 A | 6/1981 | Carroll |
| 4,274,913 A | 6/1981 | Kikuiri et al. |
| 4,292,206 A | 9/1981 | Barnes, Jr. et al. |
| 4,292,364 A | 9/1981 | Wesch et al. |
| 4,295,907 A | 10/1981 | Cordts et al. |
| 4,298,413 A | 11/1981 | Teare |
| 4,298,647 A | 11/1981 | Cancio et al. |
| 4,303,732 A | 12/1981 | Torobin |
| 4,304,604 A | 12/1981 | Daerr et al. |
| 4,305,758 A | 12/1981 | Powers et al. |
| 4,306,911 A | 12/1981 | Gordon et al. |
| 4,307,142 A | 12/1981 | Blitstein et al. |
| 4,307,551 A | 12/1981 | Crandell |
| 4,321,780 A | 3/1982 | Hooper et al. |
| 4,327,528 A | 5/1982 | Fritz |
| 4,328,145 A | 5/1982 | Bobrowski et al. |
| 4,330,634 A | 5/1982 | Rodaway |
| 4,332,618 A | 6/1982 | Ballard |
| 4,336,338 A | 6/1982 | Downs et al. |
| 4,337,290 A | 6/1982 | Kelly et al. |
| 4,339,289 A | 7/1982 | Lankard |
| 4,339,489 A | 7/1982 | Barker et al. |
| 4,340,407 A | 7/1982 | Anderson et al. |
| 4,343,127 A | 8/1982 | Greve et al. |
| 4,344,804 A | 8/1982 | Bijen et al. |
| 4,347,155 A | 8/1982 | Jenkins |
| 4,350,567 A | 9/1982 | Moorehead |
| 4,351,867 A | 9/1982 | Mulvey et al. |
| 4,357,271 A | 11/1982 | Rosenquist |
| 4,361,616 A | 11/1982 | Bomers et al. |
| 4,362,566 A | 12/1982 | Hinterwaldner |
| 4,363,878 A | 12/1982 | Yamamoto et al. |
| 4,366,657 A | 1/1983 | Hopman |
| 4,370,166 A | 1/1983 | Powers et al. |
| 4,373,955 A | 2/1983 | Bouchard et al. |
| 4,373,957 A | 2/1983 | Pedersen et al. |
| 4,374,672 A | 2/1983 | Funston et al. |
| 4,375,489 A | 3/1983 | Muszynski |
| 4,377,977 A | 3/1983 | Wurster |
| 4,379,553 A | 4/1983 | Kelly |
| 4,379,729 A | 4/1983 | Cross |
| 4,380,564 A | 4/1983 | Cancio et al. |
| 4,383,960 A | 5/1983 | Delcoigne et al. |
| 4,388,257 A | 6/1983 | Oguri et al. |
| 4,392,336 A | 7/1983 | Ganssle |
| 4,394,175 A | 7/1983 | Cheriton et al. |
| 4,394,346 A | 7/1983 | Morooka |
| 4,399,643 A | 8/1983 | Hafner et al. |
| 4,403,006 A | 9/1983 | Bruce et al. |
| 4,406,703 A | 9/1983 | Guthrie et al. |
| 4,411,723 A | 10/1983 | Takeuchi |
| 4,411,847 A | 10/1983 | Netting et al. |
| 4,420,351 A | 12/1983 | Lussi et al. |
| 4,424,261 A | 1/1984 | Keeling et al. |
| 4,428,775 A | 1/1984 | Johnson et al. |
| 4,429,214 A | 1/1984 | Brindley et al. |
| 4,430,108 A | 2/1984 | Hojaji |
| 4,441,944 A | 4/1984 | Massey |
| 4,442,219 A | 4/1984 | TenEyck et al. |
| 4,448,599 A | 5/1984 | Mackenzie et al. |
| 4,450,022 A | 5/1984 | Galer |
| 4,457,785 A | 7/1984 | Hsu et al. |
| 4,462,730 A | 7/1984 | Knohl |
| 4,462,835 A | 7/1984 | Car |
| 4,463,532 A | 8/1984 | Faw |
| 4,465,729 A | 8/1984 | Cancio et al. |
| 4,475,936 A | 10/1984 | Aston et al. |
| 4,478,736 A | 10/1984 | Raba et al. |
| 4,486,234 A | 12/1984 | Herr |
| 4,487,620 A | 12/1984 | Neusy |

| | | | | | | |
|---|---|---|---|---|---|---|
| 4,495,301 A | 1/1985 | Suter | | 4,779,313 A | 10/1988 | Gonas |
| 4,497,688 A | 2/1985 | Schaefer | | 4,780,141 A | 10/1988 | Double et al. |
| 4,498,913 A | 2/1985 | Tank et al. | | 4,784,839 A | 11/1988 | Bachelard et al. |
| 4,501,830 A | 2/1985 | Miller et al. | | 4,789,604 A | 12/1988 | van der Hoeven et al. |
| 4,502,256 A | 3/1985 | Hahn et al. | | 4,793,861 A | 12/1988 | Sohm et al. |
| 4,504,320 A | 3/1985 | Rizer et al. | | 4,797,161 A | 1/1989 | Kirchmayr et al. |
| 4,504,335 A | 3/1985 | Galer | | 4,803,105 A | 2/1989 | Kretow et al. |
| 4,506,486 A | 3/1985 | Culpepper, Jr. et al. | | 4,806,203 A | 2/1989 | Elton |
| 4,507,154 A | 3/1985 | Burge et al. | | 4,808,229 A | 2/1989 | Arhelger |
| 4,510,020 A | 4/1985 | Green et al. | | 4,811,538 A | 3/1989 | Lehnert et al. |
| 4,512,736 A | 4/1985 | Wader | | 4,816,091 A | 3/1989 | Miller et al. |
| 4,514,947 A | 5/1985 | Grail | | 4,818,289 A | 4/1989 | Mantymaki |
| 4,517,375 A | 5/1985 | Schmidt | | 4,818,290 A | 4/1989 | Tuovinen |
| 4,519,777 A | 5/1985 | Akhtyamov | | 4,818,595 A | 4/1989 | Ellis |
| 4,528,307 A | 7/1985 | Fuhr et al. | | 4,819,289 A | 4/1989 | Gibbs |
| 4,538,530 A | 9/1985 | Whitman | | 4,826,788 A | 5/1989 | Dennert et al. |
| 4,540,629 A | 9/1985 | Sands et al. | | 4,827,621 A | 5/1989 | Borsuk |
| 4,543,159 A | 9/1985 | Johnson et al. | | 4,830,989 A | 5/1989 | Trivedi et al. |
| 4,548,676 A | 10/1985 | Johnstone et al. | | 4,837,069 A | 6/1989 | Bescup et al. |
| 4,553,366 A | 11/1985 | Guerin et al. | | 4,840,672 A | 6/1989 | Baes |
| 4,559,894 A | 12/1985 | Thompson | | 4,840,688 A | 6/1989 | Vogt |
| 4,574,012 A | 3/1986 | Oguri et al. | | 4,841,702 A | 6/1989 | Huettemann |
| 4,576,736 A | 3/1986 | Harmuth | | 4,841,705 A | 6/1989 | Fuhrer |
| 4,586,304 A | 5/1986 | Flamand et al. | | 4,842,649 A | 6/1989 | Heitzmann et al. |
| 4,588,443 A | 5/1986 | Bache et al. | | 4,846,889 A | 7/1989 | Meyer |
| 4,590,884 A | 5/1986 | Kreeger et al. | | 4,851,203 A | 7/1989 | Bachelard et al. |
| 4,592,185 A | 6/1986 | Lynch et al. | | 4,854,101 A | 8/1989 | Champagne |
| 4,595,662 A | 6/1986 | Mochida et al. | | 4,858,402 A | 8/1989 | Putz et al. |
| 4,602,962 A | 7/1986 | Fehlmann | | 4,866,896 A | 9/1989 | Shreiner et al. |
| 4,621,024 A | 11/1986 | Wright | | 4,867,931 A | 9/1989 | Cochran, Jr. |
| 4,623,390 A | 11/1986 | Delmonico | | 4,870,788 A | 10/1989 | Hassan et al. |
| 4,624,798 A | 11/1986 | Gindrup et al. | | 4,871,380 A | 10/1989 | Meyers |
| 4,626,398 A | 12/1986 | Vetter et al. | | 4,871,495 A | 10/1989 | Helferich et al. |
| 4,629,413 A | 12/1986 | Michelson | | 4,876,827 A | 10/1989 | Williams et al. |
| 4,637,860 A | 1/1987 | Harper et al. | | 4,882,302 A | 11/1989 | Horiuchi et al. |
| 4,637,990 A | 1/1987 | Torobin et al. | | 4,888,057 A | 12/1989 | Nguyen et al. |
| 4,640,715 A | 2/1987 | Heitzmann et al. | | 4,894,081 A | 1/1990 | Neusy |
| 4,641,469 A | 2/1987 | Wood | | 4,895,598 A | 1/1990 | Hedberg et al. |
| 4,642,137 A | 2/1987 | Heitzmann et al. | | 4,904,292 A | 2/1990 | Neusy |
| 4,643,753 A | 2/1987 | Braun | | 4,904,503 A | 2/1990 | Hilton et al. |
| 4,643,920 A | 2/1987 | McEntee et al. | | 4,906,408 A | 3/1990 | Bouniol et al. |
| 4,647,505 A | 3/1987 | Blackie et al. | | 4,910,047 A | 3/1990 | Barnett et al. |
| 4,647,509 A | 3/1987 | Wallace et al. | | 4,914,885 A | 4/1990 | Baker et al. |
| 4,647,589 A | 3/1987 | Valone | | 4,915,740 A | 4/1990 | Sakai et al. |
| 4,652,433 A | 3/1987 | Ashworth et al. | | 4,924,644 A | 5/1990 | Lewis |
| 4,652,535 A | 3/1987 | Mackenzie et al. | | 4,927,696 A | 5/1990 | Berg et al. |
| 4,655,979 A | 4/1987 | Nakano et al. | | 4,928,479 A | 5/1990 | Shekleton et al. |
| 4,657,810 A | 4/1987 | Douden | | 4,930,287 A | 6/1990 | Volk et al. |
| 4,659,386 A | 4/1987 | Nagai et al. | | 4,933,013 A | 6/1990 | Sakai et al. |
| 4,659,679 A | 4/1987 | Falk | | 4,933,031 A | 6/1990 | Blomberg et al. |
| 4,661,137 A | 4/1987 | Garnier et al. | | 4,935,060 A | 6/1990 | Dingsoyr |
| 4,661,398 A | 4/1987 | Ellis | | 4,937,210 A | 6/1990 | Jones et al. |
| 4,670,079 A | 6/1987 | Thompson | | 4,937,993 A | 7/1990 | Hitchins et al. |
| 4,673,659 A | 6/1987 | Wood et al. | | 4,938,958 A | 7/1990 | Niira et al. |
| 4,677,022 A | 6/1987 | Dejaiffe | | 4,944,842 A | 7/1990 | Stromberg et al. |
| 4,680,059 A | 7/1987 | Cook et al. | | 4,946,505 A | 8/1990 | Jungk |
| 4,685,263 A | 8/1987 | Ting | | 4,946,811 A | 8/1990 | Tuovinen et al. |
| 4,687,752 A | 8/1987 | Peters | | 4,952,631 A | 8/1990 | McAlpin et al. |
| 4,689,084 A | 8/1987 | Ambroise et al. | | 4,955,169 A | 9/1990 | Shisko et al. |
| 4,698,942 A | 10/1987 | Swartz | | 4,963,430 A | 10/1990 | Kish et al. |
| 4,721,160 A | 1/1988 | Parcevaux et al. | | 4,969,250 A | 11/1990 | Hickman et al. |
| 4,723,505 A | 2/1988 | Wilson et al. | | 4,969,302 A | 11/1990 | Coggan et al. |
| 4,730,398 A | 3/1988 | Stanton | | 4,971,658 A | 11/1990 | Henricson et al. |
| 4,737,191 A | 4/1988 | Meynardi et al. | | 4,975,396 A | 12/1990 | Thiery et al. |
| 4,738,723 A | 4/1988 | Frizzell et al. | | 4,981,666 A | 1/1991 | Yamada et al. |
| 4,746,364 A | 5/1988 | Kawai et al. | | 4,981,740 A | 1/1991 | Larsen |
| 4,748,771 A | 6/1988 | Lehnert et al. | | 4,983,550 A | 1/1991 | Goetz et al. |
| 4,749,398 A | 6/1988 | Braun | | 4,985,119 A | 1/1991 | Vinson et al. |
| 4,751,202 A | 6/1988 | Toussaint et al. | | 4,994,113 A | 2/1991 | Helmstetter |
| 4,751,203 A | 6/1988 | Toussaint et al. | | 4,995,605 A | 2/1991 | Conville |
| 4,752,061 A | 6/1988 | Dalton et al. | | 4,999,056 A | 3/1991 | Rasmussen et al. |
| 4,759,802 A | 7/1988 | Ochi et al. | | 5,002,696 A | 3/1991 | White |
| 4,766,113 A | 8/1988 | West et al. | | 5,009,713 A | 4/1991 | Sakuta et al. |
| 4,767,491 A | 8/1988 | Vittone et al. | | 5,017,232 A | 5/1991 | Miceli |
| 4,767,726 A | 8/1988 | Marshall | | 5,018,909 A | 5/1991 | Crum et al. |
| 4,769,189 A | 9/1988 | Douden | | 5,021,093 A | 6/1991 | Beshay |
| 4,770,831 A | 9/1988 | Walker et al. | | 5,022,207 A | 6/1991 | Hartnett |
| 4,772,328 A | 9/1988 | Pfeifer | | 5,022,897 A | 6/1991 | Balcar et al. |
| 4,775,505 A | 10/1988 | Kuroda et al. | | 5,029,425 A | 7/1991 | Bogataj |

| Patent | Date | Name |
|---|---|---|
| 5,030,287 A | 7/1991 | Magnani |
| 5,030,289 A | 7/1991 | Sattler et al. |
| 5,032,548 A | 7/1991 | Lowe |
| 5,035,920 A | 7/1991 | Smrt et al. |
| 5,045,378 A | 9/1991 | Libby |
| 5,047,086 A | 9/1991 | Hayakawa et al. |
| 5,049,196 A | 9/1991 | Ries |
| 5,063,260 A | 11/1991 | Chen et al. |
| 5,064,784 A | 11/1991 | Saito et al. |
| 5,067,675 A | 11/1991 | Brant et al. |
| D322,678 S | 12/1991 | Brathwaite et al. |
| 5,069,702 A | 12/1991 | Block et al. |
| 5,073,197 A | 12/1991 | Majumdar et al. |
| 5,076,986 A | 12/1991 | Delvaux et al. |
| 5,077,241 A | 12/1991 | Moh et al. |
| 5,077,952 A | 1/1992 | Moore |
| 5,080,022 A | 1/1992 | Carlson |
| 5,096,858 A | 3/1992 | Das Chaklader et al. |
| 5,099,923 A | 3/1992 | Aften et al. |
| 5,102,596 A | 4/1992 | Lempfer et al. |
| 5,106,557 A | 4/1992 | Rirsch et al. |
| 5,108,510 A | 4/1992 | Burge et al. |
| 5,108,679 A | 4/1992 | Rirsch et al. |
| 5,112,405 A | 5/1992 | Sanchez |
| 5,114,617 A | 5/1992 | Smetana |
| 5,115,621 A | 5/1992 | Kobayashi |
| 5,117,600 A | 6/1992 | Yerushalmi et al. |
| 5,117,770 A | 6/1992 | Hassinen |
| 5,118,225 A | 6/1992 | Koch et al. |
| 5,128,114 A | 7/1992 | Schwartz |
| 5,143,534 A | 9/1992 | Kilner et al. |
| 5,143,780 A | 9/1992 | Balassa |
| 5,154,596 A | 10/1992 | Schwartz et al. |
| 5,154,771 A | 10/1992 | Wada et al. |
| 5,155,958 A | 10/1992 | Huff |
| 5,162,060 A | 11/1992 | Bredow et al. |
| 5,164,003 A | 11/1992 | Bosco et al. |
| 5,164,345 A | 11/1992 | Rice et al. |
| 5,167,710 A | 12/1992 | Leroux et al. |
| 5,169,558 A | 12/1992 | Smrt et al. |
| 5,174,821 A | 12/1992 | Matsuoka et al. |
| 5,176,732 A | 1/1993 | Block et al. |
| 5,177,305 A | 1/1993 | Pichat et al. |
| 5,190,737 A | 3/1993 | Weimer et al. |
| 5,191,456 A | 3/1993 | Sutherland et al. |
| 5,192,366 A | 3/1993 | Nishioka et al. |
| 5,194,334 A | 3/1993 | Uerdingen et al. |
| 5,198,052 A | 3/1993 | Ali |
| 5,198,275 A | 3/1993 | Klein |
| 5,210,989 A | 5/1993 | Jakel |
| 5,217,928 A | 6/1993 | Goetz et al. |
| 5,220,762 A | 6/1993 | Lehnert et al. |
| 5,223,090 A | 6/1993 | Klungness et al. |
| 5,226,274 A | 7/1993 | Sommerstein et al. |
| 5,229,437 A | 7/1993 | Knight |
| 5,232,497 A | 8/1993 | Dillenbeck |
| 5,234,754 A | 8/1993 | Bache |
| 5,236,773 A | 8/1993 | Sorathia et al. |
| 5,236,994 A | 8/1993 | Markusch et al. |
| D339,642 S | 9/1993 | Blazley et al. |
| 5,242,736 A | 9/1993 | Van Erden et al. |
| 5,244,318 A | 9/1993 | Arai et al. |
| 5,245,811 A | 9/1993 | Knorr |
| 5,247,773 A | 9/1993 | Weir |
| 5,252,526 A | 10/1993 | Whittemore |
| 5,253,991 A | 10/1993 | Yokota et al. |
| 5,254,228 A | 10/1993 | Westhof et al. |
| 5,256,180 A | 10/1993 | Garnier et al. |
| 5,256,349 A | 10/1993 | Sato et al. |
| 5,259,872 A | 11/1993 | Shinozaki et al. |
| 5,268,226 A | 12/1993 | Sweeney |
| 5,281,271 A | 1/1994 | Govani et al. |
| 5,282,317 A | 2/1994 | Carter et al. |
| 5,290,355 A | 3/1994 | Jakel |
| 5,292,690 A | 3/1994 | Kawachi et al. |
| 5,294,255 A | 3/1994 | Smetana et al. |
| 5,297,370 A | 3/1994 | Greenstreet et al. |
| 5,301,484 A | 4/1994 | Jansson et al. |
| 5,305,568 A | 4/1994 | Beckerman |
| 5,305,577 A | 4/1994 | Richards et al. |
| 5,312,858 A | 5/1994 | Folsom |
| 5,314,119 A | 5/1994 | Watt |
| 5,319,245 A | 6/1994 | Chen et al. |
| 5,319,909 A | 6/1994 | Singleterry |
| 5,323,581 A | 6/1994 | Jakel |
| 5,330,573 A | 7/1994 | Nakano et al. |
| 5,334,242 A | 8/1994 | O'Toole |
| 5,338,349 A | 8/1994 | Farrar |
| 5,338,357 A | 8/1994 | Takai et al. |
| 5,342,485 A | 8/1994 | Armbrust, Jr. |
| 5,342,530 A | 8/1994 | Aften et al. |
| 5,346,012 A | 9/1994 | Heathman et al. |
| 5,346,541 A | 9/1994 | Goldman et al. |
| 5,349,118 A | 9/1994 | Davidovits |
| 5,349,802 A | 9/1994 | Kariniemi |
| 5,352,288 A | 10/1994 | Mallow |
| 5,352,290 A | 10/1994 | Takeshita et al. |
| 5,358,676 A | 10/1994 | Jennings et al. |
| 5,366,637 A | 11/1994 | Turunc |
| 5,369,924 A | 12/1994 | Neudorf et al. |
| 5,372,678 A | 12/1994 | Sagstetter et al. |
| 5,378,279 A | 1/1995 | Conroy et al. |
| 5,383,521 A | 1/1995 | Onan et al. |
| 5,383,967 A | 1/1995 | Chase |
| 5,384,345 A | 1/1995 | Naton |
| 5,385,764 A | 1/1995 | Andersen et al. |
| 5,387,282 A | 2/1995 | Jakel |
| 5,387,283 A | 2/1995 | Kirkpatrick et al. |
| 5,387,626 A | 2/1995 | Bohme-Kovac et al. |
| 5,391,245 A | 2/1995 | Turner |
| 5,394,672 A | 3/1995 | Seem |
| 5,395,672 A | 3/1995 | Pingaud et al. |
| 5,395,685 A | 3/1995 | Seth et al. |
| 5,397,631 A | 3/1995 | Green et al. |
| 5,403,392 A | 4/1995 | Craig |
| 5,403,394 A | 4/1995 | Burgand |
| 5,405,498 A | 4/1995 | Pease |
| 5,407,983 A | 4/1995 | Naton |
| 5,410,852 A | 5/1995 | Edgar et al. |
| 5,415,734 A | 5/1995 | Backlund et al. |
| 5,421,867 A | 6/1995 | Yeager et al. |
| 5,425,985 A | 6/1995 | Irvin |
| 5,425,986 A | 6/1995 | Guyette |
| 5,428,931 A | 7/1995 | Ragsdale |
| 5,429,717 A | 7/1995 | Bokstrom et al. |
| 5,432,212 A | 7/1995 | Honda et al. |
| 5,432,215 A | 7/1995 | Girg et al. |
| 5,437,934 A | 8/1995 | Witt et al. |
| 5,439,518 A | 8/1995 | Francis et al. |
| 5,443,603 A | 8/1995 | Kirkendall |
| 5,447,798 A | 9/1995 | Kamaishi et al. |
| 5,453,123 A | 9/1995 | Burge et al. |
| 5,453,310 A | 9/1995 | Andersen et al. |
| 5,455,212 A | 10/1995 | Das Chaklader et al. |
| 5,458,973 A | 10/1995 | Jeffs |
| 5,461,839 A | 10/1995 | Beck |
| 5,465,547 A | 11/1995 | Jakel |
| 5,470,383 A | 11/1995 | Schermann et al. |
| 5,472,486 A | 12/1995 | Dragner et al. |
| 5,475,961 A | 12/1995 | Menchetti |
| 5,477,617 A | 12/1995 | Guy |
| 5,482,550 A | 1/1996 | Strait |
| 5,482,551 A | 1/1996 | Morris et al. |
| 5,484,480 A | 1/1996 | Styron |
| 5,490,889 A | 2/1996 | Kirkpatrick et al. |
| 5,501,050 A | 3/1996 | Ruel et al. |
| 5,508,072 A | 4/1996 | Andersen et al. |
| 5,511,316 A | 4/1996 | Fischer et al. |
| 5,517,795 A | 5/1996 | Doke |
| 5,520,779 A | 5/1996 | Bold |
| 5,522,926 A | 6/1996 | Richard et al. |
| 5,522,986 A | 6/1996 | Shi et al. |
| 5,525,556 A | 6/1996 | Dunmead et al. |
| 5,526,627 A | 6/1996 | Beck |
| 5,531,824 A | 7/1996 | Burkes et al. |
| 5,534,348 A | 7/1996 | Miller et al. |
| 5,536,310 A | 7/1996 | Brook et al. |
| 5,545,297 A | 8/1996 | Andersen et al. |

| | | | | | | |
|---|---|---|---|---|---|---|
| 5,547,505 A | 8/1996 | Nakatsu et al. | 5,817,262 A | 10/1998 | Englert | |
| 5,549,859 A | 8/1996 | Andersen et al. | 5,820,668 A | 10/1998 | Comrie | |
| 5,556,458 A | 9/1996 | Brook et al. | 5,842,280 A | 12/1998 | Robell | |
| 5,557,903 A | 9/1996 | Haddock | 5,848,508 A | 12/1998 | Albrecht | |
| 5,558,710 A | 9/1996 | Baig | 5,848,509 A | 12/1998 | Knapp et al. | |
| 5,558,822 A | 9/1996 | Gitman et al. | 5,849,055 A | 12/1998 | Aria et al. | |
| 5,559,170 A | 9/1996 | Castle | 5,851,607 A | 12/1998 | Horinka et al. | |
| 5,561,173 A | 10/1996 | Dry | 5,853,475 A | 12/1998 | Liskowitz et al. | |
| 5,562,832 A | 10/1996 | McOnie et al. | 5,857,303 A | 1/1999 | Beck et al. | |
| 5,564,233 A | 10/1996 | Norton | 5,858,083 A | 1/1999 | Stav et al. | |
| 5,564,245 A | 10/1996 | Rademacher | 5,863,477 A | 1/1999 | Kawai | |
| 5,565,026 A | 10/1996 | Hense et al. | 5,866,057 A | 2/1999 | Roffael | |
| 5,577,024 A | 11/1996 | Malkamaki et al. | 5,871,824 A | 2/1999 | Bates | |
| 5,580,378 A | 12/1996 | Shulman | 5,876,561 A | 3/1999 | Tsai | |
| 5,580,409 A | 12/1996 | Andersen et al. | 5,878,543 A | 3/1999 | Mowery | |
| 5,580,508 A | 12/1996 | Kobayashi et al. | 5,883,029 A | 3/1999 | Castle | |
| 5,580,907 A | 12/1996 | Savin | 5,887,403 A | 3/1999 | Beck | |
| 5,583,079 A | 12/1996 | Golitz et al. | 5,888,322 A | 3/1999 | Holland | |
| 5,591,684 A | 1/1997 | Kawachi et al. | 5,891,374 A | 4/1999 | Shah et al. | |
| RE35,460 E | 2/1997 | Klungness et al. | 5,891,516 A | 4/1999 | Gstrein et al. | |
| 5,598,671 A | 2/1997 | Ting | 5,895,768 A | 4/1999 | Speit | |
| 5,601,789 A | 2/1997 | Ruhl et al. | 5,897,701 A | 4/1999 | Soroushian et al. | |
| 5,603,758 A | 2/1997 | Schreifels, Jr. et al. | 5,899,256 A | 5/1999 | Rohatgi | |
| 5,609,833 A | 3/1997 | Ruhl et al. | 5,900,053 A | 5/1999 | Brothers et al. | |
| 5,611,833 A | 3/1997 | Brahmbhatt et al. | 5,916,095 A | 6/1999 | Tamlyn | |
| 5,611,883 A | 3/1997 | Tompkins et al. | 5,924,213 A | 7/1999 | Lee | |
| 5,617,690 A | 4/1997 | Gibbs | 5,925,449 A | 7/1999 | Davidovits | |
| 5,618,173 A | 4/1997 | Ruhl et al. | 5,928,777 A | 7/1999 | Cox et al. | |
| 5,622,556 A | 4/1997 | Shulman | 5,932,347 A | 8/1999 | Rapp et al. | |
| 5,631,097 A | 5/1997 | Anderson et al. | 5,935,699 A * | 8/1999 | Barber | 428/325 |
| 5,634,314 A | 6/1997 | Champagne | 5,945,044 A * | 8/1999 | Kawai et al. | 264/37.29 |
| 5,641,584 A | 6/1997 | Anderson et al. | 5,945,208 A | 8/1999 | Richards et al. | |
| 5,643,359 A | 7/1997 | Soroushian et al. | 5,946,870 A | 9/1999 | Bifano et al. | |
| 5,644,880 A | 7/1997 | Lehnert et al. | 5,946,876 A | 9/1999 | Grace, Sr. et al. | |
| 5,648,144 A | 7/1997 | Maurer et al. | 5,948,505 A | 9/1999 | Puppin | |
| 5,651,227 A | 7/1997 | Anderson | 5,950,319 A | 9/1999 | Harris | |
| 5,655,853 A | 8/1997 | Wormser | 5,967,211 A | 10/1999 | Lucas et al. | |
| 5,658,624 A | 8/1997 | Anderson et al. | 5,968,257 A | 10/1999 | Ahrens | |
| 5,658,656 A | 8/1997 | Whitney et al. | 5,979,135 A | 11/1999 | Reeves | |
| 5,661,939 A | 9/1997 | Coulis et al. | 5,987,838 A | 11/1999 | Beck | |
| 5,673,489 A | 10/1997 | Robell | 5,989,335 A | 11/1999 | Soroushian et al. | |
| 5,673,529 A | 10/1997 | Treister et al. | 5,997,630 A | 12/1999 | Angelskar et al. | |
| 5,675,955 A | 10/1997 | Champagne | 5,997,632 A | 12/1999 | Styron | |
| 5,676,536 A | 10/1997 | Ruhl et al. | 6,000,185 A | 12/1999 | Beck et al. | |
| 5,676,563 A | 10/1997 | Kondo et al. | 6,008,275 A | 12/1999 | Moreau et al. | |
| 5,681,384 A | 10/1997 | Liskowitz et al. | 6,012,255 A | 1/2000 | Smid et al. | |
| 5,692,345 A | 12/1997 | Mogaki et al. | 6,018,924 A | 2/2000 | Tamlyn | |
| 5,693,137 A | 12/1997 | Styron | 6,026,616 A | 2/2000 | Gibson | |
| 5,694,727 A | 12/1997 | Dobija | 6,027,330 A | 2/2000 | Lifshits | |
| 5,697,189 A | 12/1997 | Miller et al. | 6,029,415 A | 2/2000 | Culpepper et al. | |
| D388,884 S | 1/1998 | Karnoski | 6,030,447 A * | 2/2000 | Naji et al. | 106/718 |
| 5,705,542 A | 1/1998 | Roffael et al. | 6,034,155 A | 3/2000 | Espeland et al. | |
| 5,709,743 A | 1/1998 | Leture et al. | 6,045,057 A | 4/2000 | Moor et al. | |
| 5,714,002 A | 2/1998 | Styron | 6,045,871 A | 4/2000 | Matt et al. | |
| 5,718,758 A | 2/1998 | Breslauer | 6,046,269 A | 4/2000 | Nass et al. | |
| 5,718,759 A | 2/1998 | Stav et al. | 6,048,593 A | 4/2000 | Espeland et al. | |
| 5,718,943 A | 2/1998 | Hsu et al. | 6,049,987 A | 4/2000 | Robell | |
| 5,722,386 A | 3/1998 | Fladgard et al. | 6,055,787 A | 5/2000 | Gerhaher et al. | |
| 5,724,783 A | 3/1998 | Mandish | 6,063,856 A | 5/2000 | Mass | |
| 5,725,652 A | 3/1998 | Shulman | 6,077,327 A | 6/2000 | Hamayoshi et al. | |
| 5,728,458 A | 3/1998 | Sweeney | 6,079,175 A | 6/2000 | Clear | |
| 5,729,946 A | 3/1998 | Beck | 6,084,011 A | 7/2000 | Lucero et al. | |
| 5,732,520 A | 3/1998 | Maietta | 6,086,998 A | 7/2000 | Wihsmann et al. | |
| 5,735,092 A | 4/1998 | Clayton et al. | 6,093,473 A | 7/2000 | Min et al. | |
| 5,736,594 A | 4/1998 | Boles et al. | 6,096,388 A | 8/2000 | Bates et al. | |
| 5,736,602 A | 4/1998 | Crocker et al. | 6,105,888 A | 8/2000 | Goehner et al. | |
| 5,741,844 A | 4/1998 | Nass et al. | 6,110,525 A | 8/2000 | Stoddard | |
| 5,743,056 A | 4/1998 | Balla-Goddard et al. | 6,122,876 A | 9/2000 | Bado et al. | |
| 5,743,393 A | 4/1998 | Webb et al. | 6,122,877 A | 9/2000 | Hendrickson et al. | |
| 5,744,078 A | 4/1998 | Soroushian et al. | 6,134,855 A | 10/2000 | Beck | |
| 5,749,187 A | 5/1998 | Umehara et al. | 6,136,383 A | 10/2000 | Schwartz | |
| 5,768,841 A | 6/1998 | Swartz et al. | 6,138,430 A | 10/2000 | Van Acoleyen et al. | |
| 5,777,024 A | 7/1998 | Killilea | 6,139,620 A | 10/2000 | Suzuki et al. | |
| 5,786,282 A | 7/1998 | Carter et al. | 6,143,069 A | 11/2000 | Brothers et al. | |
| 5,791,109 A | 8/1998 | Lehnert et al. | 6,145,255 A | 11/2000 | Allaster | |
| 5,795,515 A | 8/1998 | Fischer | 6,159,281 A | 12/2000 | Uchida et al. | |
| 5,802,790 A | 9/1998 | Lamont et al. | 6,161,353 A | 12/2000 | Negola et al. | |
| 5,804,003 A | 9/1998 | Nishizawa | 6,161,354 A | 12/2000 | Gilbert et al. | |
| 5,817,230 A | 10/1998 | Groppo et al. | 6,162,511 A | 12/2000 | Garnett | |

| | | |
|---|---|---|
| 6,164,032 A | 12/2000 | Beck |
| 6,164,214 A | 12/2000 | Smorgon et al. |
| 6,170,212 B1 | 1/2001 | Suchyna et al. |
| 6,170,214 B1 | 1/2001 | Treister et al. |
| 6,170,215 B1 | 1/2001 | Nasi |
| 6,171,651 B1 | 1/2001 | Brown |
| 6,176,920 B1 | 1/2001 | Murphy et al. |
| 6,195,952 B1 | 3/2001 | Culpepper et al. |
| 6,204,214 B1 | 3/2001 | Singh et al. |
| 6,207,077 B1 | 3/2001 | Burnell-Jones |
| 6,214,309 B1 | 4/2001 | Shaw et al. |
| 6,226,947 B1 | 5/2001 | Bado et al. |
| 6,228,215 B1 | 5/2001 | Hoffman, Jr. |
| 6,245,196 B1 | 6/2001 | Martin et al. |
| 6,248,812 B1 | 6/2001 | Symons |
| 6,254,845 B1 | 7/2001 | Ohashi et al. |
| 6,254,981 B1 | 7/2001 | Castle |
| 6,258,456 B1 | 7/2001 | Meyer |
| 6,270,567 B1 | 8/2001 | Matsuo et al. |
| 6,276,107 B1 | 8/2001 | Waggoner et al. |
| 6,277,189 B1 | 8/2001 | Chugh |
| 6,290,769 B1 | 9/2001 | Carkner |
| 6,295,777 B1 | 10/2001 | Hunter et al. |
| 6,298,626 B2 | 10/2001 | Rudden |
| 6,308,486 B1 | 10/2001 | Medland et al. |
| 6,315,489 B1 | 11/2001 | Watanabe et al. |
| 6,316,087 B1 | 11/2001 | Lehan |
| 6,319,456 B1 | 11/2001 | Gilbert et al. |
| 6,324,807 B1 | 12/2001 | Ishiko et al. |
| 6,325,853 B1 | 12/2001 | Hogan et al. |
| 6,332,921 B1 | 12/2001 | Brothers et al. |
| 6,335,100 B1 | 1/2002 | Tominaga et al. |
| 6,344,654 B1 | 2/2002 | Lesko |
| 6,346,146 B1 | 2/2002 | Duselis et al. |
| 6,346,165 B1 | 2/2002 | Markessini et al. |
| 6,352,952 B1 | 3/2002 | Jardine et al. |
| 6,355,100 B1 | 3/2002 | Hamabe et al. |
| 6,357,193 B1 | 3/2002 | Morris |
| 6,360,563 B1 | 3/2002 | Gerhardt et al. |
| 6,365,081 B1 | 4/2002 | Beck |
| 6,367,208 B1 | 4/2002 | Campbell et al. |
| 6,367,220 B1 | 4/2002 | Krause et al. |
| 6,367,288 B1 | 4/2002 | Lindner et al. |
| 6,372,694 B1 | 4/2002 | Osinga et al. |
| 6,375,853 B1 | 4/2002 | Yoon |
| 6,387,175 B1 | 5/2002 | Lynn et al. |
| 6,387,302 B1 | 5/2002 | Konya et al. |
| 6,415,574 B2 | 7/2002 | Beck |
| 6,419,788 B1 | 7/2002 | Wingerson |
| 6,421,973 B1 | 7/2002 | Gregg et al. |
| 6,423,167 B1 | 7/2002 | Palmer et al. |
| 6,425,218 B1 | 7/2002 | Doyon et al. |
| 6,430,885 B1 | 8/2002 | Ito et al. |
| 6,432,212 B1 | 8/2002 | Hirose et al. |
| 6,436,485 B1 | 8/2002 | Sedlmeyr et al. |
| 6,444,162 B1 | 9/2002 | Anshits et al. |
| 6,444,316 B1 | 9/2002 | Reddy et al. |
| 6,461,988 B2 | 10/2002 | Budd et al. |
| 6,475,275 B1 | 11/2002 | Nebesnak et al. |
| 6,482,258 B2 | 11/2002 | Styron |
| 6,485,561 B1 | 11/2002 | Dattel |
| 6,486,084 B2 | 11/2002 | Oda et al. |
| 6,488,762 B1 | 12/2002 | Shi |
| 6,488,792 B2 | 12/2002 | Mathieu et al. |
| 6,506,248 B1 | 1/2003 | Duselis et al. |
| 6,506,819 B1 | 1/2003 | Shukla et al. |
| 6,510,667 B1 | 1/2003 | Cottier et al. |
| 6,512,132 B2 | 1/2003 | Isoda et al. |
| 6,514,624 B2 | 2/2003 | Takemoto et al. |
| 6,516,580 B1 | 2/2003 | Maietta |
| 6,526,715 B2 | 3/2003 | Kaneko et al. |
| 6,526,717 B2 | 3/2003 | Waggoner et al. |
| 6,526,751 B1 | 3/2003 | Moeckel |
| 6,528,151 B1 | 3/2003 | Shah et al. |
| 6,531,189 B1 | 3/2003 | Blatter et al. |
| 6,531,222 B1 | 3/2003 | Tanaka et al. |
| 6,533,848 B1 | 3/2003 | Robl et al. |
| 6,539,643 B1 | 4/2003 | Gleeson |
| 6,541,544 B1 | 4/2003 | Hart et al. |
| 6,544,596 B2 | 4/2003 | Clemens et al. |
| 6,550,203 B1 | 4/2003 | Little |
| 6,550,210 B1 | 4/2003 | Levine et al. |
| 6,551,567 B2 | 4/2003 | Konya et al. |
| 6,551,694 B1 | 4/2003 | Imamichi et al. |
| 6,562,444 B1 | 5/2003 | Gleeson et al. |
| 6,562,743 B1 | 5/2003 | Cook et al. |
| 6,572,697 B2 | 6/2003 | Gleeson et al. |
| 6,572,698 B1 | 6/2003 | Ko |
| 6,582,819 B2 | 6/2003 | McDaniel et al. |
| 6,605,148 B2 | 8/2003 | Shirakawa et al. |
| 6,610,358 B1 | 8/2003 | Williams et al. |
| 6,613,424 B1 | 9/2003 | Putt et al. |
| 6,620,487 B1 | 9/2003 | Tonyan et al. |
| 6,626,947 B2 | 9/2003 | Lester et al. |
| 6,626,991 B1 | 9/2003 | Drochon et al. |
| 6,630,417 B2 | 10/2003 | Kawai et al. |
| 6,641,658 B1 | 11/2003 | Dubey |
| 6,644,162 B1 | 11/2003 | Temple et al. |
| 6,645,289 B2 | 11/2003 | Sobolev et al. |
| 6,648,961 B2 | 11/2003 | Brothers et al. |
| 6,656,265 B1 | 12/2003 | Garnier et al. |
| 6,660,077 B2 | 12/2003 | De Buen-Unna et al. |
| 6,660,078 B2 | 12/2003 | Brothers et al. |
| 6,676,744 B2 | 1/2004 | Merkley et al. |
| 6,676,745 B2 | 1/2004 | Merkley et al. |
| 6,679,011 B2 | 1/2004 | Beck et al. |
| 6,682,595 B1 | 1/2004 | Barbour |
| 6,689,286 B2 | 2/2004 | Wilde et al. |
| 6,689,451 B1 | 2/2004 | Peng et al. |
| 6,692,564 B2 | 2/2004 | Hofmann |
| 6,692,570 B2 | 2/2004 | Cottier et al. |
| 6,699,576 B2 | 3/2004 | Peng et al. |
| 6,706,794 B1 | 3/2004 | Tsuda et al. |
| D489,137 S | 4/2004 | Eichner et al. |
| 6,719,878 B1 | 4/2004 | Svedman |
| D489,463 S | 5/2004 | Barnett |
| 6,737,008 B2 | 5/2004 | Gilbert et al. |
| D492,424 S | 6/2004 | Barnett |
| 6,749,897 B2 | 6/2004 | Naji et al. |
| 6,760,978 B2 | 7/2004 | Gleeson |
| 6,770,576 B2 | 8/2004 | Cook et al. |
| 6,777,103 B2 | 8/2004 | Merkley et al. |
| 6,809,131 B2 | 10/2004 | Li et al. |
| 6,811,603 B2 | 11/2004 | Brothers et al. |
| 6,814,798 B2 | 11/2004 | Vijn et al. |
| 6,824,605 B2 | 11/2004 | DeBuen Unna et al. |
| 6,824,715 B2 | 11/2004 | Cottier et al. |
| 6,832,652 B1 | 12/2004 | Dillenbeck et al. |
| 6,837,452 B2 | 1/2005 | Dezutter et al. |
| 6,872,246 B2 | 3/2005 | Merkley et al. |
| 6,875,503 B1 | 4/2005 | Famy et al. |
| 6,893,751 B2 | 5/2005 | Naji et al. |
| 6,901,713 B2 | 6/2005 | Axsom |
| 6,902,002 B1 | 6/2005 | Chatterji et al. |
| 6,902,797 B2 | 6/2005 | Pollock |
| 6,913,819 B2 | 7/2005 | Wallner |
| 6,933,038 B2 | 8/2005 | Nanko et al. |
| 6,941,720 B2 | 9/2005 | DeFord et al. |
| 6,942,726 B2 | 9/2005 | Cook et al. |
| 6,969,422 B2 | 11/2005 | Mazany et al. |
| 7,028,436 B2 | 4/2006 | Bezubic, Jr. |
| 7,081,184 B2 | 7/2006 | Wester et al. |
| 7,089,709 B2 | 8/2006 | Waggoner |
| 7,112,549 B2 | 9/2006 | Yoshitomi et al. |
| 7,128,965 B2 | 10/2006 | Famy et al. |
| 7,147,055 B2 | 12/2006 | Brothers et al. |
| 7,155,866 B2 | 1/2007 | Bezubic, Jr. et al. |
| 7,191,570 B1 | 3/2007 | Eaton et al. |
| 7,226,525 B2 | 6/2007 | Vrbanac et al. |
| 7,300,546 B2 | 11/2007 | Jewell et al. |
| 7,325,325 B2 | 2/2008 | Gleeson |
| 7,338,702 B2 | 3/2008 | Swales et al. |
| 7,344,593 B2 | 3/2008 | Luo et al. |
| 7,396,402 B2 | 7/2008 | Naji et al. |
| 7,419,544 B2 | 9/2008 | Naji et al. |
| 7,455,727 B2 | 11/2008 | Trevethick |
| 7,754,320 B2 | 7/2010 | Lyons et al. |
| 2001/0006336 A1 | 7/2001 | Yi et al. |

| | | |
|---|---|---|
| 2001/0043996 A1 | 11/2001 | Yamada et al. |
| 2001/0047741 A1 | 12/2001 | Gleeson et al. |
| 2002/0004111 A1 | 1/2002 | Matsubara et al. |
| 2002/0007926 A1 | 1/2002 | Jewell et al. |
| 2002/0007927 A1 | 1/2002 | Vahatalo et al. |
| 2002/0025436 A1 | 2/2002 | Meyer |
| 2002/0043996 A1 | 4/2002 | Iwamoto |
| 2002/0051892 A1 | 5/2002 | Laks et al. |
| 2002/0059886 A1 | 5/2002 | Merkley et al. |
| 2002/0069791 A1 | 6/2002 | Merkley et al. |
| 2002/0088584 A1* | 7/2002 | Merkley et al. ............... 162/173 |
| 2002/0100249 A1 | 8/2002 | Peng et al. |
| 2002/0112827 A1 | 8/2002 | Merkley et al. |
| 2002/0114888 A1 | 8/2002 | Magliocca |
| 2002/0121229 A1 | 9/2002 | Jardine et al. |
| 2002/0139082 A1 | 10/2002 | DeFord et al. |
| 2002/0166479 A1 | 11/2002 | Jiang |
| 2002/0170466 A1 | 11/2002 | Naji et al. |
| 2002/0170467 A1 | 11/2002 | Naji et al. |
| 2002/0170468 A1 | 11/2002 | Luo et al. |
| 2002/0175126 A1 | 11/2002 | Naji et al. |
| 2002/0179219 A1 | 12/2002 | Naji et al. |
| 2002/0189499 A1 | 12/2002 | Naji et al. |
| 2002/0189500 A1 | 12/2002 | Naji et al. |
| 2002/0192510 A1 | 12/2002 | Naji et al. |
| 2003/0000424 A1 | 1/2003 | Naji et al. |
| 2003/0046891 A1 | 3/2003 | Colada et al. |
| 2003/0054123 A1 | 3/2003 | Black et al. |
| 2003/0056458 A1 | 3/2003 | Black et al. |
| 2003/0089061 A1 | 5/2003 | DeFord et al. |
| 2003/0100434 A1 | 5/2003 | Yoshitomi et al. |
| 2003/0129323 A1 | 7/2003 | Dornieden et al. |
| 2003/0148039 A1 | 8/2003 | Blum et al. |
| 2003/0164119 A1 | 9/2003 | Naji et al. |
| 2003/0165624 A1 | 9/2003 | Naji et al. |
| 2003/0172606 A1 | 9/2003 | Anderson |
| 2003/0177955 A1 | 9/2003 | Vijn et al. |
| 2003/0200721 A1 | 10/2003 | Gleeson et al. |
| 2003/0205172 A1 | 11/2003 | Gleeson et al. |
| 2003/0213568 A1 | 11/2003 | Wester et al. |
| 2003/0213569 A1 | 11/2003 | Wester et al. |
| 2003/0213570 A1 | 11/2003 | Vrbanac et al. |
| 2003/0213572 A1 | 11/2003 | Vrbanac et al. |
| 2004/0028909 A1 | 2/2004 | Hodgson et al. |
| 2004/0043217 A1 | 3/2004 | Dezutter et al. |
| 2004/0043686 A1 | 3/2004 | Batdorf |
| 2004/0079260 A1 | 4/2004 | Datta et al. |
| 2004/0080063 A1 | 4/2004 | Datta et al. |
| 2004/0081827 A1 | 4/2004 | Datta et al. |
| 2004/0082715 A1 | 4/2004 | Bayer et al. |
| 2004/0083677 A1 | 5/2004 | Bezubic, Jr. |
| 2004/0099982 A1 | 5/2004 | Sirola et al. |
| 2004/0103610 A1 | 6/2004 | Axsom |
| 2004/0132843 A1 | 7/2004 | Baumgart et al. |
| 2004/0139676 A1 | 7/2004 | Knauseder |
| 2004/0145078 A1 | 7/2004 | Merkley et al. |
| 2004/0159066 A1 | 8/2004 | Thiers et al. |
| 2004/0163331 A1 | 8/2004 | Peng et al. |
| 2004/0168615 A1 | 9/2004 | Luo et al. |
| 2004/0211342 A1 | 10/2004 | Sprouts et al. |
| 2004/0220317 A1 | 11/2004 | Lorah et al. |
| 2004/0262801 A1 | 12/2004 | Hojaji et al. |
| 2005/0000172 A1 | 1/2005 | Anderson |
| 2005/0005821 A1 | 1/2005 | Colombet et al. |
| 2005/0011412 A1 | 1/2005 | Vijn et al. |
| 2005/0016423 A1 | 1/2005 | Merkley et al. |
| 2005/0045067 A1 | 3/2005 | Naji et al. |
| 2005/0072056 A1 | 4/2005 | Famy et al. |
| 2005/0126430 A1 | 6/2005 | Lightner, Jr. et al. |
| 2005/0138865 A1 | 6/2005 | Gleeson et al. |
| 2005/0208285 A1 | 9/2005 | Lyons et al. |
| 2005/0208287 A1 | 9/2005 | Naji et al. |
| 2005/0210790 A1 | 9/2005 | Wallner |
| 2005/0235883 A1 | 10/2005 | Merkley et al. |
| 2005/0262799 A1 | 12/2005 | Gleeson et al. |
| 2005/0284339 A1 | 12/2005 | Brunton et al. |
| 2006/0010800 A1 | 1/2006 | Bezubic |
| 2006/0024480 A1 | 2/2006 | Lyons et al. |
| 2006/0107872 A1 | 5/2006 | Chen |
| 2006/0147681 A1 | 7/2006 | Dubey |
| 2006/0168906 A1 | 8/2006 | Tonyan et al. |
| 2006/0182946 A1 | 8/2006 | Zarb et al. |
| 2006/0288909 A1 | 12/2006 | Naji et al. |
| 2007/0022913 A1 | 2/2007 | Wang et al. |
| 2007/0077436 A1 | 4/2007 | Naji et al. |
| 2007/0110981 A1 | 5/2007 | Killilea et al. |
| 2007/0131145 A1 | 6/2007 | Biscan et al. |
| 2007/0186822 A1 | 8/2007 | Utagaki et al. |
| 2007/0209554 A1 | 9/2007 | Luna et al. |
| 2007/0246864 A1 | 10/2007 | Utagaki et al. |
| 2007/0261607 A1 | 11/2007 | Utagaki et al. |
| 2008/0022627 A1 | 1/2008 | Gleeson et al. |
| 2008/0072795 A1 | 3/2008 | Utagaki et al. |
| 2008/0072796 A1 | 3/2008 | Utagaki et al. |
| 2008/0095692 A1 | 4/2008 | Pham |
| 2008/0096018 A1 | 4/2008 | Zhang et al. |
| 2008/0104918 A1 | 5/2008 | Gleeson et al. |
| 2008/0157428 A1 | 7/2008 | Utagaki et al. |
| 2008/0163582 A1 | 7/2008 | Trevethick |
| 2008/0176057 A1 | 7/2008 | Ukai |
| 2008/0178771 A1 | 7/2008 | Utagaki et al. |
| 2008/0190062 A1 | 8/2008 | Engbrecht et al. |
| 2008/0191165 A1 | 8/2008 | Nakagawa |
| 2008/0199677 A1 | 8/2008 | Ukai |
| 2008/0203365 A1 | 8/2008 | Gleeson et al. |
| 2008/0311346 A1 | 12/2008 | Ohno |
| 2009/0025897 A1 | 1/2009 | Aizawa |
| 2009/0076196 A1 | 3/2009 | Hojaji |
| 2009/0090276 A1 | 4/2009 | Feng et al. |
| 2009/0156385 A1 | 6/2009 | Biscan et al. |

FOREIGN PATENT DOCUMENTS

| | | |
|---|---|---|
| AR | 206788 | 8/1976 |
| AR | 227376 | 10/1982 |
| AR | 250022 | 7/1983 |
| AR | 291988 | 1/1984 |
| AR | 240667 | 8/1990 |
| AR | 010221 | 6/2000 |
| AR | 012644 | 11/2000 |
| AR | 014702 A1 | 12/2005 |
| AR | 014046 A1 | 3/2006 |
| AR | 015457 A1 | 10/2006 |
| AT | 391131 B | 8/1990 |
| AU | 515151 | 3/1981 |
| AU | 198170389 | 10/1981 |
| AU | 8401582 | 2/1983 |
| AU | 8858982 | 3/1983 |
| AU | 44948 | 1/1986 |
| AU | 0552930 B2 | 6/1986 |
| AU | 55929 | 10/1986 |
| AU | 55929/86 A | 10/1986 |
| AU | 94035 S | 11/1986 |
| AU | 95878 S | 3/1987 |
| AU | 98800 S | 12/1987 |
| AU | 99683 S | 2/1988 |
| AU | 572111 | 5/1988 |
| AU | 572111 B | 5/1988 |
| AU | 102662 S | 1/1989 |
| AU | 606344 | 1/1989 |
| AU | 103840 S | 5/1989 |
| AU | 104552 S | 8/1989 |
| AU | 108078 S | 7/1990 |
| AU | 616088 | 7/1990 |
| AU | 198946878 | 7/1990 |
| AU | 110320 S | 2/1991 |
| AU | 199176201 | 6/1992 |
| AU | 13067 | 9/1992 |
| AU | 199215903 | 4/1993 |
| AU | 117138 S | 5/1993 |
| AU | 118448 S | 10/1993 |
| AU | 118862 S | 11/1993 |
| AU | 643726 | 11/1993 |
| AU | 199340398 | 11/1993 |
| AU | 686135 | 11/1994 |
| AU | 677649 | 12/1994 |
| AU | 122634 S | 2/1995 |
| AU | 123141 S | 4/1995 |
| AU | 123142 S | 4/1995 |

| | | | | | | |
|---|---|---|---|---|---|---|
| AU | 659400 | | 5/1995 | CL | 2352-01 | 9/2001 |
| AU | 681049 | | 9/1996 | CL | 2352-2001 | 9/2001 |
| AU | 702630 | | 11/1996 | CL | 2353-01 | 9/2001 |
| AU | 130941 | S | 8/1997 | CL | 2353-2001 | 9/2001 |
| AU | 132812 | S | 2/1998 | CL | 461-02 | 3/2002 |
| AU | 732998 | | 5/1998 | CL | 693-2004 | 1/2005 |
| AU | 135097 | S | 9/1998 | CL | 6932004 | 1/2005 |
| AU | 199869111 | | 10/1998 | CN | 1032332 A | 4/1989 |
| AU | 135557 | S | 11/1998 | CN | 1052519 A | 6/1991 |
| AU | 199879922 | | 2/1999 | CN | 2149444 Y | 12/1993 |
| AU | 734095 | | 3/1999 | CN | 1081168 | 1/1994 |
| AU | 137291 | S | 5/1999 | CN | 1081168 A | 1/1994 |
| AU | 9768198 | | 5/1999 | CN | 1087885 A | 6/1994 |
| AU | 199886116 | | 5/1999 | CN | 2170342 Y | 6/1994 |
| AU | 137791 | | 7/1999 | CN | 1099089 A | 2/1995 |
| AU | 9926061 | A | 9/1999 | CN | 1099089 A | 2/1995 |
| AU | 714529 | | 1/2000 | CN | 1160070 A | 9/1997 |
| AU | 9952711 | A | 3/2000 | CN | 1178202 A | 4/1998 |
| AU | 140607 | S | 5/2000 | CN | 2281378 Y | 5/1998 |
| AU | 200078733 | | 5/2001 | CN | 1199116 | 11/1998 |
| AU | 200078752 | | 5/2001 | CN | 1224701 | 8/1999 |
| AU | 200078753 | | 5/2001 | CN | 1224701 A | 8/1999 |
| AU | 200111200 | | 5/2001 | CN | 1251358 A | 4/2000 |
| AU | 746655 | | 6/2001 | CN | 1061328 | 1/2001 |
| AU | 783430 | | 6/2001 | CN | 1061328 C | 1/2001 |
| AU | 200072012 | | 6/2001 | CN | 2435455 Y | 6/2001 |
| AU | 200121275 | | 6/2001 | CN | 1394167 A | 1/2003 |
| AU | 735352 | | 7/2001 | CN | 1500038 A | 5/2004 |
| AU | 37683-01 | | 9/2001 | CN | 1500038 A | 5/2004 |
| AU | 2001250832 | | 9/2001 | CS | 222361 | 6/1983 |
| AU | 200143991 | | 10/2001 | CS | 222361 | 8/1985 |
| AU | 200053659 | | 3/2002 | CZ | 283459 | 4/1998 |
| AU | 147568 | S | 4/2002 | DE | 1952082 U | 12/1966 |
| AU | 2001287356 | | 4/2002 | DE | 2421380 | 1/1975 |
| AU | 2002211394 | | 4/2002 | DE | 2344773 | 3/1975 |
| AU | 200218649 | | 5/2002 | DE | 2344773 A1 | 3/1975 |
| AU | 148485 | S | 7/2002 | DE | 2460879 A1 | 6/1976 |
| AU | 2002240552 | B2 | 9/2002 | DE | 2460880 A1 | 6/1976 |
| AU | 200223229 | | 11/2002 | DE | 2610998 A1 | 9/1977 |
| AU | 2002301228 | | 2/2003 | DE | 143936 | 9/1980 |
| AU | 2002301288 | A1 | 2/2003 | DE | 3037220 A1 | 4/1982 |
| AU | 2003901529 | | 3/2003 | DE | 3046405 A1 | 9/1982 |
| AU | 2002301041 | | 6/2003 | DE | 3213521 A1 | 6/1983 |
| AU | 2002301511 | A1 | 6/2003 | DE | 3210326 | 9/1983 |
| AU | 2003204739 | B2 | 7/2003 | DE | 3232106 A1 | 3/1984 |
| AU | 152915 | S | 8/2003 | DE | 33 08 917 A | 9/1984 |
| AU | 153491 | S | 10/2003 | DE | 3308917 | 9/1984 |
| AU | 153493 | S | 10/2003 | DE | 3314796 | 10/1984 |
| AU | 153494 | S | 10/2003 | DE | 3314796 A1 | 10/1984 |
| AU | 153495 | S | 10/2003 | DE | 3324671 | 1/1985 |
| AU | 153496 | S | 10/2003 | DE | 3324671 A1 | 1/1985 |
| AU | 2003100890 | | 12/2003 | DE | 3601736 A1 | 1/1986 |
| AU | 2003100890 | B4 | 12/2003 | DE | 3505335 | 8/1986 |
| AU | 2003204418 | | 12/2003 | DE | 3711549 | 10/1987 |
| AU | 2003238481 | | 12/2003 | DE | 3711549 A1 | 10/1987 |
| AU | 2003266828 | | 4/2004 | DE | 3621010 A1 | 1/1988 |
| AU | 2003257906 | A1 | 7/2004 | DE | 3743467 | 7/1989 |
| AU | 2003271286 | | 7/2004 | DE | 3743467 A1 | 7/1989 |
| AU | 2003268882 | | 8/2004 | DE | 3932176 A1 | 6/1990 |
| AU | 2005100347 | | 5/2005 | DE | 3908172 | 9/1990 |
| AU | 2005100347 | B4 | 5/2005 | DE | 3908172 A1 | 9/1990 |
| AU | 2004200339 | | 6/2005 | DE | 3923800 A1 | 1/1991 |
| AU | 2002240552 | | 12/2007 | DE | 4229572 | 3/1993 |
| CA | 730345 | A | 3/1966 | DE | 4209834 A1 | 9/1993 |
| CA | 1040859 | | 10/1978 | DE | 4228338 A1 | 10/1993 |
| CA | 1080601 | | 7/1980 | DE | 9403018 U1 | 5/1994 |
| CA | 1084230 | | 8/1980 | DE | 4316666 C1 | 12/1994 |
| CA | 1177205 | | 11/1984 | DE | 4410020 A1 | 9/1995 |
| CA | 2242749 | | 2/1999 | DE | 19607081 | 8/1997 |
| CA | 2313456 | | 6/1999 | DE | 19607081 A1 | 8/1997 |
| CA | 2405354 | | 11/2001 | DE | 19654836 | 6/1998 |
| CH | 368918 | A | 4/1963 | DE | 19858342 C1 | 2/2000 |
| CH | 606674 | A5 | 11/1978 | DE | 20006112 U1 | 7/2000 |
| CH | 678882 | | 11/1991 | DE | 19858342 | 8/2000 |
| CH | 684285 | A5 | 8/1994 | DE | 19549535 C2 | 1/2001 |
| CL | 32972 | | 2/1980 | DE | 19962137 | 6/2001 |
| CL | 2346-01 | | 9/2001 | DE | 19962137 A1 | 6/2001 |
| CL | 2346-2001 | | 9/2001 | DE | 20105063 U1 | 8/2001 |
| CL | 2347-01 | | 9/2001 | DE | 10044641 A1 | 3/2002 |

| | | | | | | |
|---|---|---|---|---|---|---|
| DE | 10106888 A1 | 9/2002 | | EP | 0846666 B1 | 6/1998 |
| EP | 0007585 | 7/1979 | | EP | 0846668 | 6/1998 |
| EP | 0007585 | 2/1980 | | EP | 0846668 B1 | 6/1998 |
| EP | 0012546 | 6/1980 | | EP | 0678488 | 9/1998 |
| EP | 0021362 | 1/1981 | | EP | 0891954 | 1/1999 |
| EP | 0033133 | 8/1981 | | EP | 0891954 B1 | 1/1999 |
| EP | 0033133 A1 | 8/1981 | | EP | 0931778 | 7/1999 |
| EP | 0036275 | 9/1981 | | EP | 0931778 B1 | 7/1999 |
| EP | 0036275 A1 | 9/1981 | | EP | 1088800 A | 4/2000 |
| EP | 0049365 A2 | 4/1982 | | EP | 0999232 | 5/2000 |
| EP | 0069095 | 6/1982 | | EP | 0999232 A1 | 5/2000 |
| EP | 0055504 | 7/1982 | | EP | 0801037 B1 | 8/2000 |
| EP | 0056263 A1 | 7/1982 | | EP | 1052262 | 11/2000 |
| EP | 0012546 B1 | 10/1982 | | EP | 1052262 A2 | 11/2000 |
| EP | 0069095 | 1/1983 | | EP | 1094165 A2 | 4/2001 |
| EP | 0084951 A | 8/1983 | | EP | 1106236 A1 | 6/2001 |
| EP | 0102092 | 3/1984 | | EP | 1155794 | 11/2001 |
| EP | 0103097 B1 | 3/1984 | | EP | 1156021 | 11/2001 |
| EP | 0104540 A2 | 4/1984 | | EP | 1156021 A1 | 11/2001 |
| EP | 0127960 B1 | 12/1984 | | EP | 1160212 A1 | 12/2001 |
| EP | 0136790 | 4/1985 | | EP | 1160212 A1 | 12/2001 |
| EP | 0136790 A2 | 4/1985 | | EP | 1172341 | 1/2002 |
| EP | 0159046 | 10/1985 | | EP | 1227199 A1 | 7/2002 |
| EP | 0159046 A2 | 10/1985 | | EP | 1227199 A1 | 7/2002 |
| EP | 0159173 | 10/1985 | | EP | 1246782 | 10/2002 |
| EP | 0159173 A2 | 10/1985 | | EP | 1334076 B1 | 8/2003 |
| EP | 0173553 A1 | 3/1986 | | EP | 1346964 A2 | 9/2003 |
| EP | 0184477 A1 | 6/1986 | | EP | 1801278 A1 | 6/2007 |
| EP | 0127960 B1 | 4/1987 | | EP | 1891984 A1 | 2/2008 |
| EP | 0220073 B1 | 4/1987 | | EP | 1985671 A1 | 10/2008 |
| EP | 0287962 | 4/1987 | | ES | 2033987 | 4/1993 |
| EP | 0222339 | 5/1987 | | FR | 895184 | 1/1945 |
| EP | 0222339 A1 | 5/1987 | | FR | 990242 A1 | 9/1951 |
| EP | 0242872 | 10/1987 | | FR | 1557348 | 2/1969 |
| EP | 0242872 A1 | 10/1987 | | FR | 2248246 A1 | 5/1975 |
| EP | 0247817 | 12/1987 | | FR | 2405908 A1 | 5/1979 |
| EP | 0247817 A1 | 12/1987 | | FR | 2451428 | 11/1980 |
| EP | 0297186 A1 | 1/1989 | | FR | 2512440 | 3/1983 |
| EP | 0305209 | 3/1989 | | FR | 2512440 | 3/1983 |
| EP | 0314242 | 5/1989 | | FR | 2540160 A1 | 8/1984 |
| EP | 0314242 A1 | 5/1989 | | FR | 2562591 A1 | 10/1985 |
| EP | 0327351 | 8/1989 | | FR | 2611432 | 9/1988 |
| EP | 0327351 A2 | 8/1989 | | FR | 2624870 A1 | 6/1989 |
| EP | 0328431 | 8/1989 | | FR | 2628775 A1 | 9/1989 |
| EP | 0328431 A1 | 8/1989 | | FR | 2671072 | 7/1992 |
| EP | 0331666 | 9/1989 | | FR | 2702790 A1 | 9/1994 |
| EP | 0347092 A | 12/1989 | | GB | 22139 | 11/1901 |
| EP | 0359362 B1 | 3/1990 | | GB | 119182 | 9/1918 |
| EP | 0376334 | 7/1990 | | GB | 413294 | 7/1934 |
| EP | 0263723 B1 | 2/1991 | | GB | 442098 | 2/1936 |
| EP | 0419657 | 4/1991 | | GB | 449384 | 6/1936 |
| EP | 0428431 A1 | 5/1991 | | GB | 558239 | 12/1943 |
| EP | 0430667 | 6/1991 | | GB | 558584 | 1/1944 |
| EP | 0430995 B1 | 6/1991 | | GB | 564447 | 9/1944 |
| EP | 0482810 A1 | 4/1992 | | GB | 682432 | 11/1952 |
| EP | 484283 | 6/1992 | | GB | 731597 | 6/1955 |
| EP | 0558239 A1 | 9/1993 | | GB | 0740145 | 11/1955 |
| EP | 0564447 A1 | 10/1993 | | GB | 743866 | 1/1956 |
| EP | 0593779 A1 | 4/1994 | | GB | 744070 | 2/1956 |
| EP | 0601594 | 6/1994 | | GB | 752345 | 7/1956 |
| EP | 0601594 A1 | 6/1994 | | GB | 896910 | 5/1962 |
| EP | 0619227 B1 | 10/1994 | | GB | 1003850 | 8/1963 |
| EP | 0619227 B1 | 10/1994 | | GB | 1062410 | 3/1967 |
| EP | 0619277 B1 | 10/1994 | | GB | 1066768 | 4/1967 |
| EP | 0619277 B1 | 10/1994 | | GB | 1086311 | 10/1967 |
| EP | 0625618 A2 | 11/1994 | | GB | 1125825 | 9/1968 |
| EP | 0359362 B1 | 4/1995 | | GB | 1174902 | 12/1969 |
| EP | 0147429 A1 | 7/1995 | | GB | 1258288 | 12/1971 |
| EP | 0678488 | 10/1995 | | GB | 1265471 | 3/1972 |
| EP | 0683282 | 11/1995 | | GB | 1269357 | 4/1972 |
| EP | 0708213 A1 | 4/1996 | | GB | 1337129 | 11/1973 |
| EP | 0717675 | 6/1996 | | GB | 1448320 | 9/1976 |
| EP | 0725044 | 8/1996 | | GB | 1490711 | 11/1977 |
| EP | 0725044 A1 | 8/1996 | | GB | 1493202 | 11/1977 |
| EP | 0754663 A | 1/1997 | | GB | 1493203 | 11/1977 |
| EP | 0801037 B1 | 10/1997 | | GB | 1512084 | 5/1978 |
| EP | 0803484 | 10/1997 | | GB | 1514239 | 6/1978 |
| EP | 0803484 A1 | 10/1997 | | GB | 1515521 | 6/1978 |
| EP | 0846666 | 6/1998 | | GB | 1532922 | 11/1978 |

| | | | | | | |
|---|---|---|---|---|---|---|
| GB | 1536663 | 12/1978 | | JP | 58202823 | 7/1985 |
| GB | 1543460 | 4/1979 | | JP | 60135211 | 7/1985 |
| GB | 2019386 | 10/1979 | | JP | 60135211 A | 7/1985 |
| GB | 2021186 A | 11/1979 | | JP | 60161381 | 8/1985 |
| GB | 2025928 | 1/1980 | | JP | 60191074 | 9/1985 |
| GB | 2041384 | 9/1980 | | JP | 60242242 A | 12/1985 |
| GB | 1577648 | 10/1980 | | JP | 61019900 | 1/1986 |
| GB | 1584175 | 2/1981 | | JP | 6168967 | 4/1986 |
| GB | 2064989 | 6/1981 | | JP | 61141656 | 6/1986 |
| GB | 2067622 | 7/1981 | | JP | 61141656 A | 6/1986 |
| GB | 2075079 A | 11/1981 | | JP | 88052740 | 6/1986 |
| GB | 1604910 | 12/1981 | | JP | 61178462 | 8/1986 |
| GB | 2078611 A | 1/1982 | | JP | 61178462 A2 | 8/1986 |
| GB | 2080851 | 2/1982 | | JP | 62036055 | 2/1987 |
| GB | 2083512 A | 3/1982 | | JP | 62036055 A2 | 2/1987 |
| GB | 2106527 | 4/1983 | | JP | 62036056 | 2/1987 |
| GB | 2137977 | 10/1984 | | JP | 62036056 A | 2/1987 |
| GB | 2148871 | 6/1985 | | JP | 0374441987 A2 | 2/1987 |
| GB | 2199857 A | 7/1988 | | JP | 62207751 | 9/1987 |
| GB | 2230772 | 10/1990 | | JP | 62235274 | 10/1987 |
| GB | 2248834 | 4/1992 | | JP | 62235274 A | 10/1987 |
| GB | 2252987 | 8/1992 | | JP | 63008248 | 1/1988 |
| GB | 2256867 | 12/1992 | | JP | 63008248 A | 1/1988 |
| GB | 2276875 | 10/1994 | | JP | 88052740 | 1/1988 |
| GB | 2276875 | 10/1995 | | JP | 6319636 U | 2/1988 |
| GB | 2307425 A | 5/1997 | | JP | 6330381 | 2/1988 |
| GB | 2330138 | 4/1999 | | JP | 10784988 | 5/1988 |
| GB | 2340071 A | 2/2000 | | JP | 63-091537 | 6/1988 |
| GB | 2433497 A | 6/2007 | | JP | 6331426 | 6/1988 |
| HU | 164419 | 2/1974 | | JP | 63248751 A | 10/1988 |
| HU | 173947 | 9/1979 | | JP | 63257631 | 10/1988 |
| HU | 180773 | 4/1983 | | JP | 63257631 A | 10/1988 |
| HU | 31027 | 4/1984 | | JP | 6347229 | 12/1988 |
| HU | 200511 | 9/1986 | | JP | 1029843 | 1/1989 |
| HU | 0895285 | 1/1990 | | JP | 6429843 | 1/1989 |
| HU | 200511 B | 6/1990 | | JP | 6429843 | 2/1989 |
| HU | 209836 | 7/1990 | | JP | 6437478 | 2/1989 |
| HU | 209836 B | 11/1994 | | JP | 6450541 | 3/1989 |
| HU | 9602843 | 12/1996 | | JP | 01141849 | 6/1989 |
| HU | 0001904 | 11/2000 | | JP | H01-032772 | 7/1989 |
| IT | 1311962 B1 | 3/2002 | | JP | 01290402 A | 11/1989 |
| JP | 21071968 | 1/1943 | | JP | 92052746 | 4/1990 |
| JP | 54025927 | 2/1954 | | JP | 92054171 | 4/1990 |
| JP | 49116445 U | 2/1973 | | JP | 02192447 | 7/1990 |
| JP | 4946761 | 12/1974 | | JP | 02192447 A | 7/1990 |
| JP | 75095319 | 7/1975 | | JP | 1924781990 | 7/1990 |
| JP | 50-100810 | 8/1975 | | JP | 2204566 A | 8/1990 |
| JP | 52052429 | 4/1977 | | JP | 02236350 A | 9/1990 |
| JP | 53050229 | 5/1978 | | JP | 02283646 A | 11/1990 |
| JP | 54025927 A | 2/1979 | | JP | 02283646 A | 11/1990 |
| JP | 54-021859 | 8/1979 | | JP | 02289456 A2 | 11/1990 |
| JP | 56130832 U | 3/1980 | | JP | 03016978 | 1/1991 |
| JP | 55085756 | 6/1980 | | JP | 34654 | 2/1991 |
| JP | 55095654 | 7/1980 | | JP | 363641 | 6/1991 |
| JP | 55095654 A | 7/1980 | | JP | 01128748 U | 6/1991 |
| JP | 55116684 | 9/1980 | | JP | 3066338 | 6/1991 |
| JP | 55130847 | 10/1980 | | JP | 03208871 A2 | 9/1991 |
| JP | 55130847 A2 | 10/1980 | | JP | 03295843 | 12/1991 |
| JP | 56014466 | 2/1981 | | JP | 92052746 | 12/1991 |
| JP | 56014466 A | 2/1981 | | JP | 04002642 | 1/1992 |
| JP | 56048413 | 5/1981 | | JP | 04002642 A | 1/1992 |
| JP | 57017452 | 1/1982 | | JP | 92054171 | 1/1992 |
| JP | 57017452 A2 | 1/1982 | | JP | 4042875 A | 2/1992 |
| JP | 57058615 A | 4/1982 | | JP | 04089340 | 3/1992 |
| JP | 5641881 | 9/1982 | | JP | 4-104945 | 4/1992 |
| JP | 57156361 A2 | 9/1982 | | JP | 4104945 | 4/1992 |
| JP | 57183344 | 11/1982 | | JP | 4114937 | 4/1992 |
| JP | 57183344 A | 11/1982 | | JP | 04144949 | 5/1992 |
| JP | 58000351 | 1/1983 | | JP | 4182333 | 6/1992 |
| JP | 58000351 A | 1/1983 | | JP | 04182335 | 6/1992 |
| JP | 58055034 | 4/1983 | | JP | 4193748 A | 7/1992 |
| JP | 58055034 A | 4/1983 | | JP | 4260645 | 9/1992 |
| JP | 58110443 | 7/1983 | | JP | 4260645 A | 9/1992 |
| JP | 58149939 | 9/1983 | | JP | 4292906 A | 10/1992 |
| JP | 59045953 | 3/1984 | | JP | 04295072 A | 10/1992 |
| JP | 59107985 | 6/1984 | | JP | 04300232 | 10/1992 |
| JP | 203747 / 84 | 11/1984 | | JP | 04300232 A2 | 10/1992 |
| JP | 59217659 A | 12/1984 | | JP | 04342746 | 11/1992 |
| JP | 60-118658 | 6/1985 | | JP | 04342746 A | 11/1992 |

| | | | | | | |
|---|---|---|---|---|---|---|
| JP | 04349155 | 12/1992 | | JP | 9124327 | 5/1997 |
| JP | 51532 | 1/1993 | | JP | 09193120 | 7/1997 |
| JP | 05040473 A | 2/1993 | | JP | 9201561 | 8/1997 |
| JP | 05044323 | 2/1993 | | JP | 9201561 A | 8/1997 |
| JP | 0582151991 U | 2/1993 | | JP | 9217659 | 8/1997 |
| JP | 5095319 A | 4/1993 | | JP | 9217659 A | 8/1997 |
| JP | 5123229 | 5/1993 | | JP | 59217659 | 8/1997 |
| JP | 5154816 A2 | 6/1993 | | JP | 9227200 A2 | 9/1997 |
| JP | 5177625 A2 | 7/1993 | | JP | 09255383 | 9/1997 |
| JP | 05184246 | 7/1993 | | JP | 09255383 A | 9/1997 |
| JP | 5186261 | 7/1993 | | JP | 11077650 A | 9/1997 |
| JP | 5229859 | 9/1993 | | JP | 2714135 | 10/1997 |
| JP | 2467261993 | 9/1993 | | JP | 09296560 A | 11/1997 |
| JP | 05-078738 | 10/1993 | | JP | 10036161 | 2/1998 |
| JP | 542192 | 10/1993 | | JP | 10036161 A | 2/1998 |
| JP | 05-287234 | 11/1993 | | JP | 10095648 | 4/1998 |
| JP | 05287234 | 11/1993 | | JP | 10095922 | 4/1998 |
| JP | 06001648 | 1/1994 | | JP | 10121693 A | 5/1998 |
| JP | 06017621 B2 | 1/1994 | | JP | 10130609 | 5/1998 |
| JP | 6023889 A | 2/1994 | | JP | 10152356 | 6/1998 |
| JP | 06024821 | 2/1994 | | JP | 10152356 A | 6/1998 |
| JP | H06-039959 | 2/1994 | | JP | 10245925 A | 9/1998 |
| JP | 06 144911 | 5/1994 | | JP | 10330146 | 12/1998 |
| JP | 06127992 | 5/1994 | | JP | 11010631 | 1/1999 |
| JP | 06127992 A | 5/1994 | | JP | 11 099512 | 4/1999 |
| JP | 06144911 | 5/1994 | | JP | 11092202 | 4/1999 |
| JP | 06144912 | 5/1994 | | JP | 11092202 A | 4/1999 |
| JP | 06144912 A2 | 5/1994 | | JP | 11099512 | 4/1999 |
| JP | 06-229061 | 8/1994 | | JP | 11116299 | 4/1999 |
| JP | 628563 | 8/1994 | | JP | 11116299 A | 4/1999 |
| JP | 06256053 A2 | 9/1994 | | JP | 11139859 | 5/1999 |
| JP | 06258053 | 9/1994 | | JP | 11210203 | 8/1999 |
| JP | 06258053 A | 9/1994 | | JP | 11217918 | 8/1999 |
| JP | 6271371 | 9/1994 | | JP | 11247307 | 9/1999 |
| JP | 06080264 B2 | 10/1994 | | JP | 11256683 | 9/1999 |
| JP | 6293578 A | 10/1994 | | JP | 11511110 | 9/1999 |
| JP | 6293578 A | 10/1994 | | JP | 11280172 | 10/1999 |
| JP | 341093 / 94 | 12/1994 | | JP | 3351461990 | 12/1999 |
| JP | 07024299 A | 1/1995 | | JP | 2000008581 | 1/2000 |
| JP | 07033502 A | 2/1995 | | JP | 2000-044302 | 2/2000 |
| JP | 07041592 | 2/1995 | | JP | 2000043196 | 2/2000 |
| JP | 07109165 A | 4/1995 | | JP | 2000044367 A | 2/2000 |
| JP | 07165455 A | 6/1995 | | JP | 2000064554 A2 | 2/2000 |
| JP | 07187734 | 7/1995 | | JP | 2000110272 | 4/2000 |
| JP | 07196348 | 8/1995 | | JP | 2000119050 | 4/2000 |
| JP | 7291701 A | 11/1995 | | JP | 2001300924 A | 4/2000 |
| JP | 7291707 A | 11/1995 | | JP | 2000143307 | 5/2000 |
| JP | 07292846 A2 | 11/1995 | | JP | 2000143307 A | 5/2000 |
| JP | 07315869 A | 12/1995 | | JP | 2000160057 | 6/2000 |
| JP | 08012405 | 1/1996 | | JP | 2000160057 A | 6/2000 |
| JP | 08012405 A | 1/1996 | | JP | 2000302498 | 10/2000 |
| JP | 08012450 A2 | 1/1996 | | JP | 2000302522 A | 10/2000 |
| JP | 8040758 A | 2/1996 | | JP | 2001026485 | 1/2001 |
| JP | 867541 | 3/1996 | | JP | 2001026485 A | 1/2001 |
| JP | 8067541 | 3/1996 | | JP | 2001163647 | 6/2001 |
| JP | 8067541 A | 3/1996 | | JP | 2001163647 A | 6/2001 |
| JP | 08068184 A2 | 3/1996 | | JP | 2001 240458 | 9/2001 |
| JP | 08073283 | 3/1996 | | JP | 2001240439 | 9/2001 |
| JP | 08073283 A | 3/1996 | | JP | 2001240439 A | 9/2001 |
| JP | 08-109728 | 4/1996 | | JP | 2001240458 | 9/2001 |
| JP | 2507028 | 5/1996 | | JP | 2001300924 A | 10/2001 |
| JP | 08119708 | 5/1996 | | JP | 2001/316163 | 11/2001 |
| JP | 08133864 A | 5/1996 | | JP | 2001316157 | 11/2001 |
| JP | 08151246 A | 6/1996 | | JP | 2001316157 A2 | 11/2001 |
| JP | 08169779 | 7/1996 | | JP | 2001335385 A | 12/2001 |
| JP | 08175859 | 7/1996 | | JP | 3482852001 | 12/2001 |
| JP | 08217561 | 8/1996 | | JP | 2002003248 | 1/2002 |
| JP | 08217561 A | 8/1996 | | JP | 2002053361 | 2/2002 |
| JP | 08-260371 | 10/1996 | | JP | 2002053361 A2 | 2/2002 |
| JP | 08-284294 | 10/1996 | | JP | 2002097732 | 4/2002 |
| JP | 09-004122 | 1/1997 | | JP | 2002161623 A2 | 6/2002 |
| JP | 09020526 A | 1/1997 | | JP | 2002-231865 | 8/2002 |
| JP | 09020526 A | 1/1997 | | JP | 2002231865 A | 8/2002 |
| JP | 09052747 A2 | 2/1997 | | JP | 2002354091 A2 | 12/2002 |
| JP | 2538120 | 3/1997 | | JP | 2002364091 A | 12/2002 |
| JP | 09067174 | 3/1997 | | JP | 107812003 | 1/2003 |
| JP | 09077543 | 3/1997 | | JP | 550642003 | 2/2003 |
| JP | 09092895 | 4/1997 | | JP | 2003-73756 | 3/2003 |
| JP | 09123340 | 5/1997 | | JP | 200373756 A | 3/2003 |

| | | | | | | |
|---|---|---|---|---|---|---|
| JP | 2003094419 | A | 4/2003 | SG | 97059547 | 5/1996 |
| JP | 2003/335560 | | 11/2003 | SG | 98021017 | 9/1996 |
| JP | 2004231480 | | 8/2004 | SG | 98021751 | 9/1996 |
| JP | 2004231480 | A | 8/2004 | SG | 98051485 | 2/1997 |
| JP | 2004314456 | A | 11/2004 | SG | 97018402 | 5/1997 |
| JP | 2005034695 | A2 | 2/2005 | SG | 98012917 | 6/1997 |
| KR | 19928773 | | 10/1992 | SG | 99017030 | 10/1997 |
| KR | 1994-0006957 | | 4/1994 | SU | 240472 | 3/1969 |
| KR | 9508587 | | 8/1995 | SU | 411054 | 1/1974 |
| KR | 1019950008587 | B1 | 8/1995 | SU | 1571024 | 6/1990 |
| KR | 1019967005677 | | 11/1996 | SU | 1606633 | 11/1990 |
| KR | 100231910 | B1 | 9/1999 | SU | 1650196 A | 5/1991 |
| KR | 200158855 | Y1 | 10/1999 | SU | 1650196 A | 5/1991 |
| KR | 200172372 | Y1 | 3/2000 | SU | 1668346 | 8/1991 |
| KR | 2000014685 | | 3/2000 | SU | 1724613 | 4/1992 |
| KR | 100274218 | B1 | 12/2000 | SU | 1724613 | 7/1992 |
| KR | 2001053808 | | 7/2001 | TW | 278536 | 6/1996 |
| MY | 107883 | A | 6/1996 | TW | 278537 | 6/1996 |
| NO | 9901129 | | 9/2000 | TW | 282800 | 8/1996 |
| NO | 9901129 | | 11/2000 | TW | 408089 | 10/2000 |
| NZ | 19354 | A | 9/1984 | TW | 150027 | 2/2001 |
| NZ | 210395 | | 11/1984 | WO | WO 81/00422 | 2/1981 |
| NZ | 20119 | | 10/1985 | WO | WO-8102758 | 10/1981 |
| NZ | 20120 | | 10/1985 | WO | WO 82/03386 | 10/1982 |
| NZ | 20844 | | 11/1986 | WO | WO-8203386 | 10/1982 |
| NZ | 218315 | | 2/1987 | WO | WO 83/01947 | 6/1983 |
| NZ | 21875 | | 4/1988 | WO | WO-8301947 | 6/1983 |
| NZ | 221389 | | 12/1991 | WO | WO 84/04765 | 12/1984 |
| NZ | 25267 | | 6/1993 | WO | WO 85/00361 | 1/1985 |
| NZ | 230209 | | 12/1993 | WO | WO-8500361 | 1/1985 |
| NZ | 247463 | | 12/1993 | WO | WO 85/02394 | 6/1985 |
| NZ | 25838 | | 4/1994 | WO | WO-8502394 | 6/1985 |
| NZ | 26065 | | 7/1994 | WO | WO 85/03966 | 9/1985 |
| NZ | 270310 | | 12/1996 | WO | WO 86/00291 | 1/1986 |
| NZ | 280409 | | 6/1997 | WO | WO-8600291 | 1/1986 |
| NZ | 280235 | | 9/1997 | WO | WO 87/00827 | 2/1987 |
| NZ | 331553 | | 1/2000 | WO | WO-8700827 | 2/1987 |
| NZ | 336159 | | 3/2000 | WO | WO 90/02102 | 3/1990 |
| NZ | 334899 | | 4/2000 | WO | WO-9002102 | 3/1990 |
| NZ | 400643 | | 4/2000 | WO | WO 90/08240 | 7/1990 |
| NZ | 335529 | | 12/2000 | WO | WO 91/01409 | 2/1991 |
| NZ | 502017 | | 1/2001 | WO | WO 91/11321 | 8/1991 |
| NZ | 500215 | | 6/2001 | WO | WO 91/14057 | 9/1991 |
| NZ | 524520 | | 9/2003 | WO | WO 91/14058 | 9/1991 |
| NZ | 518988 | | 10/2003 | WO | WO 92/00251 | 1/1992 |
| NZ | 520286 | | 5/2004 | WO | WO 92/00927 | 1/1992 |
| NZ | 521491 | | 6/2004 | WO | WO-9200251 | 1/1992 |
| NZ | 525507 | | 9/2004 | WO | WO 92/10440 | 6/1992 |
| NZ | 525328 | | 2/2005 | WO | WO-9210440 | 6/1992 |
| NZ | 528304 | | 4/2005 | WO | WO 92/17657 | 10/1992 |
| NZ | 530605 | | 6/2005 | WO | WO 93/06316 A1 | 4/1993 |
| NZ | 532182 | | 12/2005 | WO | WO 93/12303 A1 | 6/1993 |
| NZ | 536129 | | 2/2006 | WO | WO 93/24711 | 12/1993 |
| PL | 154782 | | 9/1991 | WO | WO 94/19561 | 9/1994 |
| PL | 170678 | | 11/1991 | WO | WO 95/07177 | 3/1995 |
| PL | 170678 | B1 | 1/1997 | WO | WO-9507177 | 3/1995 |
| PL | 190446 | | 3/1998 | WO | WO 95/20066 | 7/1995 |
| PL | 106840 | | 1/1999 | WO | WO-9520066 | 7/1995 |
| PL | 190446 | B1 | 9/1999 | WO | WO 95/26450 | 10/1995 |
| PL | 339671 | | 1/2001 | WO | WO 96/07538 | 3/1996 |
| PL | 190627 | | 12/2005 | WO | WO-9607538 | 3/1996 |
| RU | 2039019 | C1 | 7/1995 | WO | WO 96/14482 | 5/1996 |
| RU | 2039019 | | 9/1995 | WO | WO 96/17996 | 6/1996 |
| RU | 2161695 | | 1/2001 | WO | WO 96/40598 | 12/1996 |
| RU | 2161695 | C2 | 1/2001 | WO | WO-9640598 | 12/1996 |
| RU | 2167485 | | 5/2001 | WO | WO 97/08111 | 3/1997 |
| RU | 2167485 | C2 | 5/2001 | WO | WO-9707968 | 3/1997 |
| RU | 2168485 | | 6/2001 | WO | WO-9708111 | 3/1997 |
| RU | 2168485 | C1 | 6/2001 | WO | WO-9708401 | 3/1997 |
| RU | 2243189 | | 12/2004 | WO | WO 97/21640 | 6/1997 |
| RU | 2243189 | C1 | 12/2004 | WO | WO-9721640 | 6/1997 |
| SE | 9604599-2 | L | 6/1998 | WO | WO 97/27027 | 7/1997 |
| SG | 97920847 | | 11/1990 | WO | WO 97/27152 | 7/1997 |
| SG | 92906122 | | 10/1992 | WO | WO-9723696 | 7/1997 |
| SG | 97912869 | | 4/1993 | WO | WO-9725389 | 7/1997 |
| SG | 93908341 | | 9/1993 | WO | WO-9727152 | 7/1997 |
| SG | 95012084 | | 1/1994 | WO | WO 97/28342 | 8/1997 |
| SG | 96026257 | | 4/1994 | WO | WO 97/31153 A1 | 8/1997 |
| SG | 96120035 | | 4/1995 | WO | WO 98/03284 | 1/1998 |

| | | |
|---|---|---|
| WO | WO-9803284 | 1/1998 |
| WO | WO 98/10151 | 3/1998 |
| WO | WO 98/12149 | 3/1998 |
| WO | WO-9812149 | 3/1998 |
| WO | WO 98/16697 | 4/1998 |
| WO | WO 98/18855 | 5/1998 |
| WO | WO-9818855 | 5/1998 |
| WO | WO 98/27027 | 6/1998 |
| WO | WO-98/27027 | 6/1998 |
| WO | WO 98/29353 | 7/1998 |
| WO | WO-9829353 | 7/1998 |
| WO | WO-9832713 | 7/1998 |
| WO | WO-9845222 | 10/1998 |
| WO | WO 99/08885 | 2/1999 |
| WO | WO-9908885 | 2/1999 |
| WO | WO-9913185 | 3/1999 |
| WO | WO-9922095 | 5/1999 |
| WO | WO-9931158 | 6/1999 |
| WO | WO 99/35330 | 7/1999 |
| WO | WO-9943904 | 9/1999 |
| WO | WO 99/64692 | 12/1999 |
| WO | WO 00/00449 | 1/2000 |
| WO | WO-0000449 | 1/2000 |
| WO | WO-0008271 | 2/2000 |
| WO | WO-0014354 | 3/2000 |
| WO | WO 00/21901 | 4/2000 |
| WO | WO-0021901 | 4/2000 |
| WO | WO 00/48960 | 8/2000 |
| WO | WO-0048960 | 8/2000 |
| WO | WO 00/55446 | 9/2000 |
| WO | WO 00/61519 | 10/2000 |
| WO | WO 00/63506 | 10/2000 |
| WO | WO 00/65166 | 11/2000 |
| WO | WO 00/71336 A1 | 11/2000 |
| WO | WO 01/16048 | 3/2001 |
| WO | WO-0116048 | 3/2001 |
| WO | WO-01/24988 | 4/2001 |
| WO | WO 01/25561 | 4/2001 |
| WO | WO 01/25562 | 4/2001 |
| WO | WO 01/26894 A1 | 4/2001 |
| WO | WO 01/30927 | 5/2001 |
| WO | WO 01/36191 | 5/2001 |
| WO | WO 01/43931 A1 | 6/2001 |
| WO | WO 01/49952 | 7/2001 |
| WO | WO 0151427 | 7/2001 |
| WO | WO-0151427 | 7/2001 |
| WO | WO 01/59228 A1 | 8/2001 |
| WO | WO 01/65021 A1 | 9/2001 |
| WO | WO 01/66485 | 9/2001 |
| WO | WO 01/68547 | 9/2001 |
| WO | WO 01/68547 A | 9/2001 |
| WO | WO 01/68777 | 9/2001 |
| WO | WO-0168777 A1 | 9/2001 |
| WO | WO 01/72863 | 10/2001 |
| WO | WO 01/73239 | 10/2001 |
| WO | WO-0172863 | 10/2001 |
| WO | WO 01/81666 A2 | 11/2001 |
| WO | WO 02/02481 | 1/2002 |
| WO | WO 02/12623 A1 | 2/2002 |
| WO | WO 02/18486 A2 | 3/2002 |
| WO | WO-02/26897 | 4/2002 |
| WO | WO 02/27109 | 4/2002 |
| WO | WO 02/28795 | 4/2002 |
| WO | WO 02/28795 A2 | 4/2002 |
| WO | WO 02/28796 | 4/2002 |
| WO | WO 02/28796 A2 | 4/2002 |
| WO | WO 02/31287 | 4/2002 |
| WO | WO 02/32830 A2 | 4/2002 |
| WO | WO 02/33164 A2 | 4/2002 |
| WO | WO 02/38518 | 5/2002 |
| WO | WO-02/39039 | 5/2002 |
| WO | WO-0242064 A1 | 5/2002 |
| WO | WO 02/055806 A1 | 7/2002 |
| WO | WO 02/070218 A1 | 9/2002 |
| WO | WO 02/070247 A1 | 9/2002 |
| WO | WO 02/070421 | 9/2002 |
| WO | WO 02/070425 A1 | 9/2002 |
| WO | WO 02/072499 A2 | 9/2002 |
| WO | WO-02070145 | 9/2002 |
| WO | WO-02070218 A1 | 9/2002 |
| WO | WO-02070247 | 9/2002 |
| WO | WO-02070421 | 9/2002 |
| WO | WO 02/081839 A1 | 10/2002 |
| WO | WO 02/081840 A1 | 10/2002 |
| WO | WO 02/081841 A1 | 10/2002 |
| WO | WO 02/081842 A1 | 10/2002 |
| WO | WO 02/070145 | 12/2002 |
| WO | WO 02/096824 A1 | 12/2002 |
| WO | WO-03/074193 | 9/2003 |
| WO | WO-03/106365 | 12/2003 |
| WO | WO 2004/011391 | 2/2004 |
| WO | WO 2004/018090 | 3/2004 |
| WO | WO 2004/031093 | 4/2004 |
| WO | WO-2004033388 | 4/2004 |
| WO | WO 2004/063113 | 7/2004 |
| WO | WO-2004063113 | 7/2004 |
| WO | WO 2004/087412 | 10/2004 |
| WO | WO 2004/101137 | 11/2004 |
| WO | WO-2004101137 A1 | 11/2004 |
| WO | WO 2005/003478 A1 | 1/2005 |
| WO | WO-2005019550 | 3/2005 |
| WO | WO-2005035900 | 4/2005 |
| WO | WO-2005068741 | 7/2005 |
| WO | WO-2005078210 | 8/2005 |
| WO | WO-2005083191 | 9/2005 |
| WO | WO-2006039762 | 4/2006 |
| WO | WO-2006056644 | 6/2006 |
| WO | WO-2006086842 | 8/2006 |
| WO | WO-2006091929 | 8/2006 |
| WO | WO-2006113379 | 10/2006 |
| WO | WO-2007005041 | 1/2007 |
| WO | WO-2007009935 | 1/2007 |
| WO | WO 2007/067774 | 6/2007 |
| WO | WO-2007/067774 A2 | 6/2007 |
| WO | WO-2007115379 | 10/2007 |
| WO | WO-2008066746 | 6/2008 |
| WO | WO-2008100777 | 8/2008 |

OTHER PUBLICATIONS

Opposition to EP-B-1330571 dated Jan. 19, 2007.
Zhou, M., "The Trial of Antisepsis and Mothproof on Rural Timber Structure Architectures," China Wood Industry, Issue 2 of 1987, pp. 16-24.
International Search Report for PCT/US05/007581.
International Preliminary Report on Patentability for PCT/US2005/007581 dated Jun. 19, 2007.
Letter to European patent Office from Opponent REDCO dated Aug. 1, 2008 (14 pages, including translation).
Documents from the Examination Procedure of European Patent Application No. 05075809.3, submitted to European Patent Office on Aug. 1, 2008 by Opponent REDCO.
Locher, F.W., "Fundaments of Production and Application" VBT; 2000 (w translation).
"Effect of the Extraction Temperature upon the COD value of a Cellulose Pulp" (date unknown) (author unknown), 1 page (w/translation).
"Pre-Extraction of Hemicelluloses and Subsequent Kraft Pulping, Part 1: Alkaline Extraction" article from Tappi Journal (Jun. 2008) (6 pages).
Letter to European Patent Office from Opponent Saint Gobain dated Aug. 1, 2008 (3 pages, including translation).
Berry, C., "Determination of the Influence of Pulp Chemical Oxygen Demand on the Flexural Strength of Cured Fibercement" (11 pages) (date unknown).
Final Office Action Mailed Jan. 16, 2008 in U.S. Appl. No. 10/753,089 (2004/0168615).
Response to Final Office Action Filed Oct. 31, 2007 in relation to U.S. Appl. No. 10/753,089 (2004/0168615).
IDS filed Sep. 28, 2007 and Oct. 29, 2007 and Initialed by Examiner on Jan. 16, 2008 in U.S. Appl. No. 10/753,089 (2004/0168615).
Written Opinion for WO 02/028796 A2.
Skaggs et al. "Applications of rehological modifiers and super plasticizers in cementitious systems," American Concrete Institute SP, (1994), SP-148, 189-207.

Gehm, H.W., New & Basic Research Approaches to liquid effluent treatment Paper Trade Journal (1958), 142 (No. 16), 40-4, 46.

Benitez et al. "Optimization technique for sewage sludge conditioning with polymer and skeleton builders," Water Research (1994), 28(10), 2067-73.

Blankenburg et al, "Quality and possible use of brown coal fly ash of East Germany" Frieberger Forschungshefter C (1986), C 413, 102-14.

Xu et al. "Study on particle size distribution and chemical activity of mechanical activity fly ash," Guisuanyan Tongbao (2003), 22(2), p. 73-76.

Self-leveling elastic water-proofing coating, Shangai Building Materials, Issue 6, 2000, pp. 24-25 (5 pgs).

Sevcik V., XP002389199, "Mixture for Refractory Purposes," Database EPODOC, European Patent Office, the Hague, NL; abstract (Oct. 15, 1997).

Chemical Abstracts, vol. 103, No. 22, Dec. 2, 1985, Abstract No. 182776h, p. 299, XP000188580 & CS222361 "Mixture for Autoclaved lime-silica concrete".

Chemical Abstracts, vol. 84, No. 16, Apr. 19, 1976, Abstract No. 110612t, p. 333, XP000189097 & JP 75095319 High-strength, extrusion-molded, lightweight calcium silicate product.

Chemical Abstracts, vol. 95, No. 2, Jul. 13, 1981, Abstract No. 11663f, p. 285, XP000187478 & JP 56014466 "High-strength calcium silicate products".

Bessey, G.E. "Hydrated Calcium Silicate Products Other Than Hydraulic Cements"—The Chemistry of Cements, edited by H.F.W. Taylor, vol. 2, p. 101-133, Academic Press.

Crennan et al. "Autoclaved Lime-Quartz Materials," Cement and Concrete Research, vol. 7, p. 493-502, 1977.

Abo-El-Enein et al "Autoclaved Calcium Silicate Hydrates, I—Rates of Formation and Molar Composition," II Cemento Mar. 1990.

Isu et al. "Influence on Quartz particle size on the Chemical & Mechanical Properties of Autoclaved Aerated Concrete," Cement & Concrete R., vol. 25, p. 243, 1995.

Y. Arai et al. "Crystal Shape and Size Controls of Xonotlite," Gypsum and Lime, No. 248, p. 17, 1994.

CRC Handbook of Chemistry & Physics, 62nd ed., p. F-124.

Aitken, A. & Taylor, H.F.W., "Hydrothermal Reactions in Lime-Quartz Pastes" J. Appl. Chem., 10 (1960) 7.

Assarsson, G.O., "Hydrothermal Reactions Between Calcium Hydroxide and Muscovite and Feldspar at 120-220 oC," J. Phys. Chem., 64 (1960) 626.

Chan, C.F. et al. "Formation of 11 A Tobermorite from Mixtures of Lime and Colloidal Silica with Quartz" Cem. Concr. Res., 8 (1978) 135-138.

Kondo, R., Int. Symp. "Kinetic Study on Hydrothermal Reaction Between Lime and Silica" Autoclaves Calcium Silicate Building Products, London, 1965, 92 (1967).

Kondo, R. et al., "Kinetics and Mechanism of Hydrothermal Reaction in Lime-Quartz-Water System" J. Ceram. Soc. Japan, 84 (1976) 573.

Celite Material Safety Data Sheet (MSDS)—revised date Jul. 10, 1992.

Kennedy, G.C.; Econ. Geol. 45[7] 652 (1950).

Chemical Abstracts, abstract 54763d, vol. 117, No. 6; American Chemical Society, Columbus, US.

Chemical Abstract, vol. 90, No. 16, Apr. 16, 1979; American Chemical Society, Columbus, US.

Chemical Abstracts, vol. 95, No. 16, Oct. 19, 1981, p. 288; American Chemical Society, Columbus, US.

Chemical Abstracts, vol. 86, No. 18, May 2, 1977; p. 303; American Chemical Society, Columbus, US.

Chemical Abstracts, vol. 95, No. 2, Jul. 13, 1981, p. 282; American Chemical Society, Columbus, US.

Chemical Abstracts, vol. 98, No. 22, May 30, 1983; American Chemical Society, Columbus, US; p. 312.

"Celite Products", 2006 World Minerals Corporation, http://www.worldminerals.com/celite.html; 1 pg.

Vermiculite Properties, The Vermiculite Association, 3 pgs, internet article located at http:/www.vermiculite.org/properties.htm (printed Aug. 6, 2007).

Webster's II New Riverside University Dictionary (1984) p. 587 Definition of "hollow".

Silica Fume, Cement Association of Canada, 2 pgs., internet article located at htt:/www.cement.ca/cement.nsf/ep/07669ADF88663915852568A9005A7770?opendocument (printed Aug. 6, 2007).

Muscovite Mica and Phlogopite Mica, from READE, internet article located at http://www.reade.com/Products/Minerals_and_Ores/mica.html (printed Aug. 6, 2007).

Litigation documents corresponding to Civil Case Nos. SCVSS115246, 5:04-CV-00674-RT-SGL, 04-C-1621, 05-CV-44, and A2-04-152.

Hoar, T.P., "The Production and breakdown of the passivity of metals," Corrosion Science, 1967, 341-355, V.7.

Johnson, C.A. et al., "Leaching Behavior and Solubility—Controlling Solid Phases of Heavy Metals in Municipal Solid Waste Incinerator Ash," Waste Management, 1996, 129-134, V. 16 (1-3).

Joshi, P.S., et al. "Passivation of Carbon Steel Alloy in De-oxygenated Alkaline pH Media," Corrosion Science, 1993, 1367-1379, V. 34(8).

Omurtag, Y. et al. Some Investigations on the Corrosion Characteristics on Fe-Si Alloys, Corrosion Science, 1970, 225-231, V.10.

Singh, R., et al. "Stabilization of Natural Faujasite Zeolite: Possible Role of Alkaline Earth Metal Ions," Microporous and Mesoporous Materials, 1998, 103-109, V. 21.

Stolica, N., Corrosion Science: Pitting Corrosion on Fe-Cr and Fe-Cr-Ni Alloys, 1969, 455-470, V.9.

Sukhotin, A.M. et al. Corrosion Science: The Passivity of Iron in Acid and Alkaline Solutions, 1965, 393-407, V.5.

Tack, F.M. et al. "Environmental Pollution: Metal Solubility as a Function of pH in a Contaminated Dredged Sediment Affected by Oxidation," 1996, 199-208, V.91.

Tourky, A.R. et al. Corrosion Science: Further Studies on the Effect of C-content on the Corrosion and Passivity of Fe, 1968, 857-870, V.8.

Novakovsky, V.M. Electrochimica Acta: Thermodynamic and Kinetic Causes of Passivity, 1965, 353-365, V.10.

Pawlowski et al, "Novel raw material for producing heat insulating materials" Silikattechnik (1982) 33(11), 339-340.

Kolay, et al. "Physical, chemical, mineralogical, and thermal properties of cenospheres from an ash lagoon" Dec. 29, 2000 (pp. 539-542).

"What Are Cenospheres" article at http://www.microspheres.co.za/contents.htm, printed Jul. 11, 2006 (5 pgs).

Gubka article "Composition and Morphology of Cenospheres" printed Jul. 11, 2006 located at website: http://www.atom.nw.ru/rie/projects/gubka/properties/cenospheres.shtml (2 pgs).

Drozhzhin et al., "Technical Monitoring of Microspheres from Fly Ashes of Electric Power Stations in the Russian Federation" (8 pgs).

3M Material Safety Data Sheet 3M Glass Bubbles, Types K and S; 7 pgs.

"Glass" Corning Glass Works—reprinted version of the Encyclopedia of Chemical Technology (vol. 10) 2nd ed. (pp. 542-543) 1955.

Amaral, S.T., et al. "Passivation of pure iron in alkaline solution containing silicate and sulphate," Corrosion Science, 1999, 747-758, V.41.

Wattyl, Granosite GranoSkin Decorative Membrane Datasheet 5.02, Jan. 6, 1999 (6 pgs).

Ardex, Sheltercoat Façade, Shelter Waterproofing Membranes, Mar. 10, 2002 (1 pg).

Ameron Coatings, Amercoat 288 Flexible Water-Borne Acrylic Membrane, Aug. 1999 (2 pgs).

MBT Middle East: Datasheets, Masterseal 300H, Jun. 2002.

Panels: Materials and Manufacturing Process, M5 Tunnel Specification, 17 pgs. Jul. 24, 2001.

Technische Information, Disbocolor 494, Acryl-Schutz, Disbon, 6 pp., Apr. 1996.

Technisches Merkblatt 51.800, Betonschutz 800 seidenmatt, 4 pgs., Jan. 1, 1988.

Duxson, et al. "The Thermal Evolution of Metakaolin Geopolymers: Part 2—Phase Stability and Structural Development" Journal of Non-Crystalline Solids 353 (2007), 2186-2200.

Fortes-Revilla et al. "Modelling of Slaked Lime-Metakaolin Mortar Engineering Characteristics in Terms of Process Variables" Cement & Concrete Composites 28 (2006) 458-467.
Badogiannis et al. "Metakaolin as a Main Cement Constituent. Exploitation of Poor Greek Kaolins" Cement & Concrete Composites 27 (2005) pp. 197-203.
Courard et al. "Durability of Mortars Modified with Metakaolin" Cement and Concrete Research 33 (2003) pp. 1473-1479.
Li et al. "Property Improvement of Portland Cement by Incorporating with Metakaolin and Slag" Cement and Concrete Research 33 (2003) 579-584.
Saikia et al. "Cementitious Properties of Metakaolin—Normal Portland Cement Mixture in the Presence of Petroleum Effluent Treatment Plant Sludge" Cement and Concrete Research 32 (2002), pp. 1717-1724.
Asbridge et al. "Effects of Metakaolin, Water/Binder Ratio and Interfacial Transition Zones on the Microhardness of Cement Mortars" Cement and Concrete Research 32 (2002) pp. 1365-1369.
Poon et al. "Rate of Pozzolanic Reaction of Metakaolin in High-Performance Cement Pastes" Cement and Concrete Research 31 (2001) pp. 1301-1306.
Boddy et al. "Long-Term Testing of the Chloride-Penetration Resistance of Concrete Containing High-Reactivity Metakaolin" Cement and Concrete Research 31 (2001) pp. 759-765.
Collier et al. "Encapsulation of Iron Hydroxide Floc in Composite Cement" Immobilisation Science Lab., Dept of Engineering Materials, 2004, (4 pgs).
"Forming Handsheets for Physical Tests of Pulp," TAPI, T 205 sp-95, 1995, pp. 5-7.
"Moisture in Pulp, Paper and Paperboard," TAPPI, T 412 om-94, pp. 1-3.
Harper, S., et al. "Resin Extraction and Effects on Pulp Quality," Proceedings of the 54th Appita Annual Conference, Melbourne, Apr. 3-6, 2000, pp. 575-580.
Stromberg, C.B., "Washing for Low Bleach Chemical Consumption," in Thomas W. Joyce (ed.), Environmental Issues: A TAPPI Press Anthology of Published Papers, TAPPI Press, Atlanta, 1990 pp. 230-238.
Stromberg, C.B. "Washing of Dissolved Organic Solids From Pulp" Paper Asia, Oct. 1994, pp. 32-39.
SCAN-Test Method C 45:00 "COD and TOC Removable by Washing" Scandinavian Pulp, Paper and Board Testing Committee, Revised 2000.
SCAN-Test Method CM 45:91, "Water-Soluble Organic Matter" Scandinavian Pulp, Paper and Board Testing Committee, (1991).
Extended European Search Report from the European Patent Office for EP App. No. 07008392.8, dated Oct. 8, 2007, 9 pp.
Drogowska, M. et al. "Influence of anions on the passivity behavior of copper in alkaline solutions," Surface and Coatings Technology, 1988, 383-400, V. 34.
Digital Fire Corporation "Do You Need to Know About Eutectics to Make a Good Glaze?" (4 pgs) website article located at http://www.digitalfire.ab.ca/cermat/education/119.php?PHPSESSID=1e2d7f3f3a24698394ecaae57ed3b06d5 dated Jul. 14, 2003.
Technology Education—Glass by Encyclopedia Britannica (4 pgs) website article located at http://www.geocities.com/tech_ed_2000/industrial/manufacturing/glass/glass.htm dated May 15, 2007.
Sphere Services Inc. "Cenospheres—Hollow Ceramic Microspheres" website article located at http://www.sphereservices.com/ceno.html dated May 15, 2007 (2 pgs).
Written Opinion for WO 02/028796 A2 dated May 28, 2002.
Final office action mailed Jan. 16, 2008 in U.S. Appl. No. 10/753,089 (2004/0168615).
Response to final office action filed Oct. 31, 2007 in relation to U.S. Appl. No. 10/753,089 (2004/0168615).
Information Disclosure Statement filed Sep. 28, 2007 and Oct. 29, 2007 and initialed by Examiner in U.S. Appl. No. 10/753,089 (2004/0168615).
U.S. Appl. No. 10/977,344, filed Oct. 29, 2004 entitled "Manufacture and Use of Engineered Carbide and Nitride Composites"; Inventor: Giang Biscan.
International Preliminary Report on Patentability and Written Opinion of the International Searching Authority for PCT/US2006/006799, issued Aug. 28, 2007, 11 pp.
Application No. 60417076.
U.S. Appl. No. 10/070,218 entitled "Extrudable Cementitious Material" filed Jul. 19, 2002; Inventor: Peter Goodwin.
ChemMasters (www.ChemMasters.net), Oct. 15, 2008.
Ambriose J. et al; Int. Congress GRC/87, 6th Biennial Congress of the GRCA, Oct. 20-23, (1987) Edinburgh, Scotland, pp. 19-24, "Metakaoline Blended Cements: An Efficient Way to Improve GRC Durability and Ductility".
U.S. Appl. No. 10/648,010 (status: abandoned in 2005); inventor: Datta; entitled "Synthetc Microspheres and Methods of Making Same", filed Aug. 25, 2003.
U.S. Appl. No. 11/026,340, filed Dec. 29, 2004, entitled Methods and Formulations for Producing Low Density Products; Inventor Hamid Hojaji (abandoned Dec. 8, 2005).
BGC Fibre Cement "Ceramic Tile Floor Underlay" Apr. 2002, (7 pgs.).
Certificate of Grant of Patent in copending Singapore Patent Application No. 200305728-8.
Chilean patent application 170-97 (S. Ind. Pizarreno, Dec. 5, 1997).
Chilean patent application 2673-97 (S. Ind. Pizarreno, Jan. 30, 1997).
CSR RendaLine—External Wall Cladding System—Brochure, Jan. 2002.
Database WPI, Section Ch, Week 1977, 23, Derwent Publications Ltd., London, GB, XP002159268.
Database WPI, Section Ch, Week 1977, 23, Derwent Publications Ltd., London, GB, XP002159269.
de Silva P.S. et al. Adv. in Cem. Res. (1990), vol. 3, No. 12, October, pp. 167-177, "Hydration of Cements Based on Metakaolin: Thermochemistry".
Decision to Grant a Patent and an Examination Report for copending Japanese Application No. 2002579593.
Department of Building and Housing, "Compliance Document for NZ Bldg Code Clause E2," 2005.
EPS Plaster Cladding Systems Technical and Installation Manual, Rockcote Architectural Coatings (NZ) Limited, Mar. 2003.
Examination Report for European Patent Application No. 00980518.5 dated Jan. 5, 2005.
Examination Reports in copending Chilean Application No. 656-02, dated 2005 and 2006.
Examiner's First Report for copending Australian Patent Application No. 2002250516 dated Dec. 14, 2006.
Expert Declaration of Prof. Dr. Dahl, with CV (Jan. 28, 2009).
Expert Declaration of Prof. Dr. Roffael (Jan. 28, 2009).
Gypsum Association Manual, 14th Edition 1994, p. 33-34.
Hardihome Lap Siding with the Embossed EZ Line Alignment Aid, Mar. 2000.
Hawley's Condensed Chemical Dictionary, Fourteenth Edition, Revised by Richard J. Lewis, Sr., published by John Wiley & Sons, Inc. pp. 447, 624, 903-904 (date unknown).
http://www.energy-seal.com/es-home.nsf/products/everlast.
International Preliminary Examination Report for Application PCT/US00/31729 dated Feb. 21, 2002.
International Preliminary Examination Report for Application PCT/US01/01908 dated Apr. 6, 2002.
International Preliminary Examination Report for Application PCT/US02/10608 dated Feb. 14, 2003.
International Preliminary Examination Report for Application PCT/US02/10609 dated Apr. 22, 2003.
International Preliminary Examination Report for Application PCT/US02/10610 dated Feb. 7, 2003.
International Preliminary Examination Report for Application PCT/US02/10760 dated Feb. 3, 2003.
International Preliminary Examination Report for Application PCT/US04/19980 dated Jul. 27, 2005.
International Preliminary Examination Report for PCT/US00/27451 dated Dec. 7, 2001.
International Preliminary report for PCT/IB2005/050709 dated Feb. 7, 2006.
International Search Report for AU 20049033567, filed Jun. 29, 2004.

International Search Report for PCT/US01/01908 dated Mar. 19, 2001.
International Search Report for PCT/AU00/00320 dated May 31, 2000.
International Search Report for PCT/AU97/00692 dated Dec. 3, 1997.
International Search Report for PCT/IB2005/050709 dated May 23, 2005.
International Search Report for PCT/US 02-10609 dated Aug. 7, 2002.
International Search Report for PCT/US 02/10608 dated Aug. 5, 2002.
International Search Report for PCT/US 02/10610 dated Aug. 5, 2002.
International Search Report for PCT/US 02/10760 dated Aug. 5, 2002.
International Search Report for PCT/US00/27451 dated Feb. 2, 2001.
International Search Report for PCT/US00/31729 dated Feb. 21, 2001.
International Search Report for PCT/US2004/019980 dated Sep. 15, 2004.
International Search Report for PCT/US2005/000957, filed Dec. 1, 2005.
James Hardie article, "External Wall Cladding," Oct. 1990 (2 pgs).
James Hardie article, "Primeline Weatherboards," Oct. 1996 (8 pgs).
Jianquan et al "Research on Water Resistant Performance of Modified Polymer Cement Composite Reinforced with Fiber" Mar. 2003.
Kuder, et al. "Extruded Fiber-Reinforced Composites for Building Enclosures" NSF Housing Research Agenda Workshop: Proceedings and Recommendations, Orlando, FL; Feb. 12-14, 2004, pp. 222-231.
Kuroki et al., "Cement-Bonded Board Industry and Market in Japan and New Technology Developments," 1995.
Letter from Sargent & Krahn dated Apr. 1, 2005 reporting First Substantive Report for Chilean Patent Application No. 653-2002 dated Mar. 4, 2002, which claims priority to U.S. Appl. No. 60/281,195, filed Apr. 3, 2001.
Letter from Sargent & Krahn dated Jan. 31, 2005 reporting First Substantive Report for Chilean Patent Application No. 655-2002 dated Mar. 4, 2002, which claims priority to U.S. Appl. No. 60/281,195, filed Apr. 3, 2001.
Letters Patent for copending New Zealand Patent No. 528779.
MacDougall, F.H., Excerpt "Reactions in Heterogeneous Systems" Thermodynamics and Chemistry (1921), title page and p. 64.
Mark, J.E., "Thermoset Elastomers" Applied Polymer Science 21st Century, pp. 209-222 (Clara D. Craver and Charles E. Carraher, Jr. ed., Elsevier 2000).
New Zealand Department of Building and Housing, "Non-flush finished joints," Jul. 1, 2005, Acceptable Solution E2/AS1 (extract from the New Zealand Building Code) 1 pg).
Notice of Opposition of Chilean patent application No. 653-2002 (dated Mar. 2003).
Notice of Opposition of Chilean patent application No. 654-2002 (dated Sep. 2003).
Notice of Opposition of Chilean patent application No. 655-2002 (dated Sep. 2003).
Notice of Opposition of Chilean patent application No. 656-2002 (dated Oct. 2003).
Notice of Registration and two Office Actions in copending China Application No. 02811237.7.
Notification of First Office Action for Chinese Patent Application No. 00815911.4 dated Sep. 24, 2004.
Notification of First Office Action for Chinese Patent Application No. 02811074.9 dated Feb. 4, 2005.
Notification of First Office Action for Chinese Patent Application No. 02811168.0 dated Mar. 18, 2005.
Notification of First Office Action for Chinese Patent Application No. 02811237.7 dated Mar. 18, 2005.
Office Action mailed Oct. 5, 2005 in U.S. Appl. No. 10/117,401.
Office Action mailed Nov. 3, 2003 in U.S. Appl. No. 10/117,401.
Office Action mailed Dec. 12, 2006 in U.S. Appl. No. 10/117,401.
Office Action mailed Mar. 14, 2005 in U.S. Appl. No. 10/117,401.
Office Action mailed Mar. 27, 2006 in U.S. Appl. No. 10/117,401.
Office Action mailed Jul. 13, 2007 in U.S. Appl. No. 10/117,401.
Office Action mailed Aug. 25, 2004 in U.S. Appl. No. 10/117,401.
PBS Distributors Ltd. Trade Literature relating to Vent-Clad Cladding System, Aug. 2003.
PCA (Portland Cement Assoc) article "Concrete Homes—Fiber Cement Siding" (3 pgs), http://www.cement.org/homes/ch_bs_fibercement.asp, (Retrieved Sep. 13, 2005).
Plaster Systems, Ltd., "Insulclad Cavity Based Exterior Plaster Cladding System Specification," Feb. 2004.
Plaster Systems, Ltd., "Insulclad Cavity Based Exterior Plaster Cladding System Specification," Oct. 2003.
Ray A, et al., Thermochimica Acta 250 (1995) pp. 189-195 "Use of DTA to determine the Effect of Mineralizers on the Cement-Quartz Hydrothermal Reactions."
Stoanz Trade Literature, Jan. to May 2004.
Stoanz Trade Literature, Nov. 2003.
Supplemental European Search Report (EP 97943673) dated Mar. 27, 2001.
Translation of Taiwanese Patent Office Decision of Appeal and Opposition (App. #85114421).
Two EPO Examination Reports in copending Application No. 02-719-435.6.
U.S. Patent Appl. No. 11/816,379, national phase entry of PCT/AU06/000202 filing or 371C date: Aug. 15, 2007, entitled "Flooring Sheet and Modular Flooring System"; first-named inventor: James Gleeson.
U.S. Appl. No. 10/873,723, filed Jun. 21, 2004 entitled "Durable Building Article and Method of Making Same"; Inventor: _ (Abandoned May 18, 2005).
U.S. Appl. No. 60/536,172, filed Jan. 12, 2004; first-named nventor: Lyons et al.; entitled Composite Fiber Cement Article with Radiation Curable Component.
Written Opinion of the International Searching Authority for PCT/US2004/019980 dated Dec. 20, 2005.
Zdenek Sauman et al; II Cemento, vol. 3, 1978, pp. 343-350 "influence Explanation of Siliceous Materials Additive to Cement as well as of Pastes Hydration and Their Treatment Temperature on the Lime Quantity Liberated by Rehydration".
Decision to Grant for Patent and Preliminary Notice of Objection in copending Korean Application No. 10-2003-7013036.
Letter from Sargent & Krahn dated Apr. 11, 2005 reporting First Substantive Report for Chilean Patent Application No. 656-2002 dated Mar. 4, 2002, which claims priority to U.S. Appl. No. 60/281,195, filed Apr. 3, 2001.
BIA (NZ) Consultation Document Jun. 2003 "Proposed Change to Building Code Clause E2 External Moisture".
Examination Report for EP 00980518.5 dated Jan. 5, 2005.
Letter to from Saint Gobain to EPO in opposition proceeding of EP 1330571 dated Aug. 1, 2008 (3 pgs).
Decision of Opposition in relation to Taiwanese Patent Application No. 85114421 (corresponding to US Patent No. 6,510,667), issued Aug. 3, 1998 (with Translation).
Rozman et al., "Improvements of Fibreboard Properties through Fibre Activation with Silane," Intern. J. Polymeric Mater., vol. 32 (1996) pp. 247-257.
Decision of Appeal in relation to Taiwanese Patent Application No. 85114421 (corresponding to US Patent No. 6,510,667), issued Feb. 24, 1999 (with Translation).
EPO Examination Reports in Application No. 02-719-435.6.
International Search Report for Application PCT/US02/10609 dated Aug. 1, 2002.
Decision of Opposition in relation to Taiwanse Patent Application No. 85114421 (corresponding to U.S. Patent No. 6,510,667), issued Aug. 3, 1998 (with Translation).
Kondo, R., Int. Symp. "Kinetic Study on Hydrothermal Reaction Between Lime and Silica" Autoclaves Calcium Silicate Building Products, London, 1965, pp. 92-100.
Kondo, R. et al., "Kinetics and Mechanism of Hydrothermal Reaction in Lime-Quartz-Water System" J. Ceram. Soc. Japan, 84 (1976) pp. 573-578.
Webster's II New Riverside University Dictionary (1984) p. 587 Definition of "hollow".
Omurtag, Y. et al. Corrosion Science Some Investigations on the Corrosion Characteristics on Fe-Si Alloys, 1970, 225-231, V.10.

Singh, R., et al. Microporous and Mesoporous Materials: Stabilization of Natural Faujasite Zeolite: Possible Role of Alkaline Earth Metal Ions, 1998, 103-109, V. 21.
Scan-Test Method CM 45:91, Water-Soluble Organic Matter Scandinavian Pulp, Paper and Board Testing Committee, (1991).
British Board of Agreement: "Duracem Slates" BBA Certificate, XX, XX, No. 84/1330, Jun. 26, 1984, pp. 1-4, XP003017443.
BBA: "Eternit 2000 Slates and Fittings" BBA Certificate, XX, XX, No. 96/3283, Sep. 20, 1996, pp. 1-6, XP003017444.
Eternit Gevel et al: "Multiboard 38xx" Announcement Etex Group, XX, XX, Jan. 1, 2002, p. 1-4, XP003017450.
Kalbskopf R et al: "Durability of fiber-cement roofing products" International Inorganic Bonded Wood and Fiber Composites Conference, XX, XX, Sep. 1, 2002, pp. 1-7, XP003017452.
Derwent Accession No. 2000-339294 for WO0021901 and AU 11373/00 to James Hardie Research Pty Limited dated May 1, 2000.
Derwent Acc. No. 2009E28129 of CN 101337822 to Deng et al. dated Jan. 2009.
Abstract of EP 1144129 A1 to Advanced Photonics Tech AG dated Oct. 17, 2001.
Abstract of EP 1556313 A1 to HRD Corp dated Jul. 27, 2005.
Abstract of DE 4004103 A1 to Wendker Leichtmetall dated Aug. 14, 1991.
Abstract of DE 4104919 A to Veit Dennert dated Aug. 20, 1992.
Derwent Acc No. 1981-00856D for FR 2451428, published Nov. 14, 1980.
Machine translation for FR 2451428 issued Nov. 1980.
Abstract of HU 60701 to Kocsis dated Oct. 1992.
Machine translation for JP 2714135 dated Oct. 1997.
Abstract for JP 4149352 (A) to Asahi Chem. dated May 22, 1992.
Derwent Acc No. 1977-40569Y/197723 for JP 52051719 A to Kanebo Ltd dated Apr. 25, 1977.
Machine translation of JP 06123158 A to Shimizu Const. Co. Ltd. dated May 6, 1994.
Machine translation of JP 06278116 A to Kubota KK dated Oct. 4, 1994.
Machine translation of JP 07010621 to Daiwa Spinning Co. Ltd. dated Jan. 13, 1995.
Abstract for JP 08074377 A to Misawa Homes Co Ltd dated Mar. 19, 1996.
Machine translation of JP 10025841 A to Toei Kensetsu Kogyo:KK dated Jan. 27, 1998.
Abstract re JP 10046741 A to Misawa Homes Co Ltd dated Feb. 17, 1998.
Abstract re JP 11241448 A to Misawa Homes Co Ltd dated Sep. 7, 1999.
Abstract re JP 1178658 to Mikio Yoshimatsu dated Jul. 14, 1989.
Abstract re JP 2000154612 A to Matsushita Electric Works Ltd dated Jun. 6, 2000.
Abstract re JP 2000179104 A to Tokyo Line KK dated Jun. 27, 2000.
JPO Abstract of JP 2001335385 A to Matsushita Electric Works Ltd. dated Dec. 4, 2001.
JPO Abstract of JP 2001336230 A to Kuwazawa:KK dated Dec. 7, 2001.
Abstract re JP 2004027497 A to Sekisui House KK dated Jan. 29, 2004.
JPO Abstract of JP 2002047750 A to Sankyo Alum Ind Co. Ltd. dated Feb. 15, 2002.
Derwent Acc. No. 2003-187704 re JP 2002212494 A to Kurosawa et al. dated Jul. 31, 2002.
Translation of application JP 48-15522 for publication JP 49-116445 dated Feb. 5, 1973.
Abstract re JP 565760 A to Fujita Corp dated Mar. 19, 1993.
Derwent Abstract Accession No. 39963 K/17 JP58045008, dated Mar. 16, 1983 JP 58045008 to Yoita S. dated Mar. 16, 1983.
Derwent Abstract Accession No. 47872 K/20; JP 58059803; dated Apr. 9, 1983 JP 58059803 to Yoita S. dated Apr. 9, 1983.
Chemical Abstracts, vol. 109, No. 26, Dec. 26, 1988, Abstract No. 235933q re JP 63117939 to Kajima Corp dated May 21, 1988.
JPO Abstract re JP 64-20910 to Seco Tools AB dated Jan. 24, 1989.
JPO Abstract re JP 64-22385 to Showa Denko KK dated Jan. 25, 1989.
JPO Abstract re JP 64-25200 to Hitachi Ltd dated Jan. 27, 1989.

Machine translation for KR 1994-0006957 to HyoSeong dated Apr. 26, 1994.
Abstract re NZ 211265 to Capper et al. dated Feb. 28, 1985.
Abstract re NZ 22705 to Walker dated Jul. 17, 1989.
Abstract re NZ 240533 to Howe dated Jul. 26, 1996.
Abstract re NZ 242960 to USG Interiors Inc. dated Dec. 19, 1997.
Abstract re NZ 248942 to Moore dated Nov. 24, 1997.
Abstract re NZ 259493 to RAR Consultants dated Oct. 24, 1997.
Abstract re NZ 26066 to Billington dated Jul. 27, 1994.
Abstract re NZ 306382 to Howe dated Feb. 26, 1998.
Abstract re NZ 314544 to RAR Consultants dated Jun. 26, 98.
Abstract re NZ 331336 to McClew et al. dated Apr. 27, 2001.
NZPO abstract re NZ 334918 to McKenzie dated Aug. 25, 2000.
NZPO abstract re NZ 502004 to Harkins dated Aug. 28, 2002.
NZPO abstract re NZ 504881 to Trend Windows dated Mar. 28, 2003.
NZPO abstract re NZ 505799 to Seton dated Feb. 28, 2003.
NZPO abstract re NZ 507846 to Quiskamp dated Apr. 26, 2002.
NZPO abstract re NZ 508055 to Ricciotti dated Dec. 22, 2000.
NZPO abstract re NZ 512028 to Construction Specialties dated Jul. 25, 2003.
NZPO abstract re NZ 516912 to Vanderwerf et al. dated Jul. 25, 2003.
NZPO abstract re NZ 517658 to CSR LTD dated Nov. 28, 2003.
Derwent Abstract Accession No. 85-091806/15 SU 1114646, dated Sep. 23, 1984 to Marijskij.
Derwent Abstract Accession No. 853321 A/47; SU 587123, dated Jan. 5, 1978 to Kilnzh.
Derwent Abstract Accession No. 27516B/14; SU 607813, dated Apr. 25, 1978 to GvniiStr.
Derwent Abstract Accession No. 92327B/15; SU 655678, dated Apr. 8, 1979 to Belgorodskij.
EPO abstract of TW 255851 B to Chung Shan dated Jun. 1, 2006.
Abstract re WO 93/21126 to Willich Daemmstaffe dated Oct. 28, 1993.
International Search Report, mailed Nov. 12, 2003.
Technical File by Louisiana-Pacific Samao, Inc. sent to Redco on May 5, 1999.
Declaration by a Representative of the company (Bill Adams), Weyerhauser, and copies of bills dated prior to Oct. 17, 1999.
M.D. Campbell and R.S.P. Coutts, Wood fibre-reinforced cement composites, in Journal of Materials Science, 15 (1980), pp. 1962-1970.
R.S.P. Coutts, "From forest to factory to fabrication," in Fibre Reinforced Cement and Concrete, 1992, ed. R.N. Swamy, E & FN SPON, London, pp. 31 to 47.
Extract from Webster's Third New International Dictionary of the English Language unabridged, ed Merriam-Webster Inc., Springfield, 1986.
Woods, Amy Lamb "Keeping a Lid on It: Asbestos-Cement Building materials" Aug. 2000 (12 pgs) internet article located at: www.cr.nps.gov/hps/tps/recentpast/asbestosarticle.htm.
Chapter 5 "Asbestos Cement Products" pp. 25-40 (book unknown).
Chemical Abstracts on STN "Plasticizing effect of aliphatic amines on cements" Babachev et al, Build Sci Inst. Sofia Bulgaria; Epitoanyag (1972), 24(11), 430-5; Abstract Only.
Chemical Abstracts, vol. 94, No. 8, Feb. 23, 1981; Columbus, Ohio; abstract No. 51915a, XP 000186251 "Building Materials with Improved Black Mold Resistance".
Chemical Abstracts "Lightweight cement moldings." American Chemical Society, Columbus, US, vol. 104:114971p., Apr. 7, 1986, XP000183799 ISSN: 0009-2258.
Hawley's Condensed Chemical Dictionary, Richard Lewis Sr., Twelfth Edition, 1993 Van Nostrand Reinhold, p. 435 definition of "dispersing agent."
A.D. Shapiro et al., Bumazhnaya Promyshiennost 36, 12 (1961) XP-002335287 "manufacture of board resistant to biological degradation".
Database WPI Section Ch, Week 198610 Derwent Publications Ltd., London, GB; AN 1986-066741 (XP002335289).
XP002197953 & JP 2001 240458 A, Kamishima Kagaku Kogyo KK) Database WPI, Section Ch, Week 200212, Derwent Publications Ltd., London, GB; AN 2002-085436, Sep. 4, 2001 abstract.

Finnish Forest Industries Federal "Mechanical Pulp Production" internet article located at http://english.forestindustries.fi/products/pulp/mechanical.html dated Nov. 10, 2004 (2 pgs).

Ekman et al., "Studies on the Behavior of Extractives in Mechanical Pulp Suspensions," the Institute of Paper Science and Technology; Jun. 1990.

XP002194276 (Abstract Bulletin) Ekman et al., "Studies on the Behavior of Extractives in Mechanical Pulp Suspensions" Nordic Pulp Paper Res. J.2, No. 5; 96-102 (Jun. 1990).

Soroushian, Parviz "Development of Specialty Cellulose Fibers and Cementitious Matrices for Cellulose Fiber Reinforced Cement Composites".

"Improvements in the Durability of Cellulose Reinforced Cementitious Composites," Lin et al. Mechanisms of Chemical Degradation of Cement based systems, Proceedings of the Materials Research Society's Symposium of Mechanisms, Boston, Nov. 27-30, 1995.

Neithalath, Narayanan, et al Acoustic Performance and Damping Behavior of Cellulose Cement Composites, Cement & Concrete Composites 25 (2003).

Mai et al., "Effects of Water and Bleaching on the Mechanical Properties of Cellulose Fiber Cements" Journal of Materials Science 18 (1983) 2156-62.

Mai et al., "Slow Crack Growth in Bleached Cellulose Fibre Cements" Journal of Mat'ls Science Letters 3 (1984), 127-130.

JUBOCID "Special Anti-Mildew Coatings" Sep. 2002 (4 pgs).

Thai MDF Board Co., Ltd "Beger Synotex Acrylic TM 100% Emulsion Paint" (2 pgs) 2003 article located at: http://www.thaimdf.com/paint_roofpaint.htm.

"Hardi-Plank and Surface Mold" article located at internet http://www.nefsi.org/wwwboard/messages/439.html (2 pgs).

Force 10 Caribbean "Custom Features" Engineered Building Systems (5 pgs) 1999.

Third Party Observation filed by Redco NV on Aug. 23, 2006.

International Search Report for Wo 02/028796 A2.

U.S. Appl. No. 10/070,218.

Notice of Opposition against AU 2006241323, dated Nov. 26, 2010.

Supplementary European Search Report and Sheet B for EP Appl. No. 04724664, dated Oct. 15, 2009.

Blankenhorn et al., "Temperature and Moisture Effects on Selected Properties of Wood Fiber-Cement Composites," Cement and Concrete Research 29 (1999) pp. 737-741.

Translation of JP 05/287234 obtained by US Patent and Trademark Office, dated Jul. 2010.

Absolute Astronomy, "Perlite: Facts, Discussion Forum and Encyclopedia Article" website at: http://www.absoluteastronomy.com/topics/Perlite, dated Jul. 21, 2010.

European Patent Office, Communication pursuant to Rule 114(2) EPC, Observations by a Third Party in EP Application No. 01975765.7 dated Jul. 2, 2010 (13 pgs.).

European Patent Office, Communication pursuant to Rule 114(2) EPC, Observations by a Third Party in EP Application No. 01973377.3 dated Jun. 25, 2010 (3 pgs.).

International Search Report for AU/2004/903567, dated Jul. 26, 2004.

European Patent Office, Brief Communication dated Jul. 7, 2010 (1 pg.) and Communication Pursuant to Article 94(3) EPC dated Jul. 12, 2010 (4 pgs.) for EP Application No. 01973377.3.

* cited by examiner

DURABLE MEDIUM-DENSITY FIBRE CEMENT COMPOSITE

This application is a National Phase application under 35 U.S.C. §371 of International Application No. PCT/AU2003/001315, filed Oct. 7, 2003, which claims the benefit of U.S. Application No. 60/417,076, filed Oct. 10, 2002 and Australian Application No. 2003901529, filed Mar. 31, 2003.

BACKGROUND OF THE INVENTION

1. Field of the Invention

The present invention relates to fibre reinforced cement products and methods for modifying the properties of those products for particular purposes.

2. Description of the Related Art

Any discussion of the prior art throughout the specification should in no way be considered as an admission that such prior art is widely known or forms part of common general knowledge in the field.

Generally, fibre reinforced composites may be divided into three groups based on their density.

High density reinforced composites have a density range above 1.6 to about 1.9 g/cm$^3$. These composites may be formed in a conventional fashion involving matting of fibres, catchment of slurried fines and dewatering, eg the Hatschek process followed by compression of up to 30 MPa pressure to the desired thickness.

Such high density FRC materials have high structural strength, high stiffness and a smooth finish. One particularly desired advantage of high density products is their ability to resist moisture ingress thereby retain as-manufactured physical or chemical properties in service.

Unfortunately, however, many high density FRC products do not have good handlability, nailability and can be difficult to score and snap. There is also a high capital and maintenance cost involved in the production technique.

Medium density FRC products with a density from about 1.2 to 1.6 g/cm$^3$ overcome some of the difficulties mentioned above. Even though they are normally formed in a conventional fashion, eg Hatschek process, they can be produced for relatively low cost compared with high density FRC products, have improved workability, ie handleability, score-snap, nailability and provide adequate structural strength and stiffness for most applications. Further, they generally have acceptable in service performance.

Conventional medium density FRC products, however, may not generally have the same level of resistance to moisture ingress and ability to maintain in-service performance as high density products. Further, they may not provide the flat smooth surface produced on high density products without additional coating and/or sanding.

Low density fibre reinforced composites with a density of around 0.8 to 1.1 g/cm$^3$ are also formed in a conventional fashion, e.g. Hatschek and normally incorporate a density modifier.

These low density products have excellent workability, i.e. handleability, score and snap and nailability due to their low density. They provide acceptable in-service performance and have adequate stiffness.

Such low density products, however, generally have lower structural strength and stiffness. Ability to maintain physical and chemical properties in service is generally lower and once again, surface flatness could be improved. Due to the specialised formulation of most low density fibre reinforced composites, they are produced at a relative high cost.

Accordingly, it will be appreciated by persons skilled in the art that it would be useful to be able to modify the properties of a medium or low density product such that they retain their advantageous properties, eg workability relatively low cost etc, but improve other properties, eg ability to maintain as-manufactured properties, resistance to moisture ingress, structural strength and stiffness and surface flatness.

Performance in extreme climactic conditions is a particularly difficult area. For example, in many geographical locations, the FRC product may be subject to many freeze/thaw cycles during its life. Some conventional medium density FRC material produced may suffer from delamination, softening or chipping when exposed to freeze/thaw cycles.

Loss of as-manufactured physical or chemical properties can also be triggered by internal factors such as imperfections relating to the material heterogeneity, eg air pockets, segregation of constituents. In the case of fibre reinforced composite materials, imperfections such as poor bond at the matrix-fibre interface and fibre clumping may render such materials more susceptible to loss of durability.

It is an object of the present invention to overcome or ameliorate at least one of the disadvantages of the prior art, or to provide a useful alternative.

SUMMARY OF THE INVENTION

In a first aspect, a method of modifying the properties of a low or medium density FRC product comprises providing the low or medium density FRC product with a predetermined pore size distribution such that in particular critical zones of said distribution, the pore volume is substantially equivalent to or less than the pore volume in a respective critical zone of a conventional high density FRC product.

In a preferred embodiment, the predetermined pore size distribution is obtained by chemical modification, physical modification, or a combination of chemical and physical modification.

In another aspect, the pore size distribution is obtained by including a predetermined quantity of pore modifying components into the cementitious formulation. In one embodiment, the pore modifying components include lignocellulosic fibres treated with a water repellent agent and microfine siliceous material such as silica fume.

Alternatively, or in addition to such chemical alteration of the pore size distribution, the low or medium density FRC product may be subjected to a light press to provide the required predetermined pore size distribution. The pressure applied to the low or medium density FRC product is sufficient to provide the desired predetermined pore size distribution and provide a density of no greater than about 1.6 gms per cm$^3$. Preferably, the density of the resultant FRC product is between about 1.1 and 1.55 grams per cm$^3$.

The present applicants have found that there are a range of properties of the low or medium density FRC product which may be altered by controlling the pore size distribution of the resultant product. They have also discovered that it is not necessary to control the entire pore size distribution but rather said distribution in critical zones, eg in the region of 1 to 10 microns mean pore diameter size and in the region of 10 to 100 microns mean pore diameter size. These regions, sometimes referred to as the fibre pore and air pore regions, are critical to some of the resultant properties of the low or medium density FRC product. The applicants have found that it is possible to provide a pore volume in these critical regions which is no greater than around 150% of the pore volume in a corresponding pore size range of a conventional high density FRC product while still maintaining a low or medium density, ie a density below about 1.6 g/cm³. The resultant product has improved properties over conventional materials and in particular improved durability in a freeze/thaw environment.

In a preferred embodiment, the predetermined pore sized distribution is obtained to provide improved freeze/thaw durability of the FRC product.

In another embodiment, the predetermined pore size distribution is obtained to provide reduced propensity to carbonation or differential carbonation of the FRC product.

In a further aspect, the present invention provides a method of providing a low or medium density FRC product, comprising the steps of:
    i) providing a formulation for a low or medium density product;
    ii) forming a green article from said formulation;
    iii) curing said green article to form said product;
wherein prior to step iii)
    a) pore size modifying agent(s) are added to the formulation and/or
    b) the green shaped article is subjected to a light press
such that the pore volume of the product is reduced as compared with a conventional product emanating from steps i) to iii), while maintaining a density of no greater than about 1.6 g/cm³.

In still a further embodiment, step (i) mentioned above can be provided into stages A formulation for a medium density product may be prepared and a density modifier added to reduce the density of the formulation below 1.1 to 1.55 grams per cm³. Light pressing then via step (b) brings the product back towards the medium density range of about 1.1 to 1.55 grams per cm³.

In still a further aspect, the present invention provides a method of modifying the properties of a low or medium density FRC article comprising adjusting the pore size distribution of the article such that over a particular pore size range, the total pore volume is no greater than about 150% of the pore volume in a corresponding pore size range of a conventional high density FRC product.

The present invention also provides a cementitious product comprising a body constructed from fibre reinforced cement and having a density of no more than about 1.6 grams/cm³ wherein the product has a predetermined pore size distribution such that in particular critical zones of said distribution, the pore volume is substantially equivalent to or less than the pore volume in a respective critical zone of a conventional high density FRC product.

BRIEF DESCRIPTION OF THE DRAWINGS

The present invention will now be described by way of example only, with reference to the accompany drawings in which.

DETAILED DESCRIPTION OF THE PREFERRED EMBODIMENTS

Figure 1:
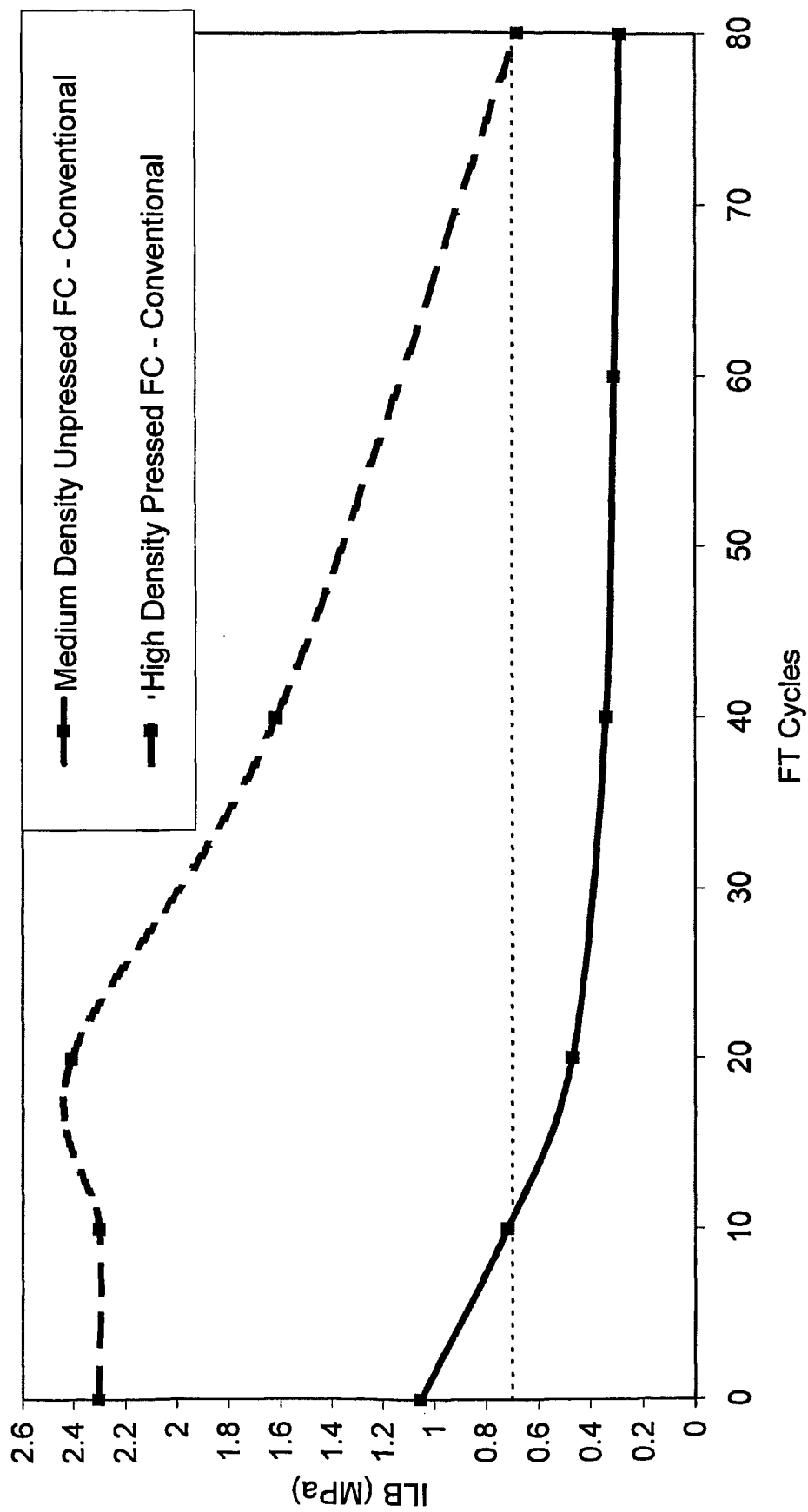
FIG. 1 is a graph of the freeze/thaw performance of high-density (pressed) and medium density (unpressed) conventional FRC composites.

Fibre reinforced cement typically comprises
    i) A binder such as Portland cement, which is prepared, for instance, by adding a cure modifier such as calcium sulfate (gypsum) to a clinker prepared by firing a raw material consisting of iron oxide, quartzite, clay, and lime (CaO) at a high temperature and then pulverizing the mixture. Examples of Portland cement include early strength Portland cement, ultra-high early strength Portland cement, moderate-heat Portland cement, sulfate-resisting Portland cement, and white Portland cement. Additionally, examples of the binder other than Portland cement include blast furnace cement, silica cement, fly ash cement, and alumina cement. Range: about 10% to 60%, preferably about 20% to 50%, most preferably about 30% to 40% by total weight.
    ii) Pozzolanic materials: Man-made pozzolanic materials (both amorphous and crystalline) including silica fume, microsilica, metakaolin, ground granulated blast furnace slag, and fly ash. Other naturally derived materials which, when finely divided, have been referred to as pozzolanic include pumice, perlite, diatomaceous earth, tuff, trass, etc
    iii) Siliceous material (preferably crystalline), the siliceous material may be present in an amount of from about 10-80 wt %, preferably about 30-70 wt %, preferably about 40-65 wt %. Preferably the siliceous material is ground sand (also known as silica) or fine quartz although amorphous silica is also suitable. Preferably the siliceous material has an average particle size of about 1-50 microns, more preferably about 20-30 microns.
    iv) Reinforcing fibres: Suitable fibrous materials capable of producing a fibre reinforced product include cellulose such as softwood and hardwood cellulose fibres, non wood cellulose fibres, asbestos, mineral wool, steel fibre, synthetic polymers such as polyamides, polyesters, polypropylene, polyacrylonitrile, polyacrylamide, viscose, nylon, PVC, PVA, rayon, glass, ceramic or carbon. (vegetable, ceramic or polymeric), ranging between about 0.1% to 15% by total weight of composite solids, preferably about 5% to 12%, most preferably about 7% to 9%. Preferably, the reinforcing fibres comprise of cellulose fibres which are unrefined/unfibrillated or refined/fibrillated cellulose pulps from various sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibres can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments. When cellulose fibres are used, they are preferably refined to a degree of freeness of between about 0 and 800 Canadian Standard Freeness (CSF), more preferably about 200-500 CSF.

v) Other additives/fillers, FRC composites can contain about 0-40 wt % of other additives such as fillers such as mineral oxides, hydroxides and clays, metal oxides and hydroxides, fire retardants such as magnesite, thickeners, colorants, pigments, water sealing agents, water reducing agents, setting rate modifiers, hardeners, filtering aids, plasticisers, dispersants, foaming agents or flocculating agents, water-proofing agents, density modifiers or other processing aids.

The fibre cement composites disclosed in preferred embodiments of the present invention may be formed from the water borne slurry by any of a number of conventional processes such as the Hatschek sheet process.

After forming, the green article may be pre-cured for a short time preferably up to about 80 hours at up to about 60° C. maximum temperature and high humidity, then it may be cured according to one or more of the following curing regimes:

Air curing: at up to about 60° C. maximum temperature and high humidity.

Steam curing: preferably in a steam environment at up to about 90° C. maximum temperature and atmospheric pressure for about 3 to 30 hours, most preferably for less than about 24 hours.

Autoclaving, preferably in a steam pressurised vessel at about 120 to 200° C. for about 3 to 30 hours, most preferably for less than about 24 hours.

The length of time and temperature chosen for curing is dependent on the formulation, the manufacturing process and form of the article.

With conventional high density FRC composites after forming and prior to curing, the product undergoes a pressing step where high pressure, ie up to about 30 MPa is applied to the formed article to give the desired thickness and density. The intention of this pressing is to reduce porosity, minimise water ingress, enhance interlaminar bonds and increase the resistance to delamination.

FIG. 1 is a graph of a freeze/thaw cycle test comparing a conventional pressed fibre cement composite to an unpressed fibre cement composite. It can be seen that the unpressed composite exhibited significantly faster inter-laminar bond degradation (falling below 0.70 Mpa in 10 cycles) compared to a conventional high density pressed fibre composite which survives 80 cycles before it loses inter-laminar bond to the same degree.

Figure 2:
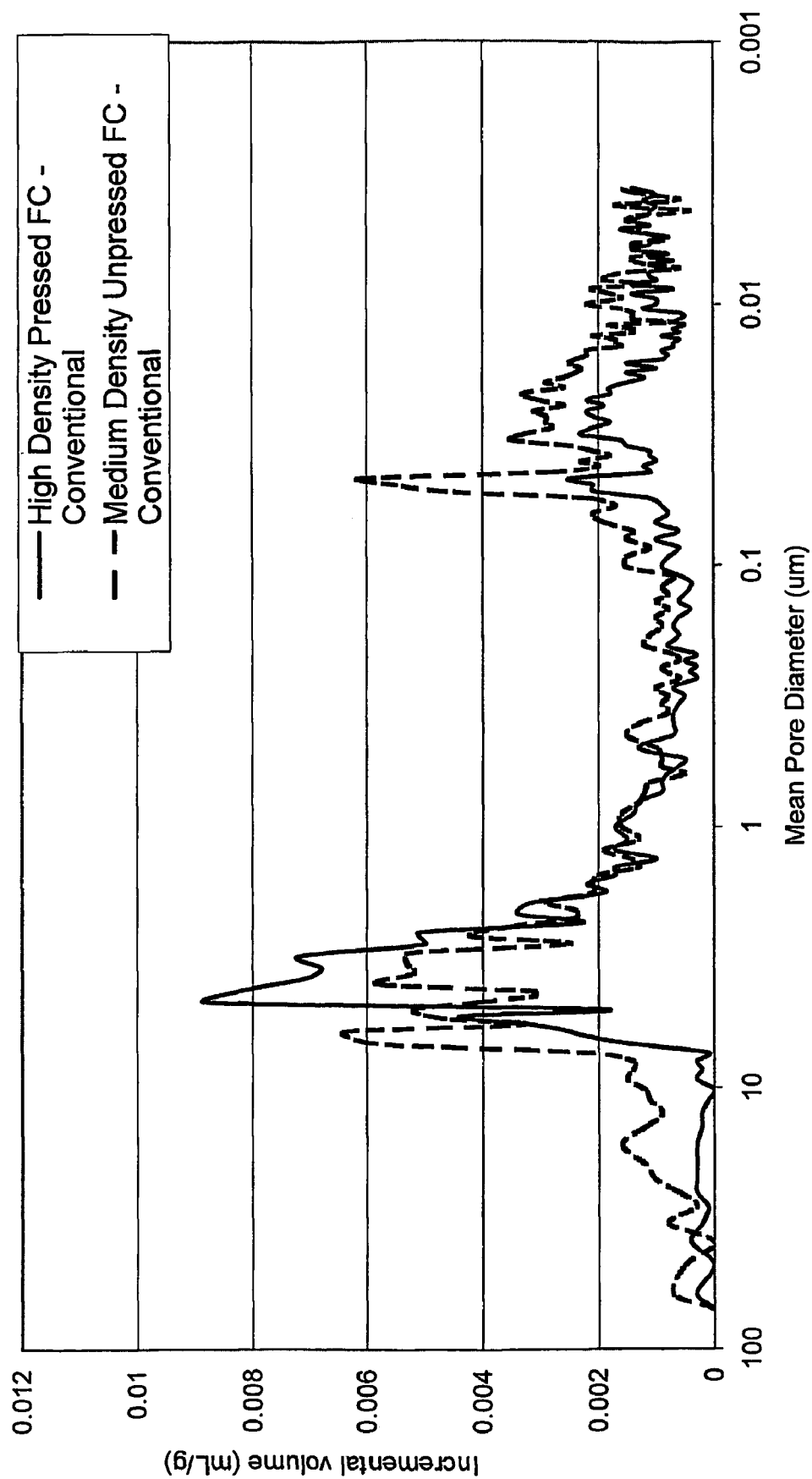
FIG. 2 is a graph of the pore size distribution of the conventional FRC composites of FIG. 1.

The pore size distribution of the conventional pressed and unpressed fibre cement composites are shown in FIG. 2.

This pore size distribution can be broken down into five major groupings as follows.

i) Air Pores (100-10 microns). These relate to macro pores caused by poor packing, fibre clumping, dewatering etc. Sometimes they are simply referred to as cracks or interlaminar pores.

ii) Fibre Pores (10-1 microns). These relate to pores inherent in the lignocellulosic fibres specifically due to their tubular structure and straw-like shape.

iii) Meso Pores (1-0.1 microns).

iv) Capillary Pores (0.1-0.01 microns). These relate to pores originating upon depletion of free water in the matrix.

v) Gel Pores (0.01-0.001 microns). These pores relate to the cement or binder micropores and are quite small in size and difficult to modify.

The Applicants have hypothesised that the properties of the fibre cement composite, in particular durability and workability in extreme climactic conditions may be linked to the pore size distribution in the resultant article and most particularly to the pore size distribution in the 100-10 micron size range (air pores) and 10-1 micron size range (fibre pores). Examinations of prior art fibre cement composites which exhibit good durability and workability in extreme climatic conditions appears to confirm relatively low pore volume in the critical air pore (100-10 microns) and fibre pore (10-1 microns) regions. Previous techniques of high pressure pressing, using synthetic polymeric fibres or high additions of micro silica to reduce pore volumes in these regions, has, as discussed above, proved expensive or has reduced workability.

Workability is generally defined as the ease to transport, handle, cut by score and snap, fix, eg nail and install the FC composite. Generally, workability is inversely proportional to density, ie composites with a lower density generally improve workability compared to higher density ones.

However, durability is generally directly proportional to density, ie high density composites exhibit better durability compared to lower density ones. Durability is generally regarded as the ability of the fibre cement composite to resist failure and continue performance in the presence of flaws (delamination or cracks) or other forms of damage or degradation for a specified period of time under specified environmental conditions. Such degradation systems include cyclic freeze/thaw or heat/rain, premature aging, microbial or chemical attack Accordingly, it will be clear to a person skilled in the art that the desired attributes of workability and durability cannot be met by the simple prior art mechanism of adjusting density. Rather, the Applicant's aim is to provide an FC composite with good durability and workability by modifying the pore size distribution at least in critical zones of the distribution, while maintaining a density lower than about 1.6 g/cm$^3$.

Example 1

Lightly Pressed Medium Density Composite

In a first embodiment, a medium density composite product is produced in two stages. The first involves applying a density modifier to a conventional medium density FRC formulation to bring density down to the low density range, ie about 0.8 to 1.1 g/cm$^3$ thereby achieving improved stress relaxation behaviour and workability.

In this embodiment, the density modifying agent is microspheres but other density modifiers may be used. Microspheres can be natural, synthetic or a by-product. The material can be crystalline but is more typically amorphous or glass. One preferred type of microspheres are hollow ceramic microspheres commonly known as cenospheres. Cenospheres are a coal ash by-product that is typically separated from fly ash by a floatation process where the spheres float to the surface of water from clarifiers, ponds or lakes. The microspheres are available, for example, under the names Extendospheres, Recyclospheres and Zeeospheres, and are available from suppliers such as PQ Corporation of Chattanooga, Tenn.; Zeelan Industries Inc./3M of St. Paul, Minn.; Sphere Services, Inc. of Oak Ridge, Tenn.; The microspheres have typical particle sizes ranging from about 12 to 300 microns, with median particle sizes ranging about 80 to 120 microns. These sizes can, of course, vary between samples. The preferred microspheres typically contain about 62%-65% silica ($SiO_2$), about 23%-26% alumina ($Al_2O_3$) and about 3.0% to 4.0% iron oxides ($Fe_2O_3$). Range: about 1% to 30%, preferably about 2% to 20%, most preferably about 5% to 15% by total weight). Additional examples of formulating fibre cement composites using microspheres may be found in U.S. application Ser. No. 09/803,456 filed 9 Mar. 2001, entitled FIBER CEMENT BUILDING MATERIALS WITH LOW DENSITY ADDITIVES, the entirety of which is incorporated herein by reference.

A fibre cement composite is then produced using a waterbourne slurry of the density modified formulation by any conventional process. In this example and those discussed below, the Hatschek sheet process is used in which laminations of the formulation are applied to build up the thickness of the desired product. At this stage, the FC composite is still in the low to medium density range, ie about 0.8 to about 1.2.

The resultant FC composite is then subjected to a light press to densify the composite to a density within the medium density range, ie up to about 1.6 g/cm$^3$. This achieves improved delamination and water permeation resistance.

It should be understood, however, that this light press is not equivalent to the high pressure pressing of the prior art. According to one embodiment of the present invention, the content of density modifiers and extent of pressing are manipulated to provide the desired pore size distribution while still maintaining a density of less than about 1.6 g/cm$^3$. As discussed above, in the prior art, conventional high density FC composites apply pressures to achieve densities of over about 1.6 g/cm$^3$. This conventional technique does improve durability but may substantially decreases workability. The applicants have found that it is possible to improve various properties of the FC composite including durability and workability by starting with a low density formulation and applying a light press to form a medium density composite.

The light pressing regime according to one embodiment of the present invention can be divided into three parameters namely i) maximum pressure applied—between about 5 and 40 MPa, preferably about 10 to 30 and most preferably about 15 to 20 MPa, ii) ramping cycle—between about 10 and 40 minutes, preferably about 15 to 35 and most preferably about 20 to 30 minutes, and iii) holding cycle—about between 15 and 30 minutes, preferably about 10 to 20 and most preferably about 5 to 10 minutes.

After pressing, the green article is precured for a short time, preferably up to about 80 hours at up to about 60° C. maximum temperature and high humidity, then autoclaved, preferably in a steam pressurised vessel at about 120 to 200° C. for about three to 30 hours, preferably less than about 24 hours.

As discussed above, other methods for curing the composite may be used, eg air curing or steam curing. The length of time and temperature chosen for curing is dependent upon the formulation, the manufacturing process and form of the article.

Figure 3:
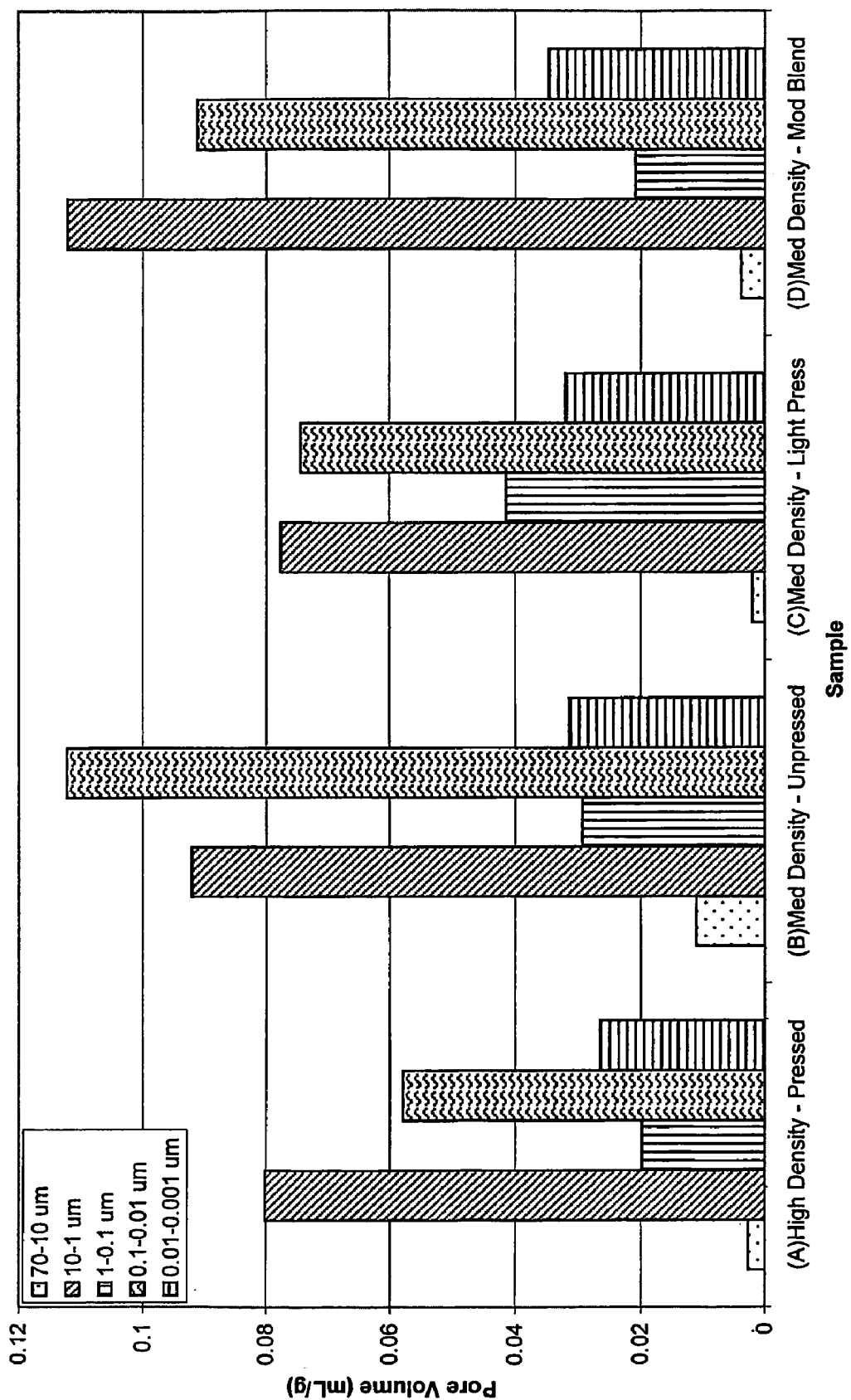
FIG. 3 is a graphical representation of the pore volumes in respective ranges for two FRC composites and an FRC composite produced according to one embodiment of the present invention.

The resultant light pressed medium density FC composite was then analysed to determine its pore volume. FIG. 3 is a comparative of the pore volumes of two medium density composites produced according to the preferred embodiments of the present invention and two conventional products. The first conventional product (A) is a pressed high density FC composite produced using the Hatschek process and generally used in roofing applications under moderate free/thaw exposure. This article is pressed using a maximum pressure of 30 MPa with a press cycle of 15 minutes ramping and 15 minutes holding.

The second conventional product (B) is an unpressed medium density composite, once again produced via the Hatschek process and suitable for use in roofing applications in mild climatic conditions. Sample (C) is a light pressed medium density FRC composite produced according to the above mentioned process. It can be seen from FIG. 3 that in the air pore range (70-10 microns) and fibre pore range (10-1 microns) the pore volume of (C) the light pressed medium density FC composite is comparable to the pore volume in the equivalent critical zone(s) of the high density product. The conventional medium density unpressed product, in the other hand, has a much higher pore volume in the air pore and fibre ranges.

Sample (D) is a medium density composite produced using a modified blend and will be discussed below under example 2 in more detail.

Test 1—Freeze/Thaw Durability

Example 1

The durability of the two conventional composites versus the light pressed medium density composite was compared.

The first and second products are the conventional medium-density FC unpressed composite and high density FC composite outlined above.

The light pressed product is produced according to the process of Example 1 above, namely, a light pressed medium density FC composite once again produced using the Hatschek process. The product is light pressed using a maximum pressure of 15 MPa with a press cycle of 30 minutes ramping and 5 minutes holding.

The formulations for each are shown in Table 1.

TABLE 1

Formulations for unpressed, high density and light pressed composites (% by total weight)

| Formulation | Cement | Silica Flour | Pulp | Fire Retardant Filler | Ceramic Filler | Ceramic Microspheres |
|---|---|---|---|---|---|---|
| Medium-density Unpressed FC - (Conventional) | 35.0 | 53.0 | 8.0 | 4.0 | — | — |
| High density FC - 30 MPa (Conventional) | 39.6 | 48.4 | 8.0 | 4.0 | — | — |
| Light Pressed medium density FC - 15 MPa - (Example 1) | 35.0 | 45.0 | 8.0 | 2.0 | 2.0 | 8.0 |

The freeze/thaw performance was tested as follows: FC Samples (44 mm×44 mm squares) representing the three compositions were placed on one edge, half submerged in water in a plastic container, then exposed to freeze/thaw (F/T) cycling in an environmental chamber. The F/T regime consisted of 4 cycles per day; each cycle involved freezing and thawing of the sample over 6 hours including 1 hour freezing at −20° C. and 1 hour thawing at 20° C. The extent of degradation in the samples due to freeze/thaw exposure was determined by tensile testing in the z-direction to determine the Inter-Laminar Bond (ILB) strength (after 0, 10, 20, 40 and 80 cycles), which is a measure of the extent of delamination. A 0.7 MPa ILB limit was chosen as a lower limit measure of degradation due to freeze/thaw exposure.

Figure 4:
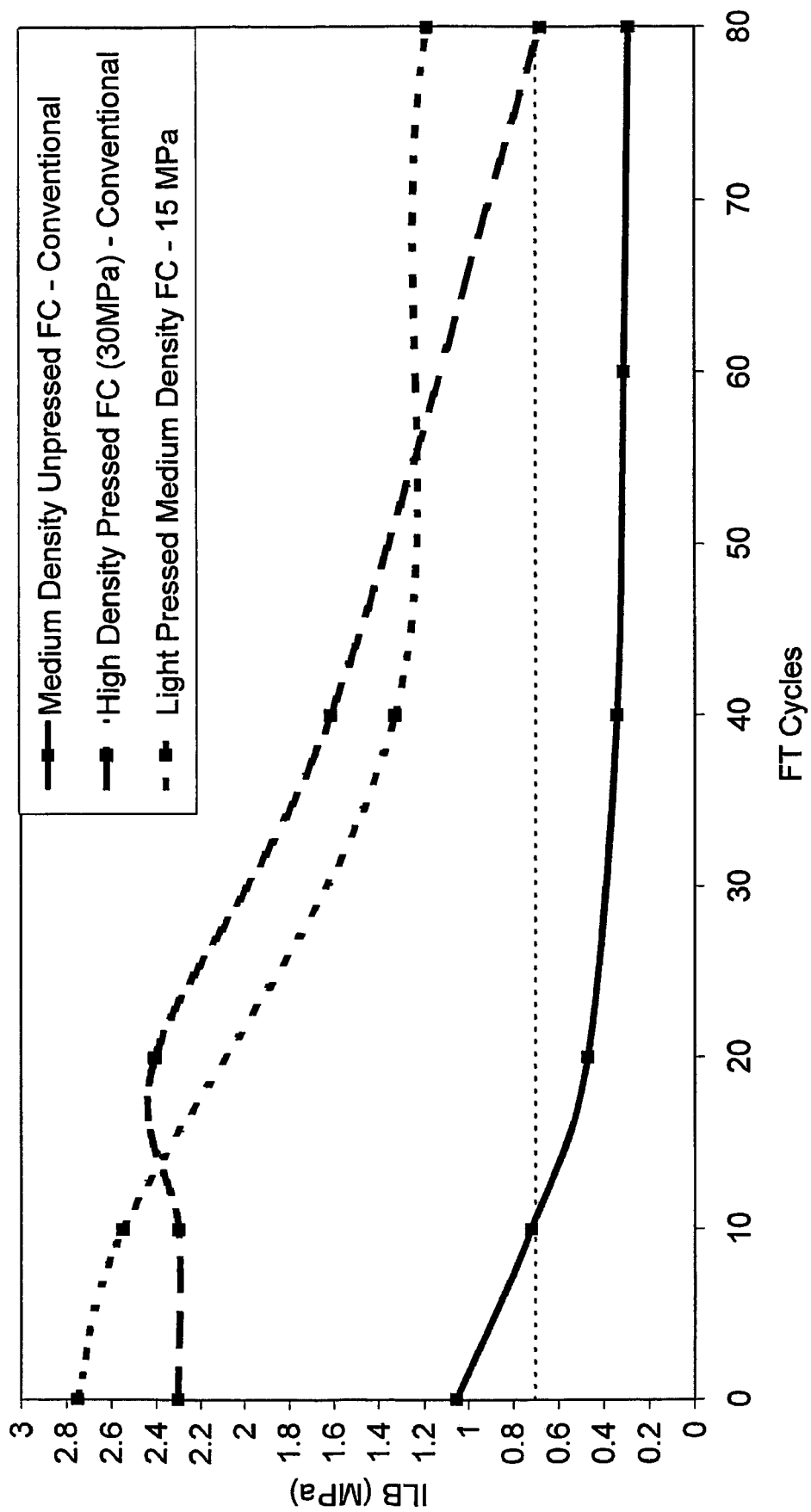
FIG. 4 is a graph of the freeze/thaw performance of high-density (pressed) and medium density (unpressed) conventional FRC composites and an FRC composite produced according to a first embodiment of the present invention.
Figure 5:
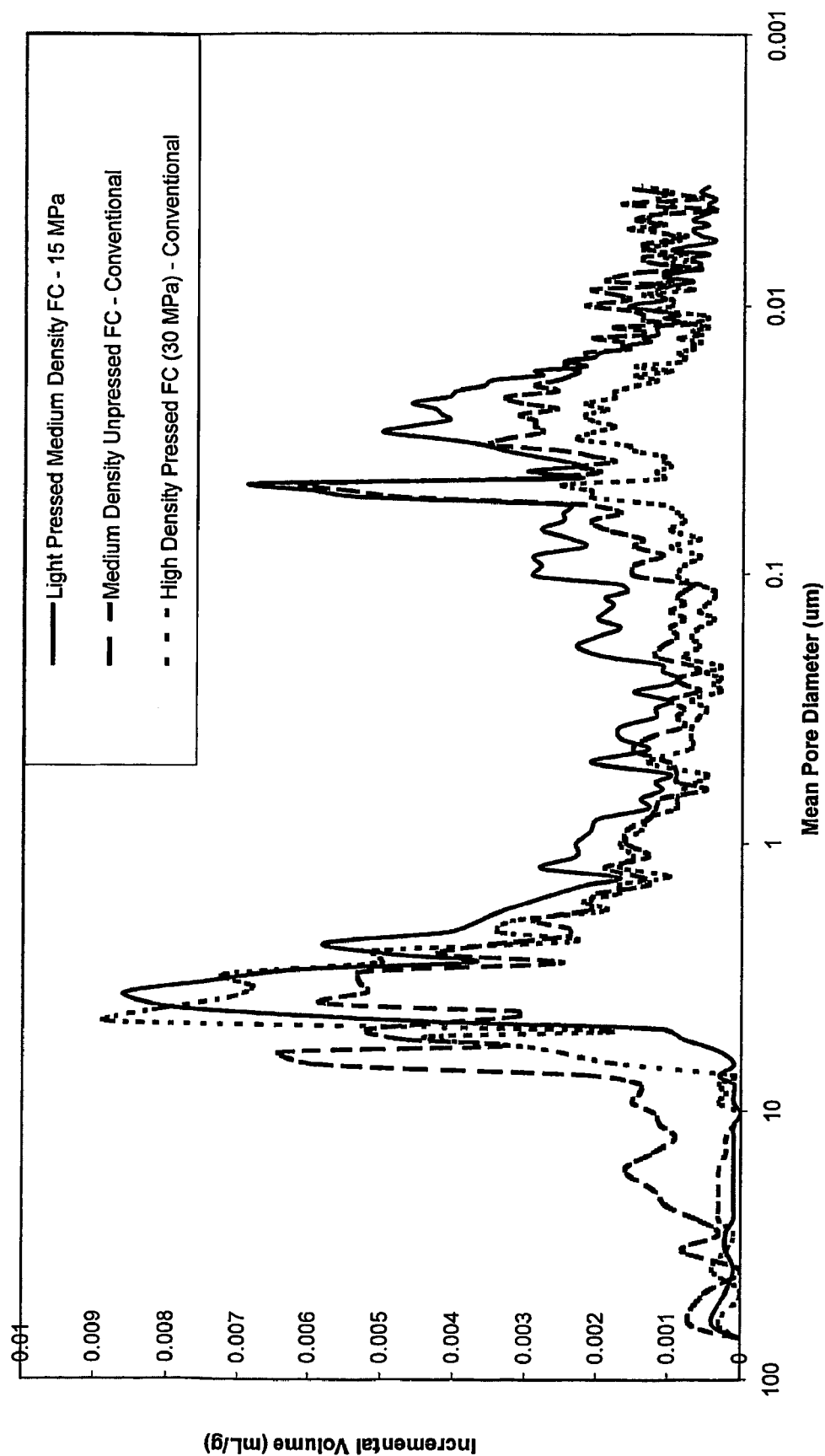
FIG. 5 is a graph of the pore size distribution of the FRC composite shown in FIG. 4.

The freeze/thaw performance and pore size distributions of all 3 products are shown in FIGS. 4 and 5 respectively.

It can be seen from FIG. 4 that once again, the ILB strength for the conventional unpressed medium density FC composite degrades below 0.7 MPa at around 10 cycles. The conventional high density pressed FC as discussed above, lasts for approximately 80 cycles. Most surprisingly, the light pressed medium density FC composite produced according to the preferred embodiments of the present invention continues above the 0.7 MPa line even after 80 cycles. Indeed as a comparison, both the conventional pressed high density FC composite and light pressed medium density composite of the preferred embodiments of the present invention exhibit around a 700% improvement in freeze/thaw durability compared to the standard FC composite.

Turning to FIG. 5, it can be seen that both the conventional high density FC composite and light pressed medium density composite of the preferred embodiments of the present invention exhibit lower porosity in the air pore zone (100-10 microns) and fibre pore zone (10-1 microns) as compared with conventional medium density products.

The fact that the freeze/thaw durability exhibited in the medium density FC product of the preferred embodiments of the present invention exceeds that of the conventional high density pressed composite is quite surprising and unexpected. The composite according to the preferred embodiments of the present invention exhibits lower density and hence, it is expected to perform worse under freeze/thaw conditions as compared with a conventional high density product. Further, both the conventional high density pressed composite and light pressed medium density composite of the preferred embodiments of the present invention exhibited comparable interlaminar bond strengths under substantially differing pressing regimes. This is quite surprising and contrary to conventional wisdom in this area.

Not wishing to be bound by any particular theory, it is speculated that the significant improvement in freeze/thaw durability exhibited in the embodiment of the invention discussed above, results from the combined effects of reduced moisture ingress due to reduced porosity in at least the critical zones of the pore size distribution. This is as a result of the light pressing enhanced stress relaxation in the lightly pressed modified composite due perhaps to the presence of the density modifying microspheres, which may enable it to accommodate more of the destructive stresses associated with freezing and thawing.

higher fresh interlaminar bond strength and increased delamination resistance due to pressing.

Test 2—Mechanical Properties

Example 1

The above mentioned test shows that the FC composite produced in accordance with the preferred embodiments of the present invention has a significant improvement in freeze/thaw durability as compared with conventional medium density FC composites. Indeed, the durability is comparable with conventional high density FC composites. As discussed above, however, such conventional high density FC composites may have reduced workability, ductility, nailability, etc compared to their medium density counterparts.

Accordingly, a conventional high density FRC composite and a light pressed medium density FRC composite produced according to the preferred embodiments of the present invention were evaluated for their flexural properties.

250 mm×250 mm squares were tested in flexure (in air-dry conditions) in two directions. The flexure testing data is shown in Table 2 below. Unless otherwise stated all the density values disclosed herein relate to air-dry (equilibrium) condition, with an approximate moisture content range of 5%-10% by weight.

TABLE 2

| Flexure testing data (air-dry condition) | | | | | |
|---|---|---|---|---|---|
| Formulation | Density gm/cm$^3$ | Avg. MoR MPa | B-A Energy KJ/m$^3$ | Ult. strains um/m | MoE GPa |
| Conventional High Density Pressed FC (30 MPa) | 1.68 (within high density range) | 27.43 | 2.31 | 2631 | 12.86 |
| Light Pressed Medium Density FC (15 MPa) | 1.46 (within medium density range) | 23.41 | 12.97 | 7793 | 6.78 |

Table 2 shows that the ductility, ie ultimate strain to failure, of the light pressed medium density FC composite according to the preferred embodiments of the present invention is around 300% that than corresponding to the conventional high density pressed FC, ie increased from 2631 um/m to 7793 um/m. This is a very surprising result and indicates that a light pressed medium density composite according to the preferred embodiments of the present invention is potentially able to withstand much higher strain before failing as compared to the conventional high density pressed FC composites.

The same could be said about the B-A (impact) energy which increased by more than about 500% (2.31 to 12.97 Kj/m$^3$).

While these results may not be typical of all light pressed medium density composites made according to the preferred embodiments of the present invention, it is significant to note that preferred embodiments of the present invention provide a light press medium density FC composite with improved characteristics over conventional products such as improved durability, high ductility (easier to nail, better cracking resistance), lighter weight (improved workability and easier to handle) and improved impact resistance (hail resistant etc).

Example 2

Modified Formulation/Blend FRC Composite

As an alternative to the light pressing technique discussed above in example 1, in a second embodiment the properties of a low or medium density FRC product are altered by modifying the typical FRC composite formulation. This modification involves the addition of:

i) lignocellulosic fibres chemically treated with a water repellant agent, ii) reinforcing fibers and ii) microfine siliceous material.

The lignocellulosic fibres suitable for use with the preferred embodiments of the present invention are chemically treated with a water repellent agent to impart hydrophoboicity. They are provided in an amount of 0.01% to 9% by total weight of composite solids and preferably in the 2 to 3% range.

Lignocellulosic fibres chemically treated with a water repellent agent to impart hydrophobicity, range: between about 0.01% to 9% by total weight of composite solids, preferably in the about 2% to 4% range.

The lignocellulosic fibres as described in the preferred embodiments of the present specification is a generic term for cellulose fibres made from softwood or hardwood, bamboo, sugarcane, palm tree, hemp, bagasse, kenaf, wheat straws, rice straws, reed, and the like. Moreover, lignocellulosic fibre material is a generic term for the above fibres having such shapes as needle-like, chip-like, thin section-like, strand-like, rod-like, fibre-like, flake-like, and the like. It is to be noted that there is no particular restriction on the shape of these lignocellulosic fibres, but it is preferable that those having an average fibre length of about 0.50-50 mm, and an average fibre diameter or average fibre thickness of about 0.5 mm or less be used. Moreover, lignocellulosic fibres may be a mixture of two or more of the above fibres.

Preferably, lignocellulosic fibres comprise of cellulose fibers which are unrefined/unfibrillated or refined/fibrillated cellulose pulps from various sources, including but not limited to bleached, unbleached, semi-bleached cellulose pulp. The cellulose pulps can be made of softwood, hardwood, agricultural raw materials, recycled waste paper or any other forms of lignocellulosic materials. Cellulose fibers can be made by various pulping methods. In the pulping process wood or other lignocellulosic raw materials such as kenaf, straw, and bamboo, etc., are reduced to a fibrous mass by the means of rupturing the bonds within the structures of lignocellulosic materials. This task can be accomplished chemically, mechanically, thermally, biologically, or by combinations of these treatments.

In one embodiment of the invention, the lignocellulosic fibres have surfaces that are at least partially treated with a water repellent agent so as to make the surfaces hydrophobic. The water repellent agent comprises a hydrophilic functional group and a hydrophobic functional group, wherein the hydrophilic group permanently or temporarily bonds to hydroxyl groups on the fiber surface in the presence of water or an organic solvent in a manner so as to substantially prevent the hydroxyl groups from bonding with water molecules. The hydrophobic group is positioned on the fiber surface and repels water therefrom.

As discussed above, the reinforcing fibres for the FC composite formulation may also be formed of cellulose. If this is the case, a portion of the cellulosic reinforcing fibres may be treated with the water repellent agent to satisfy component (i) mentioned above. Of course, if the reinforcing fibres are made from materials other than cellulose, e.g. polymer, additional treated lignocellulosic fibres are preferably added to the formulation as component (i).

In another embodiment of the invention, each water repellent agent molecule has a hydrophilic functional group comprising silanol (Si—OH) or polysilanol (Si—(OH)$_n$, where n=2, 3 or 4) and a hydrophobic functional group comprising straight or branched alkyl chains or aromatic fragments. The silanol or polysilanol may be resulted from the hydrolysis of hydrolysable alkoxy fragments that attach to a silicon element.

The water repellent agent may be applied to the fiber surfaces using methods including vacuum deposition, pressure spraying, dipping or treating the fibres in aqueous or solvent solutions containing the water repellent chemicals.

Chemical compounds that can be used as water repellent agents include, but are not limited to:

silane derivatives of all kinds and in all formulations, alkoxylsilane of all kinds and in various formulations, silicone emulsions of all kinds and in various formulations.

The water repellent agents can be in a dry form such as powders, or wet form such as emulsions, dispersions, latexes and solutions. When multiple sizing agents are applied, some can be in dry form and others in wet form.

The water repellent agent can comprise about 50% of the dry weight of the lignocellulosic fibres, most preferably, approximately 0.01 to 10% of its weight.

Further details regarding the chemical treatment of fibres using emulsified sizing (water repellent) agents are described in copending International PCT Application Number PCT/US01/29675 entitled FIBRE CEMENT COMPOSITE MATERIAL USING SIZED CELLULOSE FIBRES, filed on 21 Sep. 2001, and U.S. application Ser. No. 09/969,742, filed 2 Oct. 2001, entitled FIBER CEMENT COMPOSITE MATERIALS USING SIZED CELLULOSE FIBERS, the entirety of both of which are incorporated herein by reference.

The microfine silica is preferably added in the range of about 0.1 to 10% and preferably about 2 to 4% of the total weight of dry solids. Microfine refers to the particles being essentially less than about 10 microns and preferably less than about 5 microns. Examples include silica fume which is an amorphous spherical silica by-product from the manufacture of pherosilica and silicone metal and refined natural micro silica. While crystalline silica can be used, amorphous silica is preferred and the Applicant has found that best results are achieved when the $SiO_2$ content in this additive is at least about 85% by weight.

Referring back to FIG. 3 and Sample (D) which is a medium density FRC composite produced according to the modified formulation/blend, it can be seen that in the air pore region (70-10 microns) the total pore volume is comparable with the high density product. The fibre pore volume (10-1 micron) is greater than the high density product, however, as will be discussed below, it is a combination of pore modification and water repellent nature of the fibres which improves the properties of the modified blend FC composite.

Test 3—Freeze/Thaw Durability

Example 2

The freeze/thaw durability for the unpressed durable blend FC composite was tested as compared with a conventional medium density unpressed product and conventional pressed high density product.

The first and second composites are identical to the comparative examples given above in Table 1. The third composite is an unpressed medium density modified blend according to example 2 and produced via the Hatschek process.

The formulations of the three composites are shown in Table 3 below.

TABLE 3

Formulations for unpressed (standard), unpressed (durable), and high density pressed composites (% by total weight)

| Formulation | Cement | Silica Flour | Component 2 Untreated Reinforcing Fibre (cellulose) | Treated Fibre (Cellulose) | Water Repellent Additive (Silane) | Total Fibre Content | Component 3 Microfine Silica (Silica Fume) | Fire retardant (Filler) |
|---|---|---|---|---|---|---|---|---|
| Medium - density FC - Unpressed (Conventional) | 39.6 | 48.4 | 8.0 | 0.0 | 0.0 | 8.0 | 0.0 | 4.0 |
| High density FC - 30 MPa (Conventional) | 35.0 | 53.0 | 8.0 | 0.0 | 0.0 | 8.0 | 0.0 | 4.0 |
| Modified Blend Medium Density FC (Example 2) | 30.0 | 60.0 | 2.70 | 2.90 | 0.32 | 5.6 | 30. | 0.0 |

Samples representing the three composites were tested under cyclic freeze/thaw as described in example 1. The extent of degradation in the samples due to freeze/thaw exposure was determined by tensile testing in the z-direction to determine the Inter-Laminar Bond (ILB) strength (which is a measure of the extent of delamination) after 0, 10, 20, 40 and 80 cycles.

Figure 6:
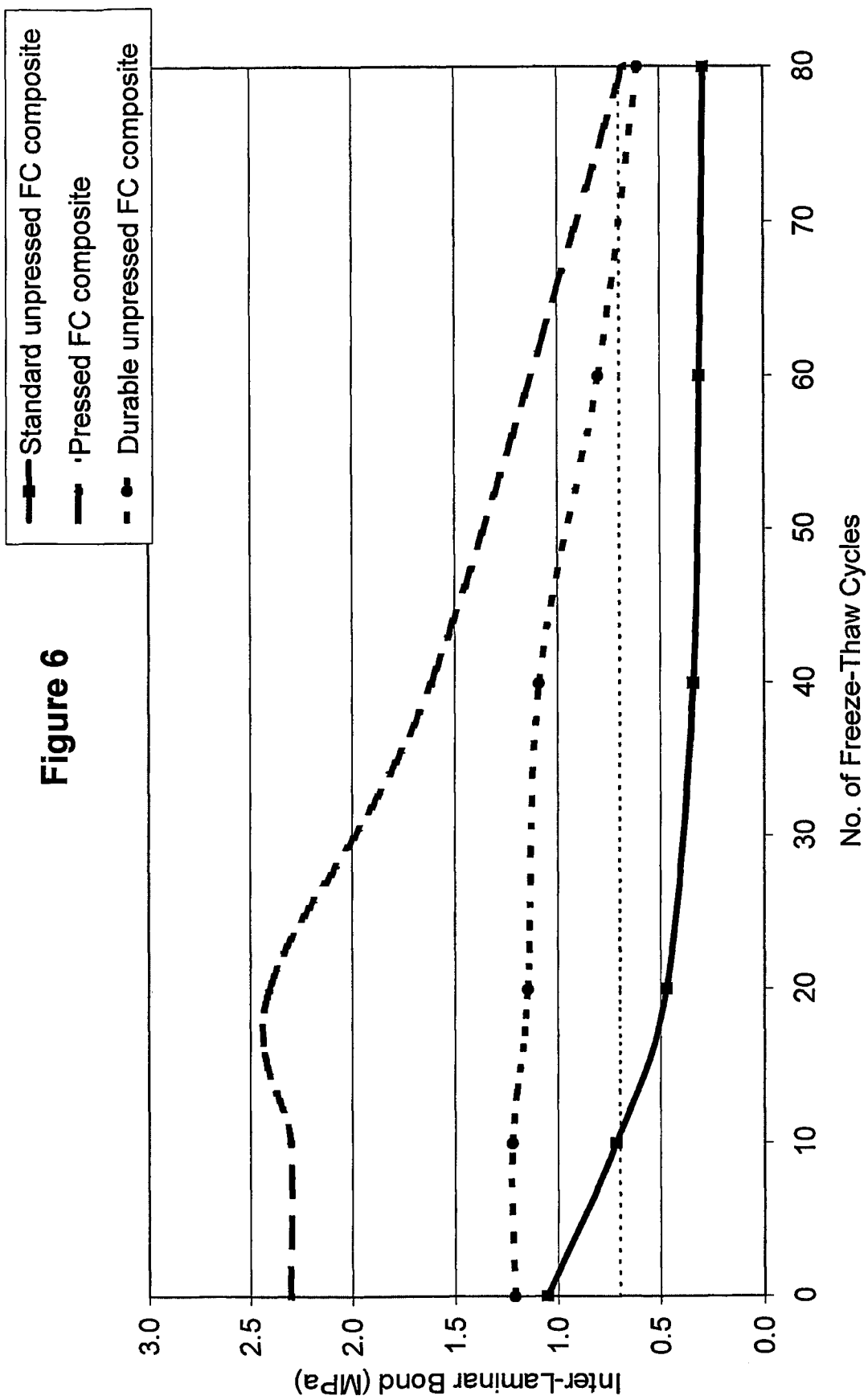
FIG. 6 is a graph of the freeze/thaw performance of high-density (pressed) and medium density (unpressed) conventional FRC composites and an FRC composite according to a second embodiment of the present invention.
Figure 7:
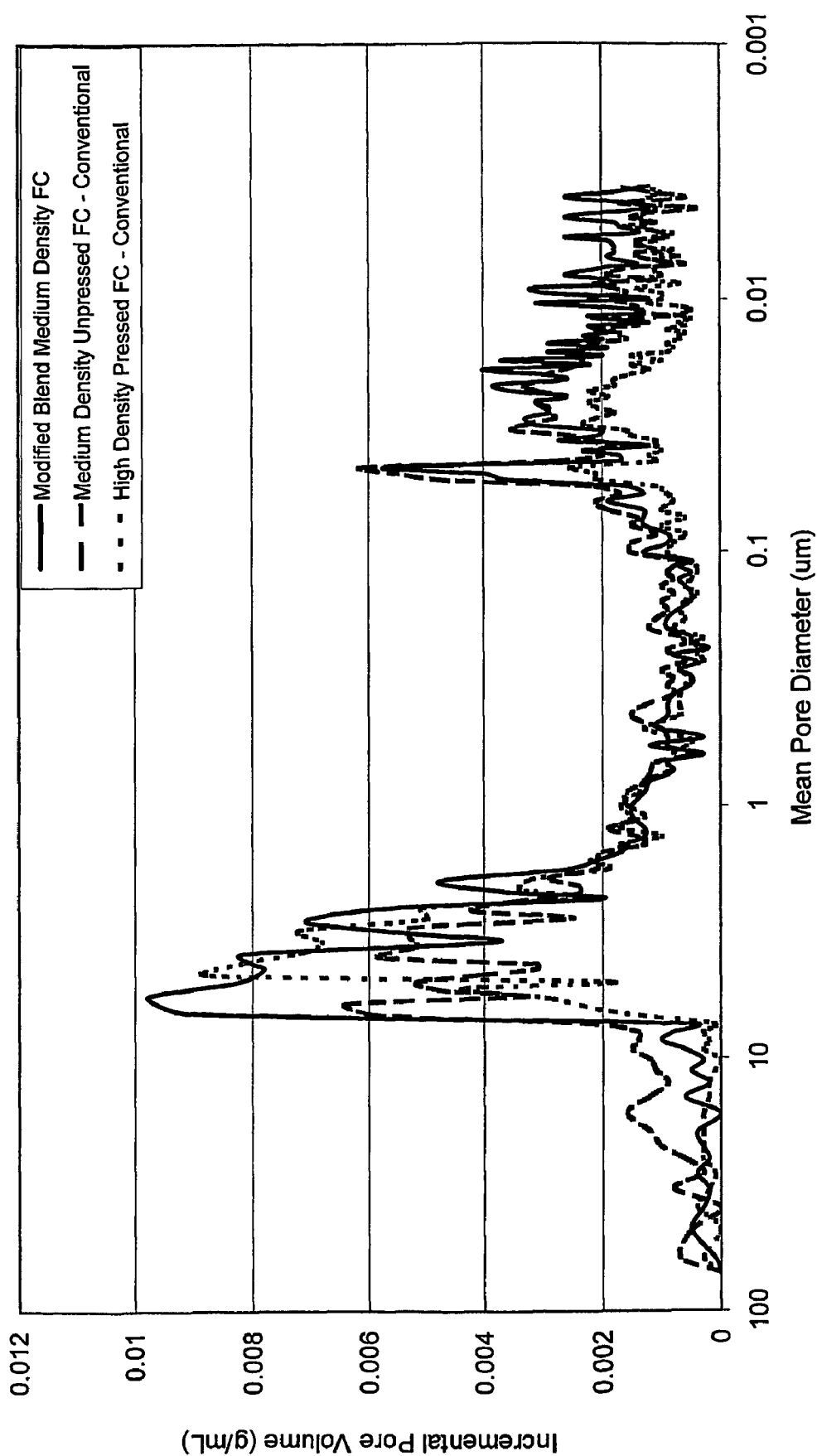
FIG. 7 is a graph of the pore size distribution of the FRC composite of FIG. 6.

The freeze/thaw performance and pore size distributions of all 3 products are shown in FIGS. 6 and 7 respectively.

It can be seen that the unpressed durable blend FC composite in accordance with the preferred embodiments of the present invention provide a significant improvement in freeze/thaw durability over the conventional unpressed medium density FC composite.

Indeed, both the conventional high density FC composite and unpressed modified blend medium density composite according to the preferred embodiments of the present invention exhibit about 700% improvement in freeze/thaw durability compared to the standard FC composite. Both achieve around 70 freeze/thaw cycles above the failure line.

Turning to FIG. 7, it can be seen that as will Example 1, the conventional high density pressed FC product and modified blend FC composite according to the preferred embodiments of the present invention exhibit significantly lower porosity in the air pore zone (100-10 microns) and fibre pore zone (10-1 microns) as compared with the conventional medium density product.

The improvement in freeze/thaw durability exhibited by the modified blend FC composite according to the preferred embodiments of the present invention is surprising and quite unexpected.

Analysis of the interlaminar bond strength, capillary porosity and water absorbtivity of the modified blend FC composite according to the preferred embodiments of the present invention as well as the two conventional comparative FC composites was conducted. The results are shown in Table 2 below.

Conventional wisdom predicts that the freeze/thaw durability improvement arising from high density pressed FC products stems from the high fresh ILB (2.30 MPa) and low porosity of the densified matrix (air-dried density of 1.7 g/cm$^3$). This is caused by the high pressure pressing of the product prior to curing. It is therefore surprising that the modified blend FC composite of the preferred embodiments of the present invention which does not undergo pressing and exhibits a low fresh ILB (1.2 MPa) and high overall porosity (air-dried density of 1.3 g/cm$^3$) can match the freeze/thaw durability improvement of the conventional high density product.

In addition, since the modified blend unpressed FC composite of the preferred embodiments of the present invention would normally be lighter in weight, lower in cost and more workable, ie easier to handle and cut, than the conventional high density FC product, while at the same time exhibiting comparable durability, it presents an attractive alternative to conventional materials.

Not wishing to be bound by any particular theory, the Applicant speculates that improvement in freeze/thaw durability of the unpressed modified blend FC composite according to the preferred embodiments of the present invention, arises due to the combined synergistic effect of the hydrophobic cellulose fibres and the blocked or segmented matrix pores due to silica fume reactivity. This combination increases the resistance to moisture ingress thereby improving freeze/thaw durability.

The above explanation is supported by the water/absorption data shown in Table 4 in which the conventional high density pressed FC composite and unpressed modified blend FC composite according to the preferred embodiments of the present invention exhibit between 20 and 30% lower water absorption values compared to the conventional unpressed medium density FC product.

TABLE 4

Porosities and ILB values of the three FC composites.

| Composition | Inter-Laminar Bond Strength (ILB), MPa | 48 hour Water Absorption, % weight |
|---|---|---|
| High Density Pressed FC | 2.30 | 26.03 |
| Convention Unpressed FC | 1.05 | 32.38 |
| Unpressed Modified Blend FC | 1.20 | 23.04 |

FIG. 7 also clearly shows that a conventional high density pressed FC product and unpressed modified blend FC composite according to the preferred embodiments of the present invention which both show good freeze/thaw durability, exhibit significantly lower pore volumes in the fibre pore zone (10-1 microns) and air pore zone (100-10 microns) compared to the unpressed medium density FC composite.

Test 4—Moisture Resistance

Example 2

As a further analysis, moisture resistance parameters corresponding to conventional unpressed material and the modified blend unpressed FC composite of the preferred embodiments of the present invention were assessed. The results are shown in Table 5 below.

TABLE 5

Wicking height results for unpressed durable and standard FC composites.

| Composition | Wicking height after 48 hours, mm | Water permeation rate after 48 hours ML/hr/0.002 m² |
|---|---|---|
| Conventional Unpressed FC | 207 | 113 |
| Unpressed Modified Blend FC | 43 | 31 |

The water permeation rate was measured on a 250 mm by 250 mm by 6 mm sample, laid flat and attached to a 100 mm high, 50 mm diameter Perspex column filled with water and monitored for extent of permeated water volume of 48 hours. Wicking height was measured on a 250 mm by 250 mm by 6 mm sample laid on edge in a flat tray in an upright position and monitored for wicking height progression over 48 hours. It can be seen that the unpressed modified blend FC composite exhibited more than about a 70% reduction in wicking height and water permeation rate compared to the conventional unpressed FC composite.

Once again, these results are quite surprising in view of conventional understanding. Water permeability may be reduced by pore filling, segmenting or pressing. Wicking on the other hand is much more difficult to control in medium density FC products which contain cellulose fibre due to their small diameter and tubular structure which promotes wicking along the fibre direction by capillary action.

It is also surprising that the low silica fume addition level in the modified blend according to the preferred embodiments of the present invention is sufficient to impart significant moisture resistance and durability improvement as compared with a conventional product. In current fibre cement technology, typical levels of silica fumes are 5 to 10%. The silica fume addition of the preferred embodiments of the present invention is around 2 to 4% and this level is generally considered to low to modify the properties of the medium density FC composite.

Test 5—Workability

Example 2

As with Example 1, the workability, handleability and nailability of the FC composite produced according to preferred embodiments of the present invention was tested. Samples representing the conventional unpressed medium density FC product and the unpressed modified blend FC product according to preferred embodiments of the present invention were subjected to flexure tests. Handleability was taken as the ultimate strain value in the B direction corresponding to a 100 mm by 200 mm by 6 mm sample tested in flexure in saturated conditions. A 5000 urn/m ultimate strain value is generally considered the minimum for good handleability. Edge nailability was assessed by gun nailing at 13 mm from the edge onto a 250 mm by 250 mm by 6 mm sample and rating the extent of cracking. A numerical rating below 1 is considered very good nailability.

The results are shown in Table 6.

TABLE 6

Handleability & nailability results for unpressed durable and standard FC composites.

| Composition | Ult. strain b-direction (sat. condition), um/m (*) | Nailability rating (13 mm from edge) (**) |
|---|---|---|
| Conventional Unpressed FC | 9095 | 0.79 |
| Unpressed Modified Blend FC | 11433 | 0.38 |

(*) minimum 5000 um/m for good handleability.
(**) <1 rates: very good nailability.

It can be seen from Table 6 that the unpressed modified blend FC composite according to the preferred embodiments of the present invention exhibited very good handleability and nailability properties as compared with the conventional unpressed medium density product. Once again, these results are quite surprising since the modified blend FC composite according to the preferred embodiments of the present invention has a relatively low total fibre content, ie around 5.6% (see Table 3) as compared to 8% in standard FC composites. Such a low fibre content is outside the range commonly adopted in cellulose FC production, ie 7 to 9% and accordingly, the FC composite is expected to exhibit a very low ultimate strain value, ie brittle failure, and poor nailability.

Accordingly, it can be seen that the unpressed modified blend FC composite according to the preferred embodiments of the present invention surprisingly achieves an improvement in freeze/thaw durability (comparable with conventional high density FC composites) and at the same Lime maintains or improves workability (handleability and nailability improves over conventional medium density products).

The embodiments shown above provide two alternatives for modifying the properties of a low or medium density FC composite. In one embodiment, a low or medium density formulation undergoes a light press while maintaining a density lower than about 1.6 g/cm³. In the second embodiment, a modified blend is used in the original formulation.

Both embodiments show significantly improved properties over conventional medium density FC products and in particular improved freeze/thaw durability while maintaining or improving workability. The resultant products have industrial application in a wide range of areas including exterior or interior use, roofing applications, wet area FC lining, etc.

While the present invention has been described with reference to the above examples, it would be appreciated that other embodiments, forms or modifications may be produced without departing from the spirit or scope of the invention as broadly described herein.

The invention claimed is:

1. A method of providing a low or medium density FRC product having a density of less than about 1.55 g/cm³, comprising the steps of: i) providing a formulation for a low or medium density product; ii) forming a green article from said formulation; iii) curing said green article to form said product; wherein prior to step iii) one or more pore size modifying agents are added to the formulation such that the pore volume of the product is reduced as compared with a conventional product emanating from steps i) to iii), while maintaining a density of no greater than about 1.6 g/cm$^3$ wherein the reduced pore volume of the product comprises a predetermined pore size distribution, which is obtained by chemical modification by including a predetermined quantity of pore modifying components into the formulation, wherein the pore modifying components include lignocellulosic fibers treated with a water repellant agent and microfine siliceous material, wherein the water repellant agent comprises a hydrophilic group and a hydrophobic group, wherein the lignocellulosic fibers treated with a water repellent agent are incorporated into the formulation at a concentration of about 2 to 4% of total weight of dry solids, wherein the microfine siliceous material is incorporated into the formulation at a concentration of about 2 to 4% of total weight of dry solids, wherein said formulation further comprises reinforcing fibers and the total amount of reinforcing fibers and lignocellulosic fibers treated with a water repellent agent is less than about 7% of total weight of dry solids.

2. A method as claimed in claim 1 wherein a formulation for a medium density product is prepared, and the formulation density reduced toward a low density formulation such that light pressing brings the product back towards the medium density range of about 1.1 to 1.55 grams/cm$^3$.

3. A method as claimed in claim 1 wherein the predetermined pore size distribution is obtained by physical modification of the FRC product.

4. A method as claimed in claim 1 wherein during its production the low or medium density FRC product is subjected to a light press to provide the required predetermined pore size distribution.

5. A method as claimed in claim 4 wherein the light press is sufficient to provide the desired predetermined pore size distribution but maintain a density of no greater than 1.6 g/cm$^3$.

6. A method as claimed in claim 5 wherein the pressure applied is sufficient to produce the predetermined pore size distribution but maintain a density of between about 1.1 and 1.55 g/cm$^3$.

7. A method as claimed in claim 1 wherein said pore size distribution includes critical zones, wherein said critical zones are in the region of 1 to 10 microns mean pore diameter size, or in the region of 10 to 100 microns mean pore diameter size, or both.

8. A method as claimed in claim 7 wherein the pore volume in one or more of the critical zones is no greater than about 150% of the pore volume in the corresponding pore size region of a conventional high density FRC product.

9. A method as claimed in claim 1 wherein the predetermined pore size distribution is obtained by a combination of chemical and physical modifications.

10. A method as claimed in claim 1 wherein a predetermined pore size distribution is obtained to provide improved freeze/thaw durability to the FRC product.

11. A method as claimed in claim 1 wherein a predetermined pore sized distribution is obtained to provide reduced propensity to carbonation or differential carbonation of the FRC product.

12. A method of providing a low or medium density FRC product having a density of less than about 1.55 g/cm$^3$, comprising the steps of:
i) providing a formulation for a low or medium density product;
ii) forming a green article from said formulation having a density less than 1.1 g/cm$^3$;
iii) curing said green article to form a product having a pore size distribution; wherein prior to step iii) one or more pore size modifying agents are added to the formulation and the green shaped article is subjected to a light press forming a product having a reduced pore volume as compared with a product emanating in the absence of pore modifying agents and a light press, wherein the light press increases the density of the product to between about 1.1 to 1.6 g/cm$^3$, wherein the reduced pore volume of the product comprises a predetermined pore size distribution, which is obtained by chemical modification by including a predetermined quantity of pore modifying components into the formulation, wherein the pore modifying components include lignocellulosic fibers treated with a water repellant agent and microfine siliceous material, wherein the water repellant agent comprises a hydrophilic group and a hydrophobic group, wherein the water repellant agent comprises a hydrophilic group and a hydrophobic group, wherein the lignocellulosic fibers treated with a water repellant agent are incorporated into the formulation at a concentration of about 2 to 4% of total weight of dry solids, wherein the microfine siliceous material is incorporated into the formulation at a concentration of about 2 to 4% of total weight of dry solids, wherein said formulation further comprises reinforcing fibers and the total amount of reinforcing fibers and lignocellulosic fibers treated with a water repellent agent is less than about 7% of total weight of dry solids.

13. A method as claimed in claim 12 wherein the pore size distribution is obtained by including a predetermined quantity of pore modifying components into the cementitious formulation.

14. A method as claimed in claim 12 wherein said pore size distribution includes critical zones, wherein said critical zones are in the region of 1 to 10 microns mean pore diameter size, or in the region of 10 to 100 microns mean pore diameter size, or both.

15. A method as claimed in claim 14 wherein the pore volume in one or more of the critical zones is no greater than about 150% of the pore volume in the corresponding pore size region of a conventional high density FRC product.

16. A method as claimed in claim 12 wherein the step of lightly pressing further comprises pressing the article at between about 5 and 40 MPa.

17. A method as claimed in claim 12 wherein the step of lightly pressing further comprises a ramping cycle.

18. A method as claimed in claim 17 wherein the duration of the ramping cycle is between about 10 to 40 minutes.

19. A method as claimed in claim 18 wherein the duration of the ramping cycle is between about 20 to 30 minutes.

20. A method as claimed in claim 18 wherein the step of lightly pressing further comprises a holding cycle following the ramping cycle.

21. A method as claimed in claim 20 wherein the duration of the holding cycle is between about 15 to 30 minutes.

22. A method as claimed in claim 21 wherein the duration of the holding cycle is between about 5 to 10 minutes.

23. A method of providing a low or medium density FRC product, comprising the steps of:
i) providing a formulation for a low or medium density product;
ii) adding lignocellulosic fibers treated with a water repellant agent and microfine siliceous material, wherein the water repellant agent comprises a hydrophilic group and a hydrophobic group, to the formulation, wherein the lignocellulosic fibers treated with a water repellent agent are incorporated into the formulation at a concentration of about 2 to 4% of total weight of dry solids, wherein the microfine siliceous material is incorporated into the formulation at a concentration of about 2 to 4% of total weight of dry solids, wherein said formulation further comprises reinforcing fibers and the total amount of reinforcing fibers and lignocellulosic fibers treated with a water repellent agent is less than about 7% of total weight of dry solids;

iii) forming a green article from said formulation to a density less than 1.1 g/cm$^3$;

iv) precuring the green article for no more than about 80 hours at a temperature no higher than about 60° C.;

v) pressing the green shaped article at between about 15 and 20 MPa in a ramping phase wherein pressure is ramped up for 10 to 40 minutes, and a holding phase wherein pressure is held for between about 15 to 30 minutes forming a product having a pore size distribution having at least one critical zone, wherein a zone includes the region of 1 to 10 microns mean pore diameter, and a final density of between about 1.1 to 1.6 g/cm$^3$;

vi) autoclaving said green article in a pressurized environment with steam at between about 120° C. to about 200° C. for between about 3 to about 30 hours; and vii) curing said product.

24. A method as claimed in claim 23 wherein said pore size distribution has a critical zone in the region of 10 to 100 microns mean pore diameter size.

25. A method as claimed in claim 1 wherein the total amount of reinforcing fibers and lignocellulosic fibers treated with a water repellent agent is between about 4 to 6% of total weight of dry solids.

26. A method as claimed in claim 12 wherein the total amount of reinforcing fibers and lignocellulosic fibers treated with a water repellent agent is between about 4 to 6% of total weight of dry solids.

27. A method as claimed in claim 23 wherein the total amount of reinforcing fibers and lignocellulosic fibers treated with a water repellent agent is between about 4 to 6% of total weight of dry solids.

* * * * *